United States Patent
Kumar et al.

(10) Patent No.: US 12,141,033 B2
(45) Date of Patent: Nov. 12, 2024

(54) FLEETWIDE ADAPTIVE RATE LIMITING GATEKEEPER APPARATUSES, PROCESSES AND SYSTEMS

(71) Applicant: Datto, Inc., Norwalk, CT (US)

(72) Inventors: Satish Kumar, Austin, TX (US); Garrett Allen, Latham, NY (US); Jesse Rhoads, Windermere, FL (US); Kathleen DeRusso, Schenectady, NY (US); Kevin Vecchione, Latham, NY (US); Richard Watson, Rochester, NY (US); Samantha Shandrow, Newtown, CT (US); Tushar Pradhan, Boxborough, MA (US)

(73) Assignee: DATTO, INC., Norwalk, CT (US)

( * ) Notice: Subject to any disclaimer, the term of this patent is extended or adjusted under 35 U.S.C. 154(b) by 192 days.

(21) Appl. No.: 17/834,895

(22) Filed: Jun. 7, 2022

(65) Prior Publication Data
US 2024/0095127 A1    Mar. 21, 2024

(51) Int. Cl.
  *G06F 11/14*    (2006.01)
  *G06F 9/54*    (2006.01)

(52) U.S. Cl.
  CPC .......... *G06F 11/1448* (2013.01); *G06F 9/547* (2013.01); *G06F 2201/805* (2013.01)

(58) Field of Classification Search
  CPC . G06F 11/1448; G06F 9/547; G06F 2201/805
  USPC .......................................................... 714/1
  See application file for complete search history.

(56) References Cited

U.S. PATENT DOCUMENTS

| | | | |
|---|---|---|---|
| 8,365,185 B2* | 1/2013 | Bobak | H04L 69/40 714/1 |
| 10,616,230 B2* | 4/2020 | Singh | H04L 63/108 |
| 11,271,953 B1 | 3/2022 | Rajagopalan | |

(Continued)

FOREIGN PATENT DOCUMENTS

| CN | 103649962 A | * | 3/2014 | ............. | G06F 21/10 |

OTHER PUBLICATIONS

International Search Report and Written Opinion, as issued in connection with International Patent Application No. PCT/US2023/024753, dated Aug. 30, 2023, 16 pgs.

(Continued)

*Primary Examiner* — Guy J Lamarre
(74) *Attorney, Agent, or Firm* — MASCHOFF BRENNAN

(57) ABSTRACT

The Fleetwide Adaptive Rate Limiting Gatekeeper Apparatuses, Processes and Systems ("FARLG") transforms API call permission request, API call result request datastructure/inputs via FARLG components into API call permission response, API call result response outputs. An API call permission request datastructure associated with an API call of an application structured to identify an API and a set of scopes is obtained. A retry-after interval is determined for each scope in the set of scopes, in which existence of a retry-after interval for a scope indicates that the API previously returned a throttled response for the scope. A wait duration associated with the API call is determined as the maximum retry-after interval across retry-after intervals that exist for the set of scopes. An API call permission response datastructure structured to specify the wait duration is provided.

20 Claims, 27 Drawing Sheets

(56) References Cited

U.S. PATENT DOCUMENTS

| | | | |
|---|---|---|---|
| 2005/0068907 A1* | 3/2005 | Garg | H04M 3/5237 |
| | | | 370/352 |
| 2015/0229579 A1* | 8/2015 | Kosim-Satyaputra | ...................... |
| | | | H04L 67/01 |
| | | | 709/225 |
| 2019/0230169 A1* | 7/2019 | Elangovan | G06F 9/547 |
| 2019/0286834 A1 | 9/2019 | Luff et al. | |
| 2022/0070055 A1* | 3/2022 | Narasimhan | H04L 41/0686 |
| 2022/0247686 A1* | 8/2022 | Rajagopalan | H04L 63/1416 |

OTHER PUBLICATIONS

Nick Choi, Throttling a tiered, multi-tenant REST API at scale using API Gateway: Part 1, AWS Architecture Blog, May 6, 2022, pp. 1-6, Retrieved from the Internet: https://aws.amazon.com/blogs/architecture/throttling-a-tiered-multi-tenant-rest-api-at-scale-using-api-gateway-part-1/, retrieved on Aug. 22, 2023.

Polli Team Digitale R et al, RateLimit Fields for HTTPdraft-ietf-httpapi-ratelimit-headers-04; draft-ietf-httpapi-ratelimit-headers-04.txt, Internet Engineering Task Force, IETF; IN No. 4, May 30, 2022, pp. 1-33, Retrieved from the Internet: https://tools.ietf.org/html/draft-ietf-httpapi-ratelimit-headers-04, retrieved on May 30, 2022.

* cited by examiner

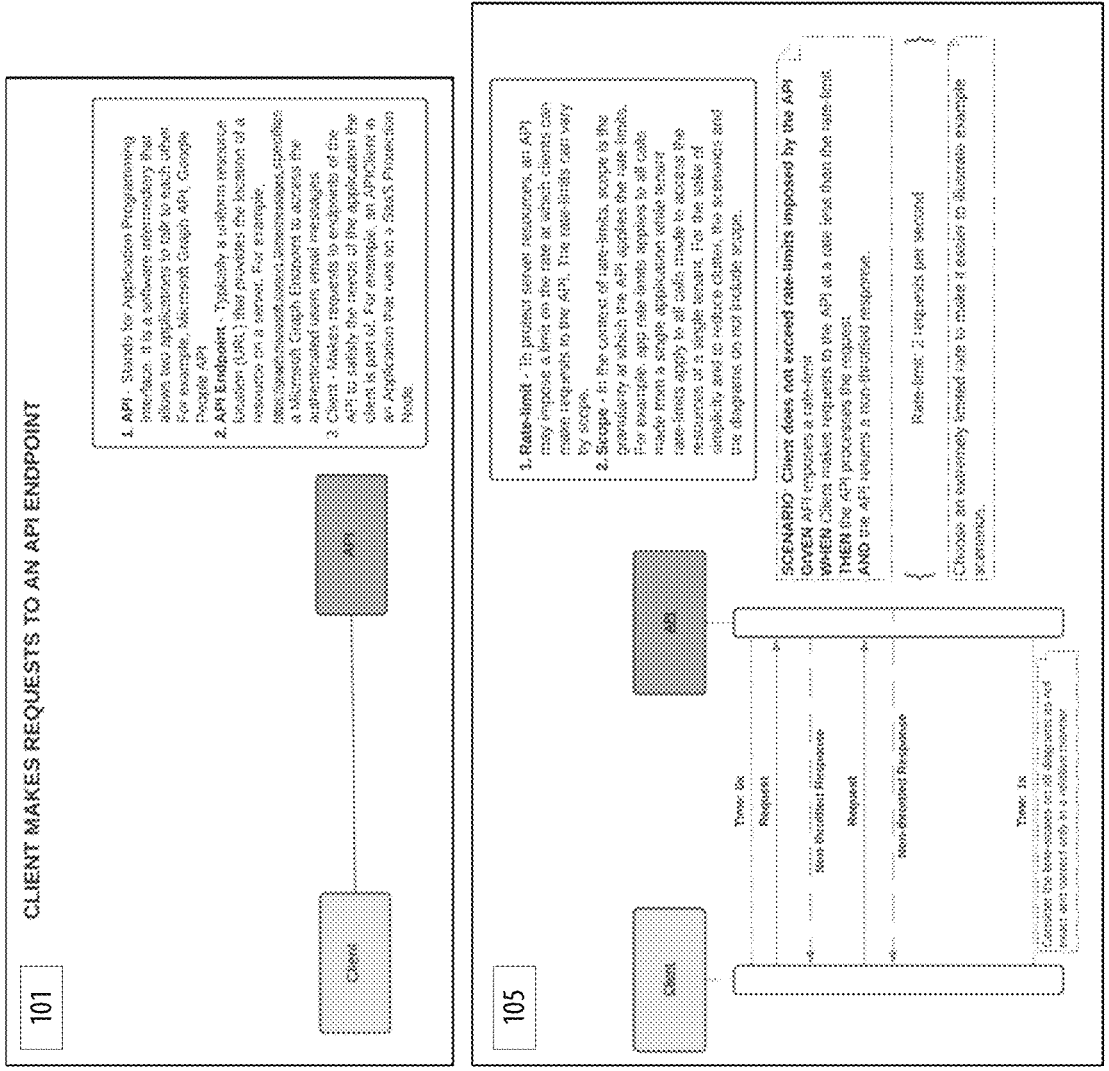
FIGURE 1A: FARLG IMPLEMENTATION CASE

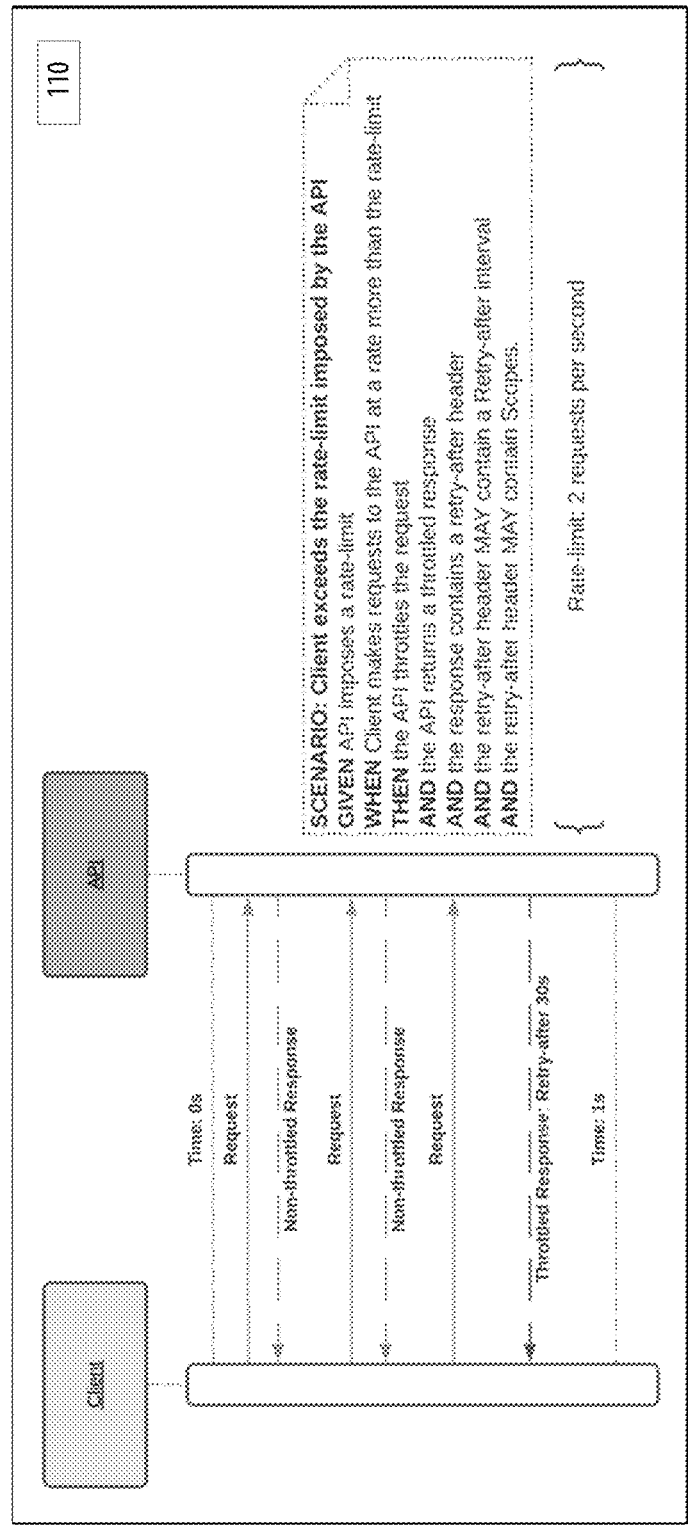
FIGURE 1B: FARLG IMPLEMENTATION CASE

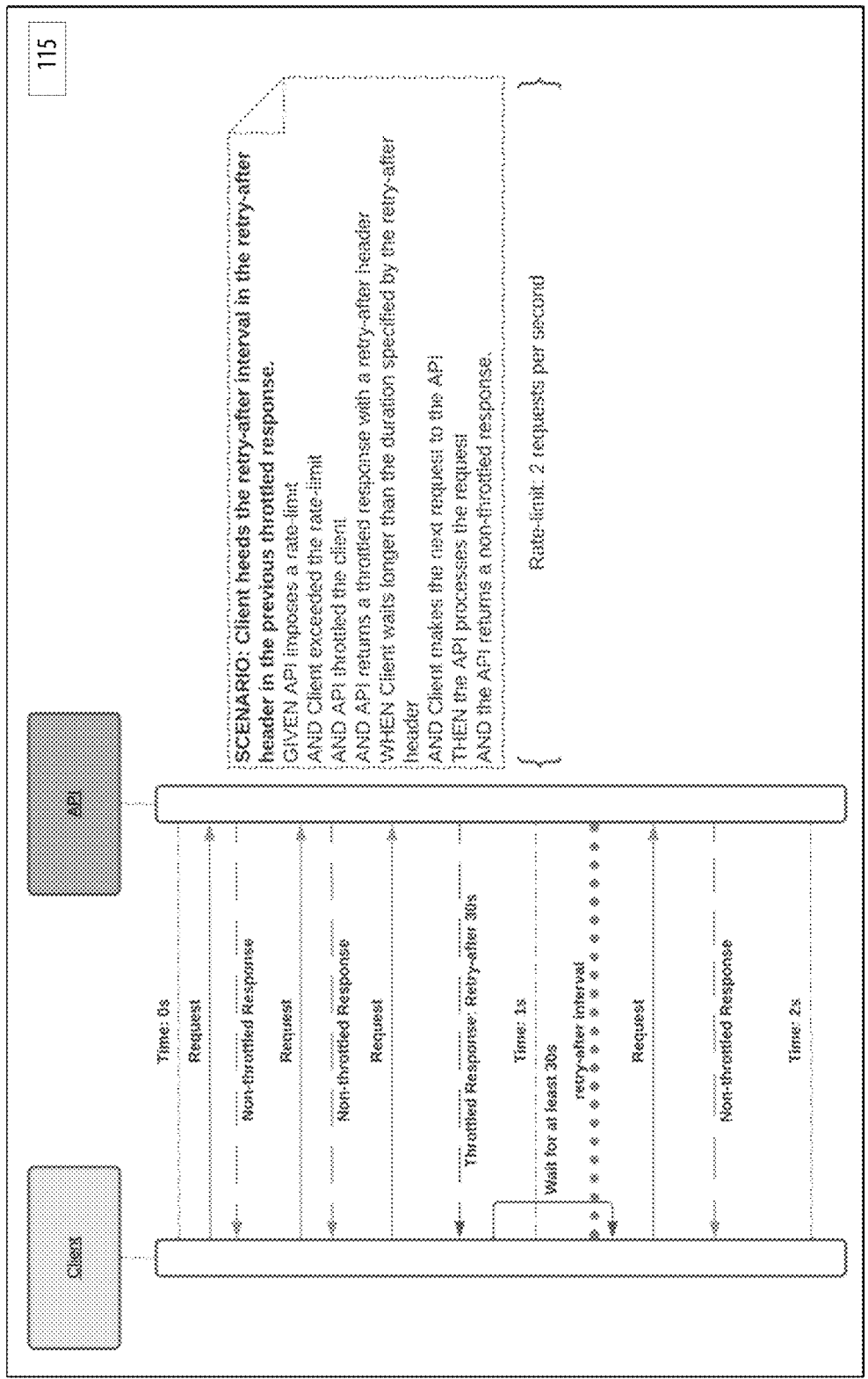
FIGURE 1C: FARLG IMPLEMENTATION CASE

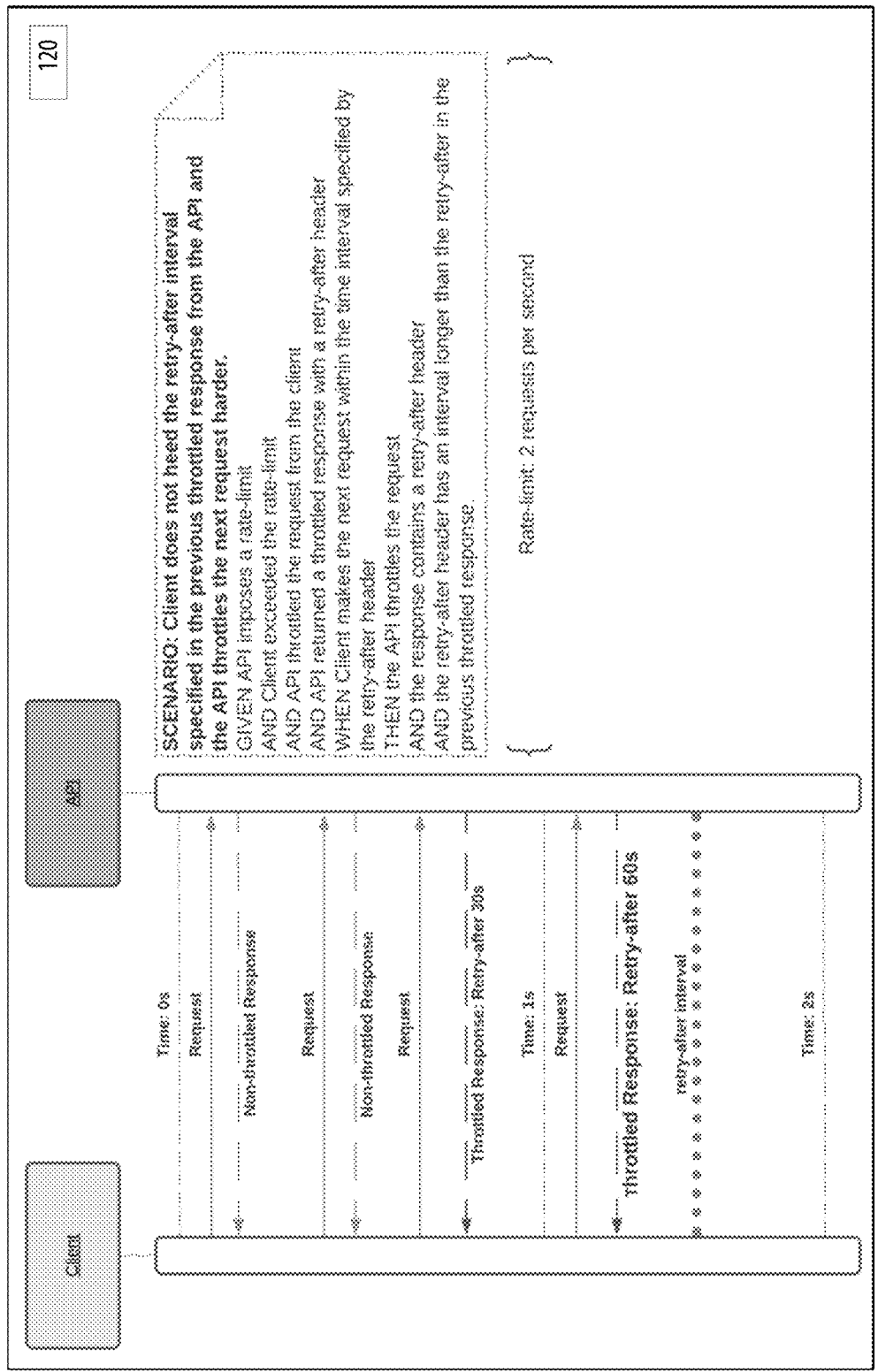
FIGURE 1D: FARLG IMPLEMENTATION CASE

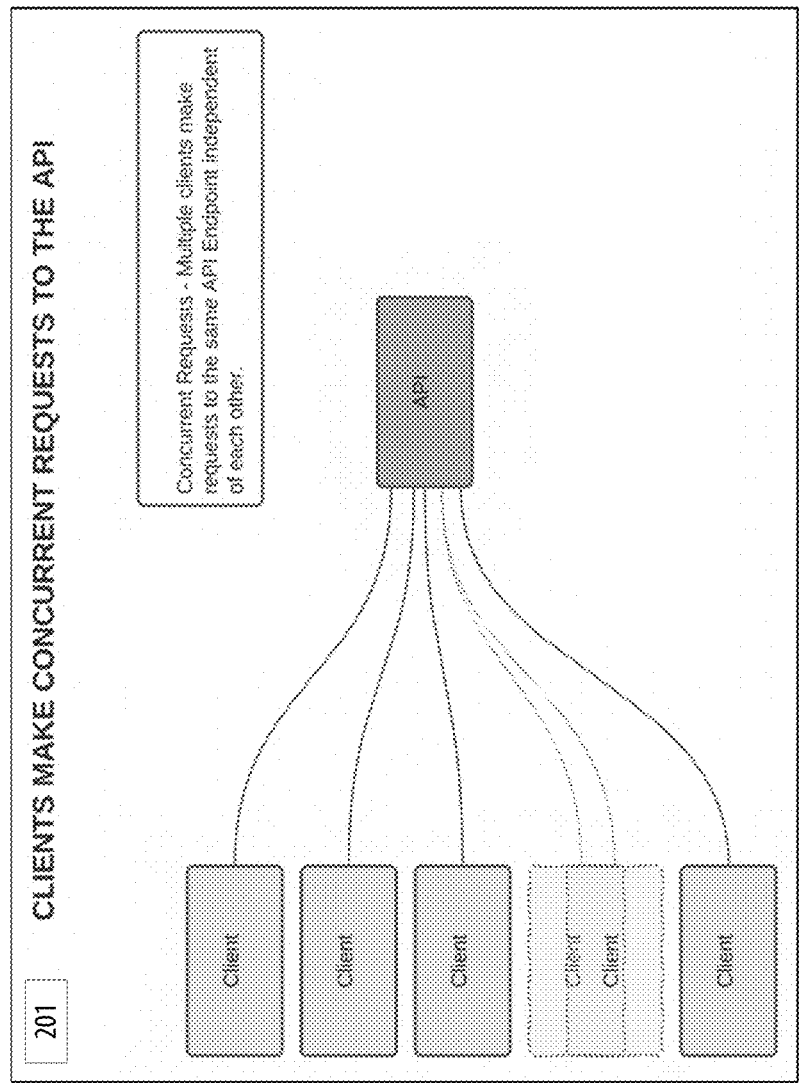
FIGURE 2A: FARLG IMPLEMENTATION CASE

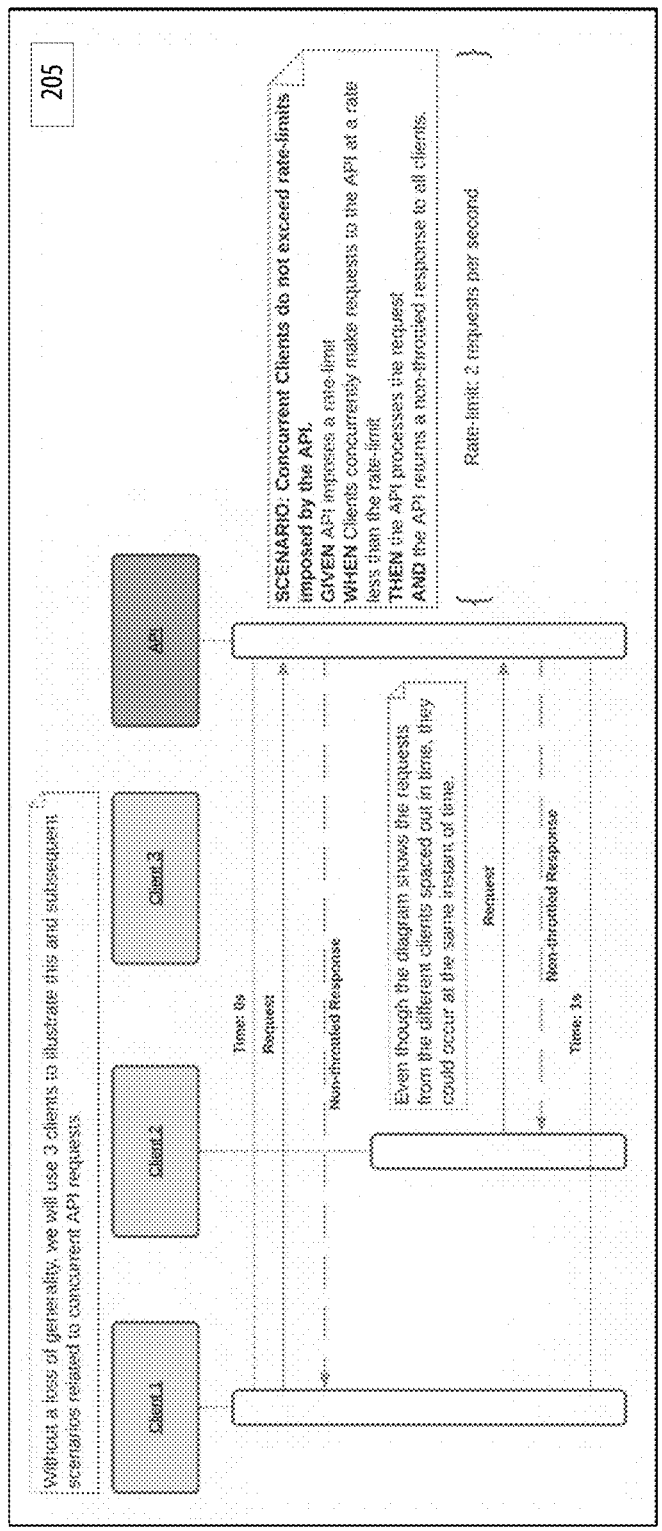
FIGURE 2B: FARLG IMPLEMENTATION CASE

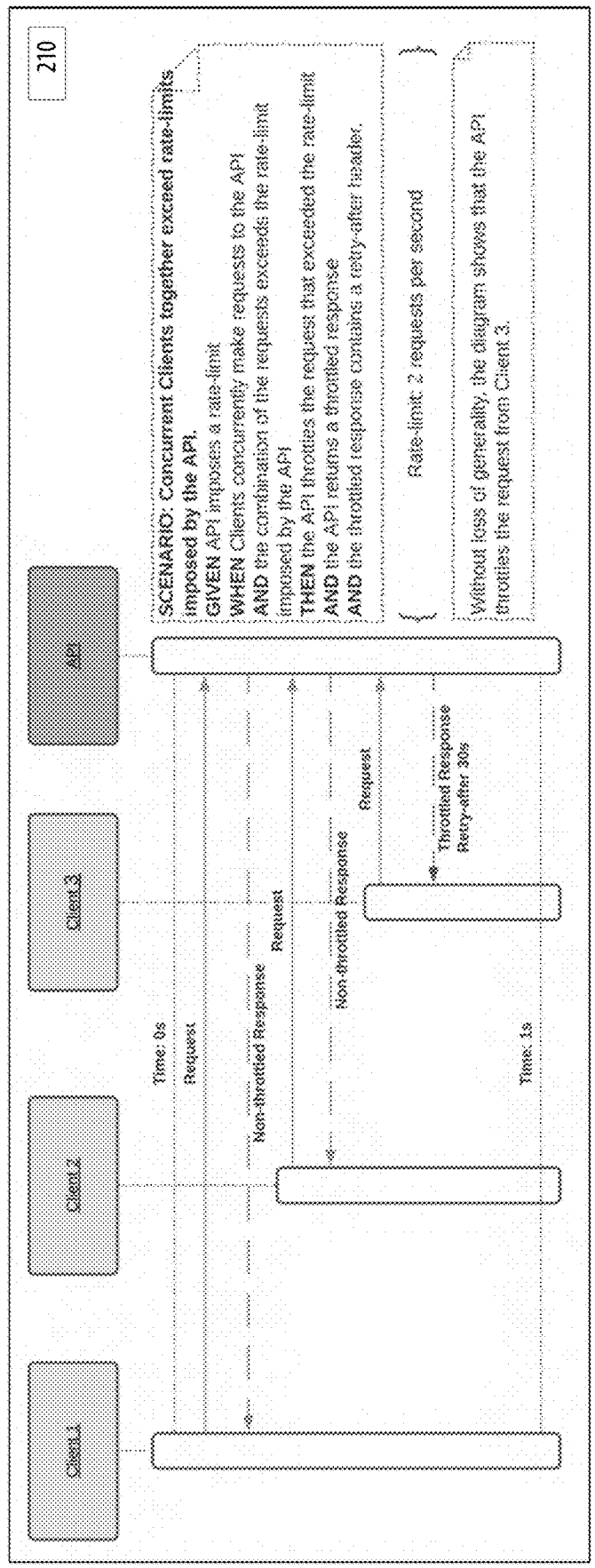
FIGURE 2C: FARLG IMPLEMENTATION CASE

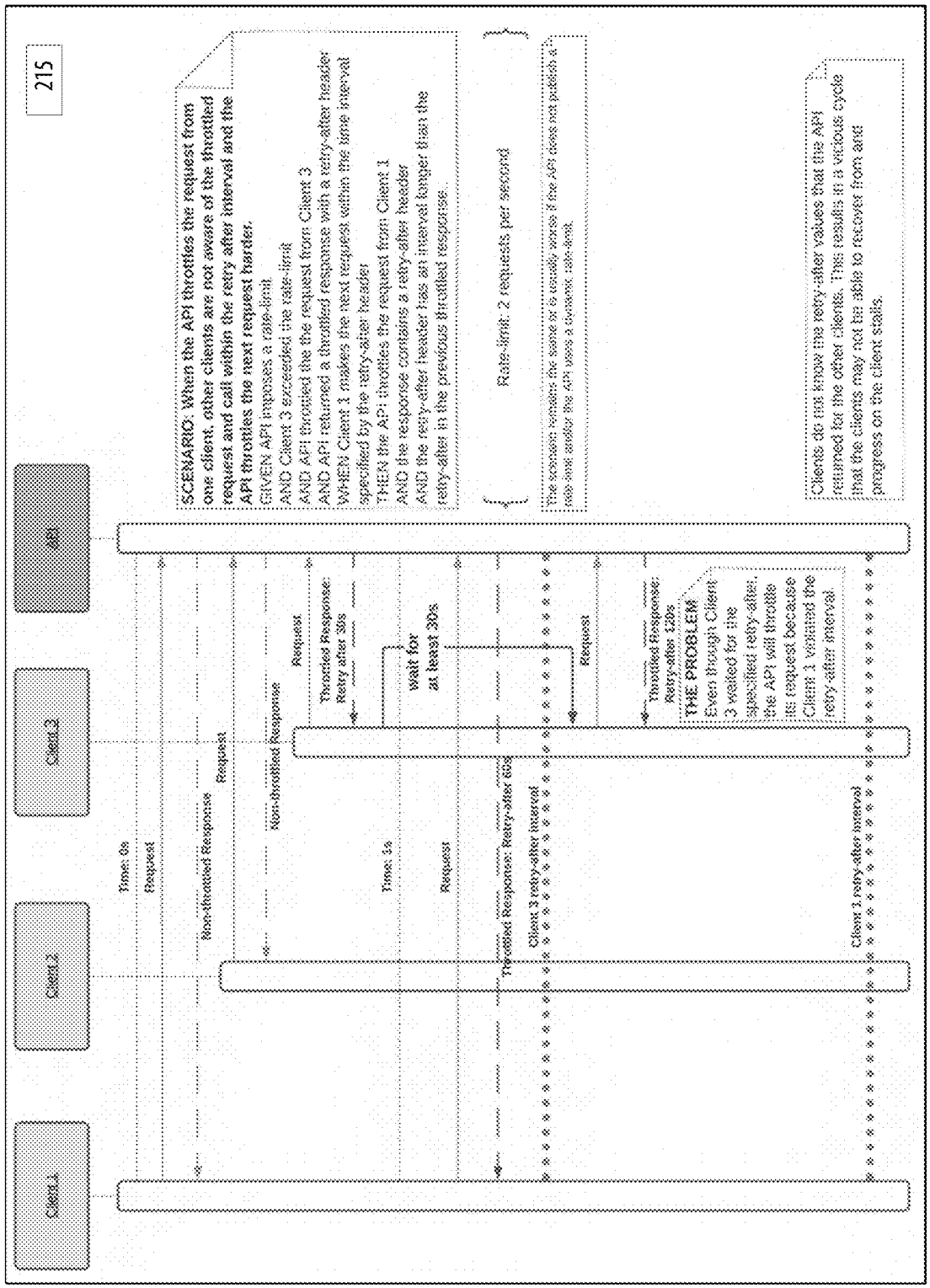
FIGURE 2D: FARLG IMPLEMENTATION CASE

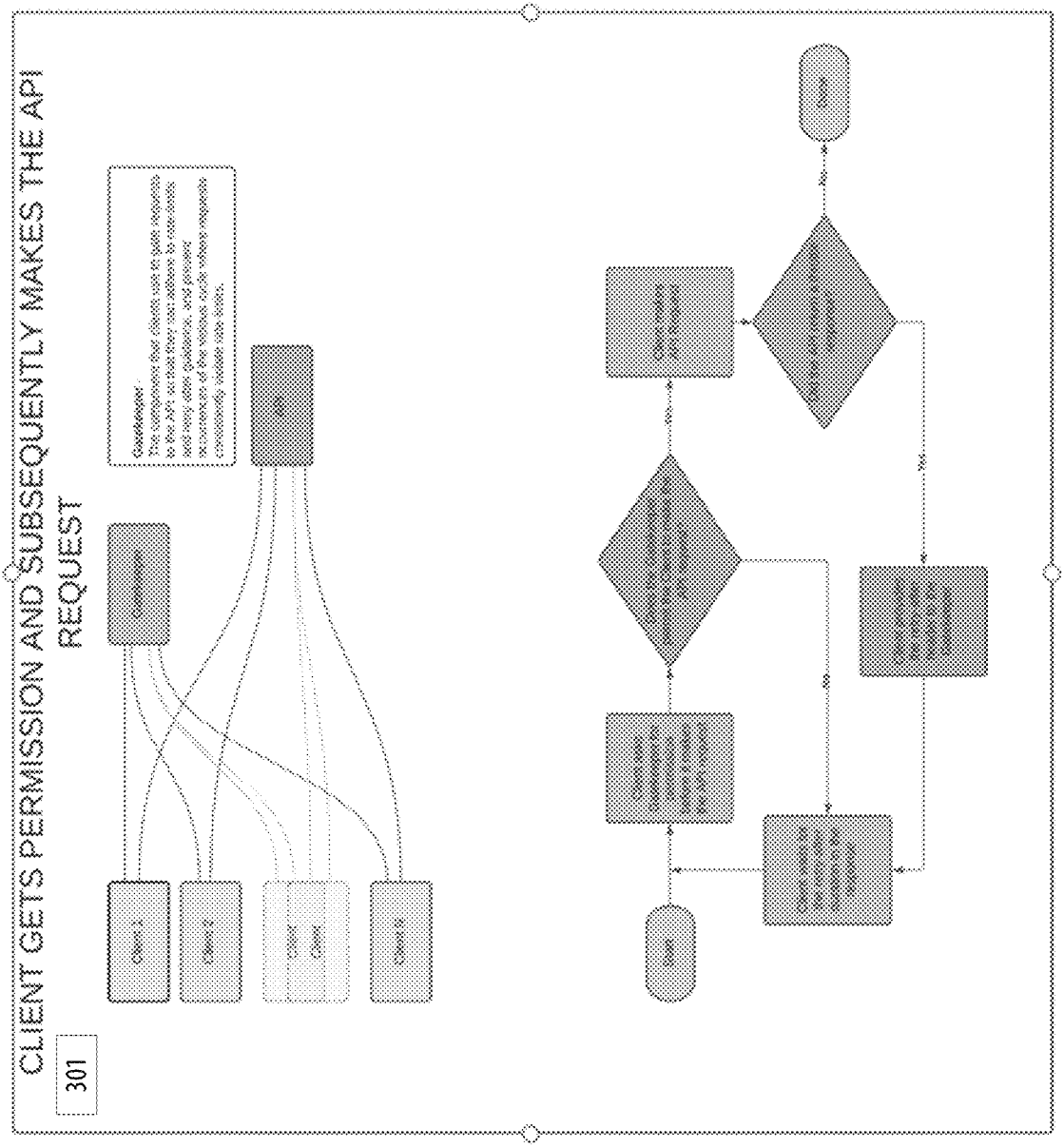
FIGURE 3A: FARLG ARCHITECTURE

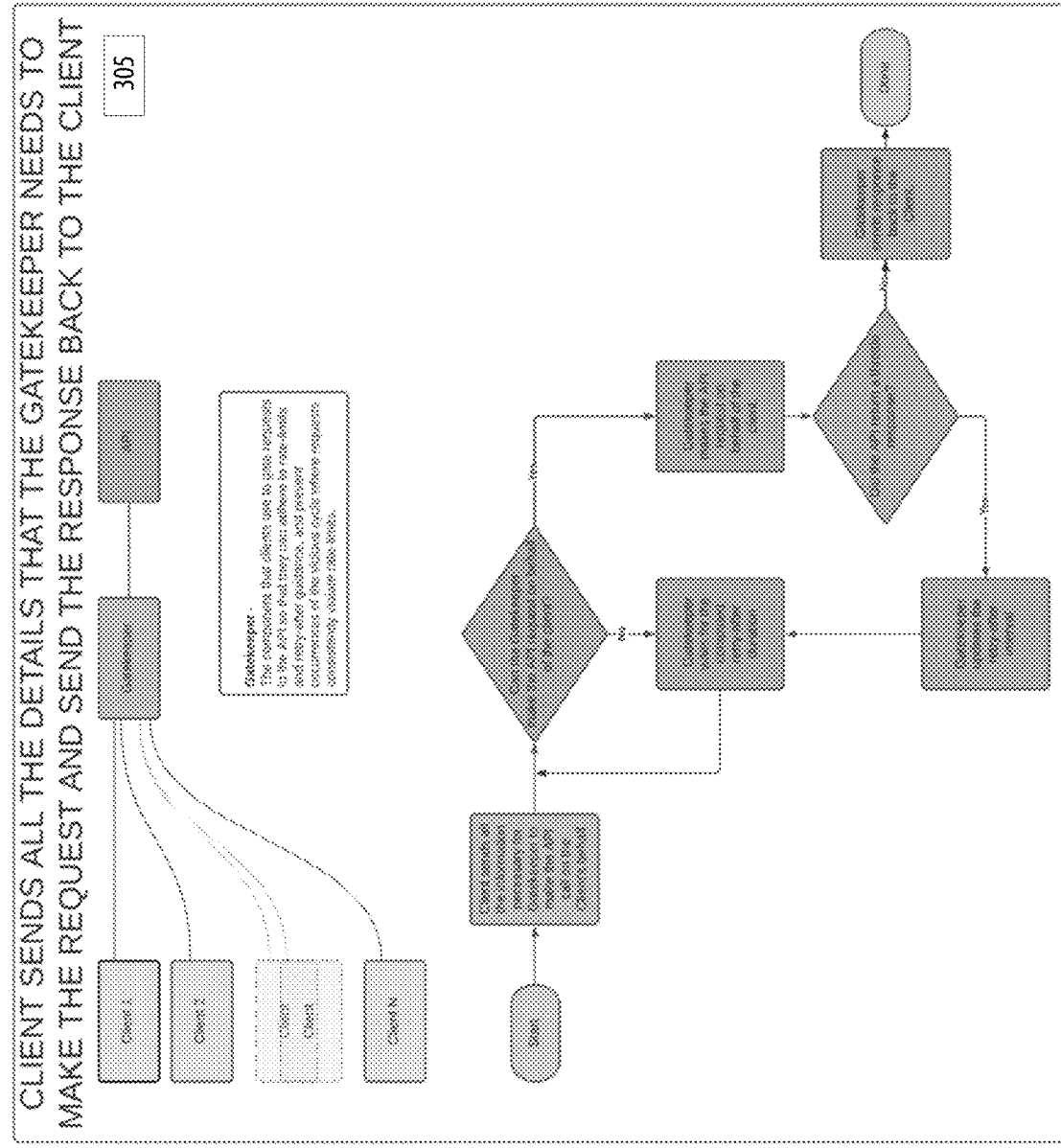
FIGURE 3B: FARLG ARCHITECTURE

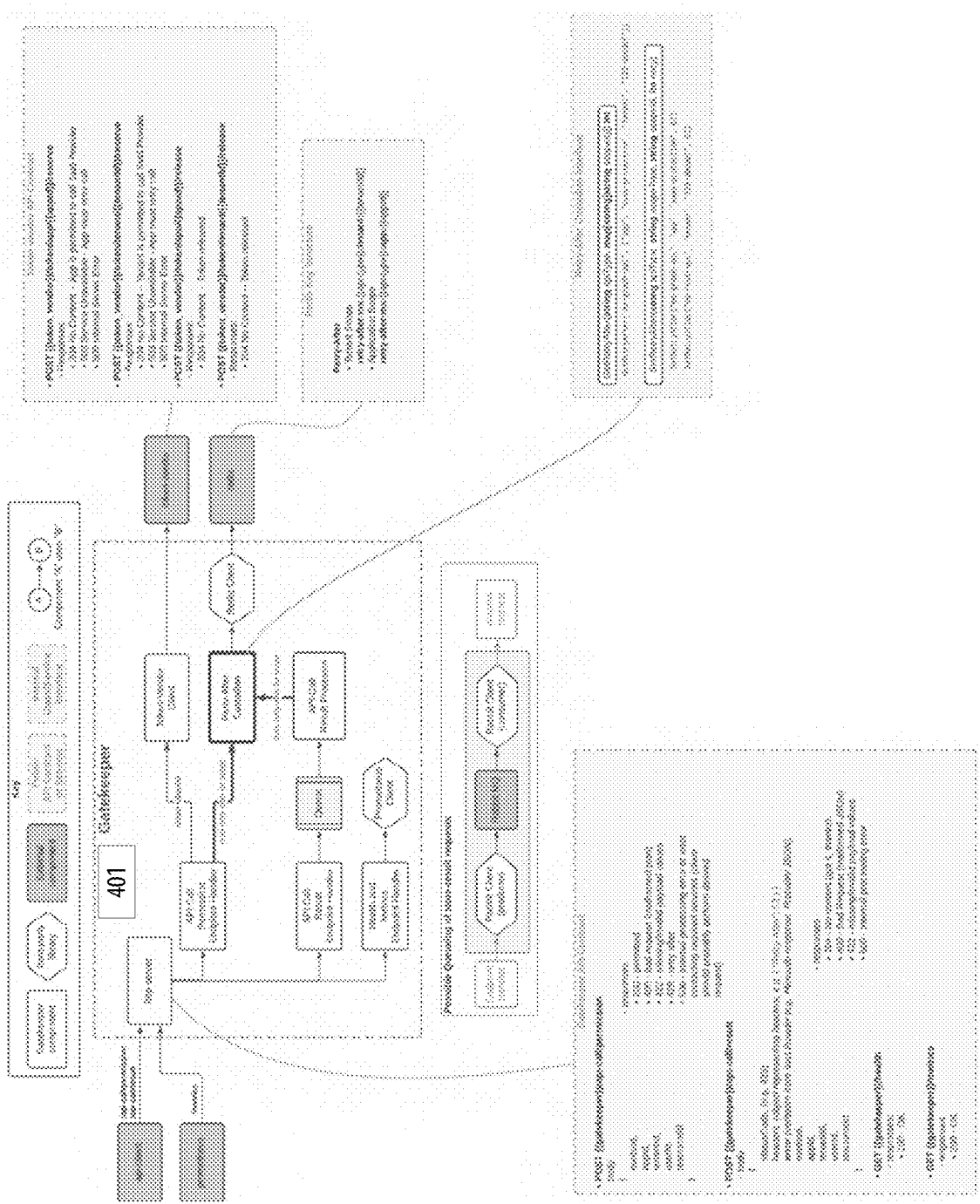
FIGURE 4: FARLG ARCHITECTURE

FIGURE 5A: FARLG ARCHITECTURE
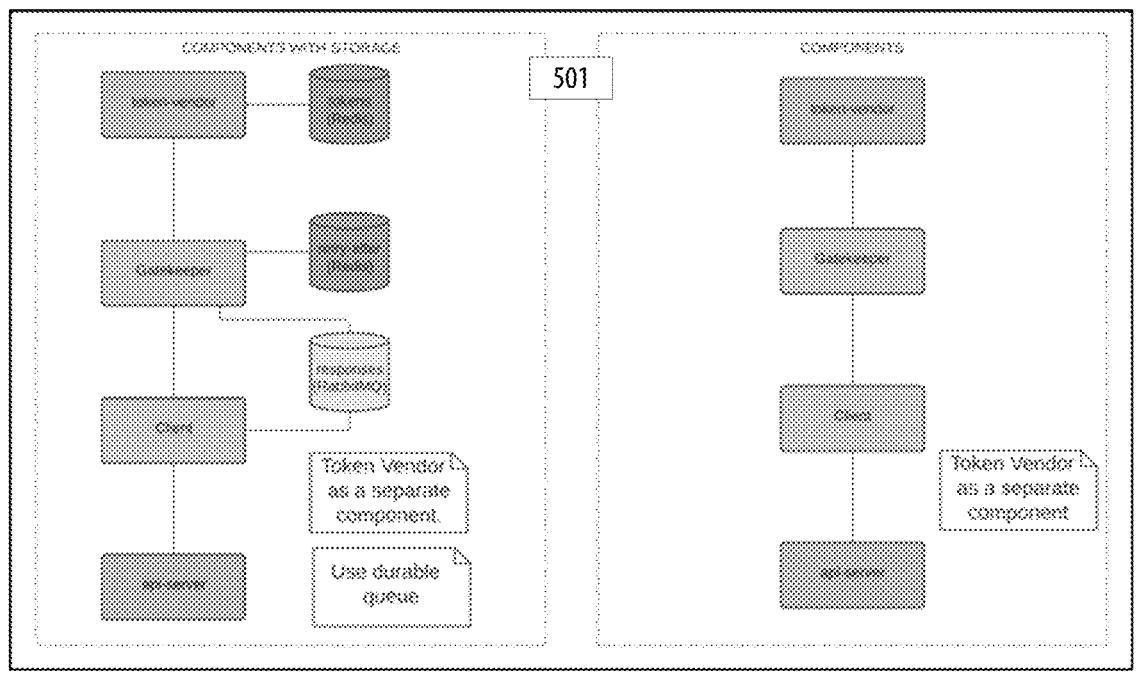
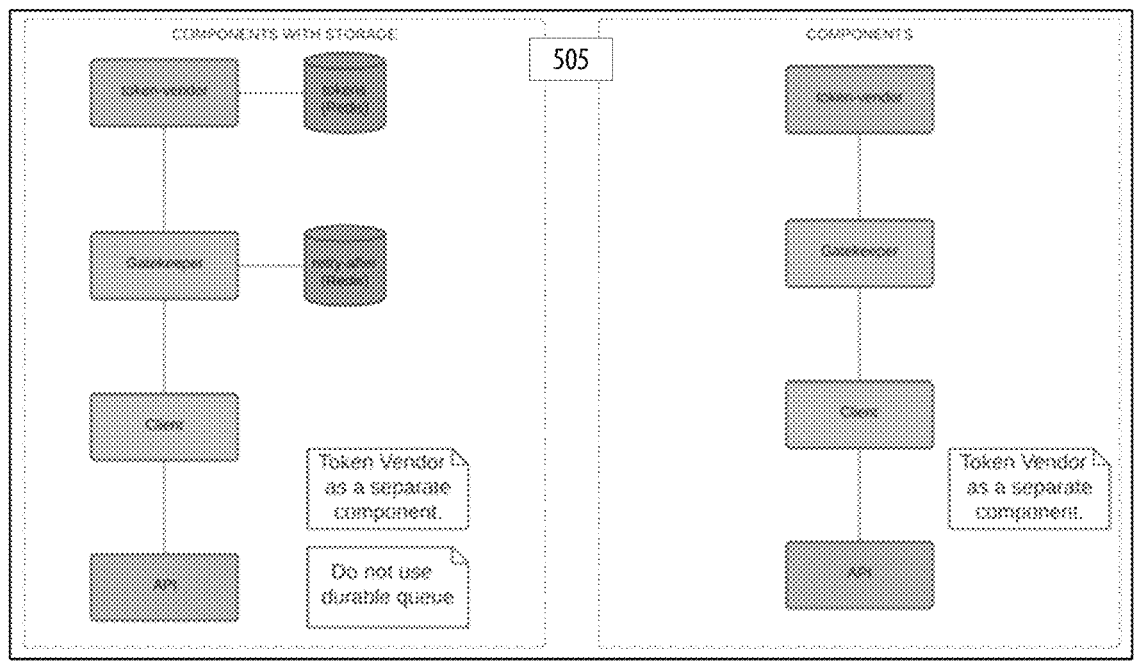

FIGURE 5B: FARLG ARCHITECTURE
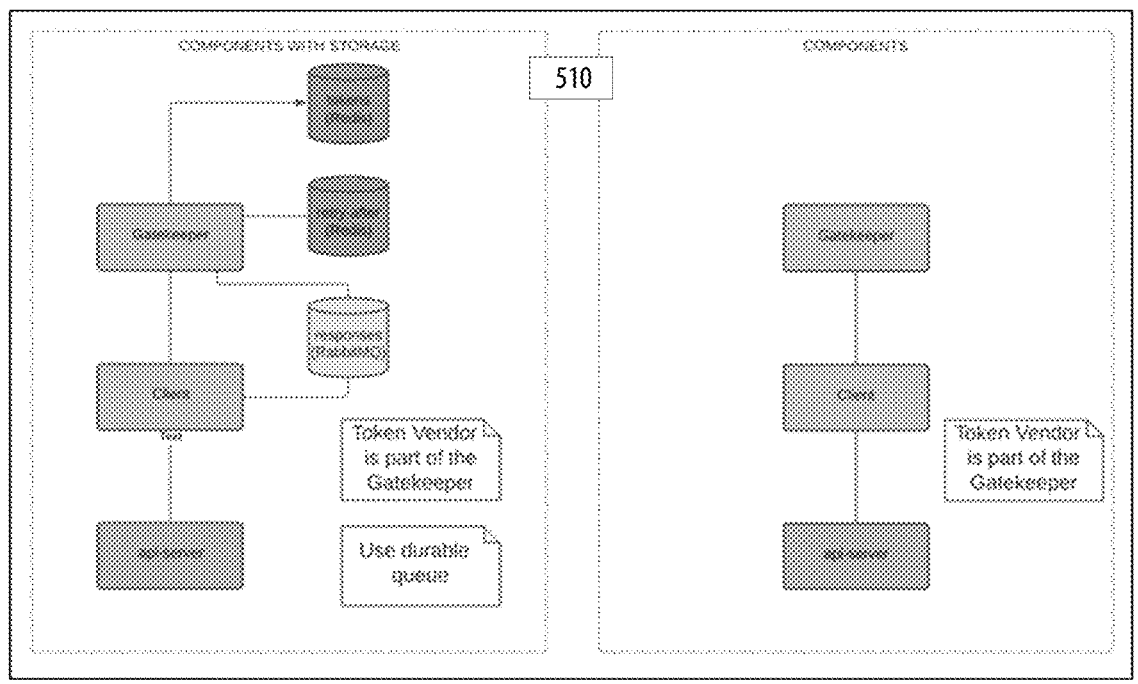
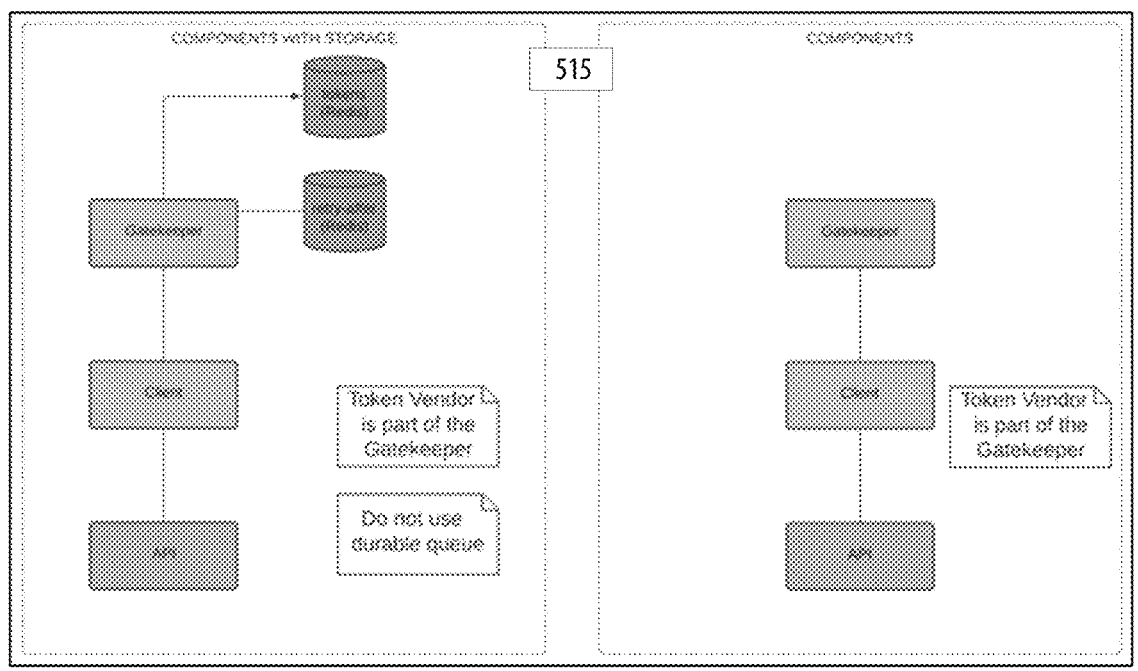

FIGURE 5C: FARLG ARCHITECTURE
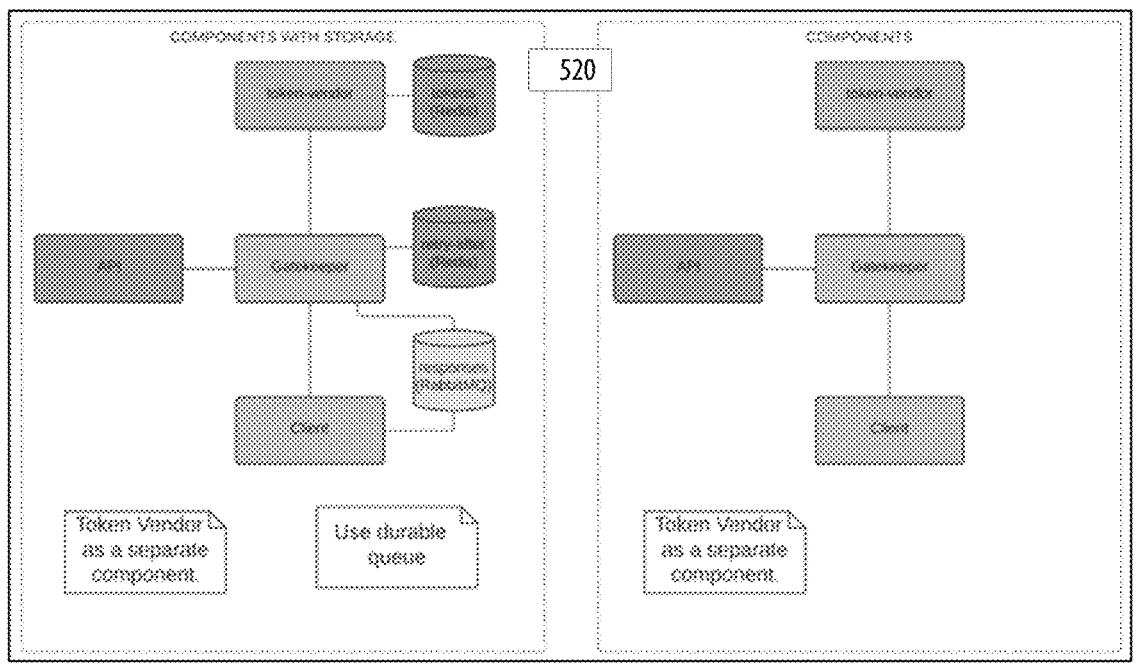
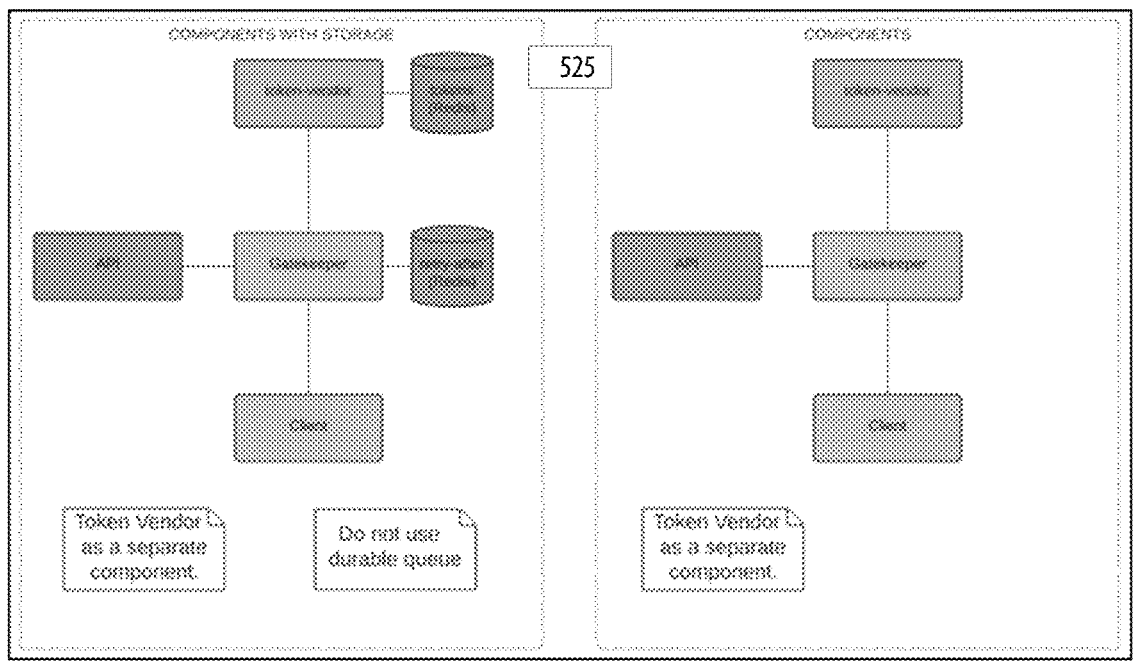

FIGURE 5D: FARLG ARCHITECTURE
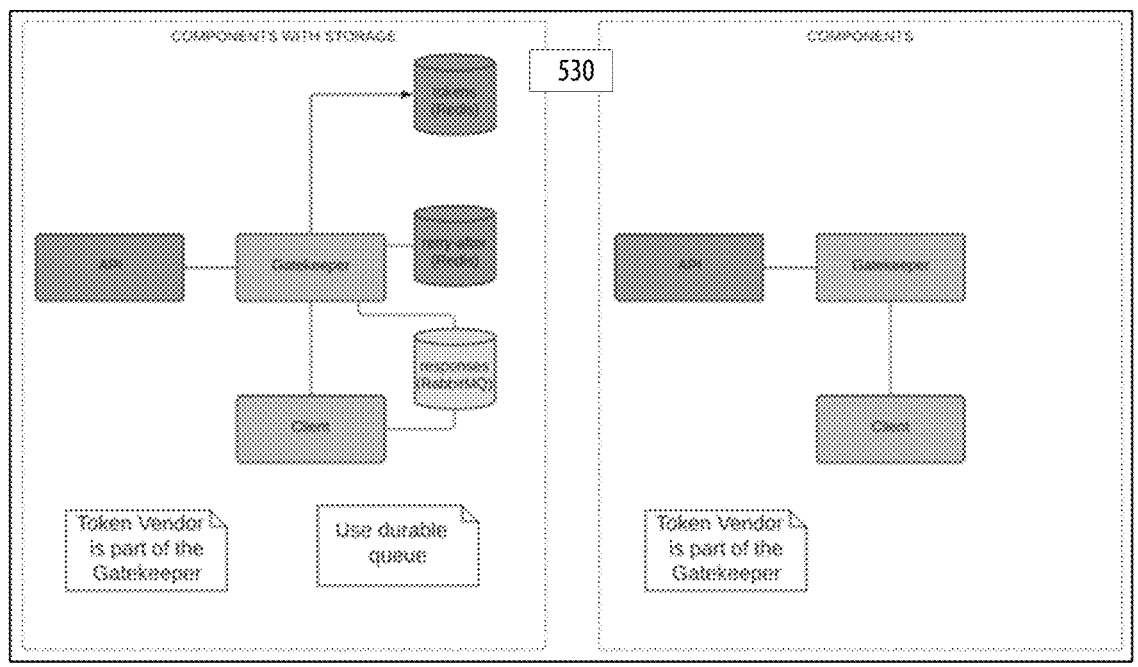
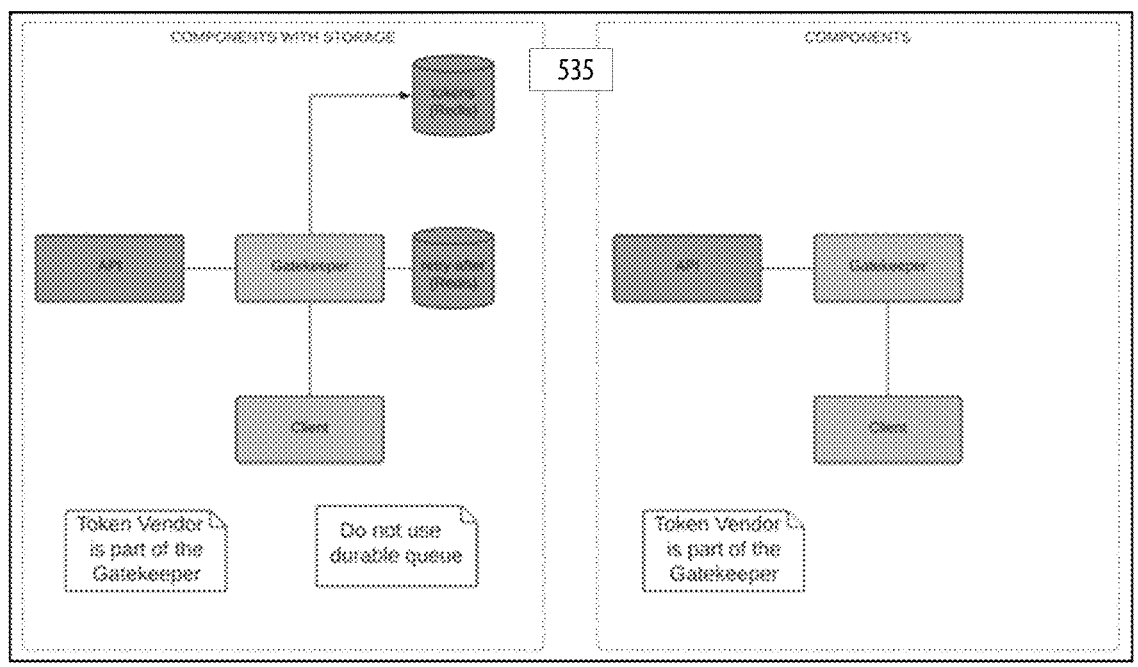

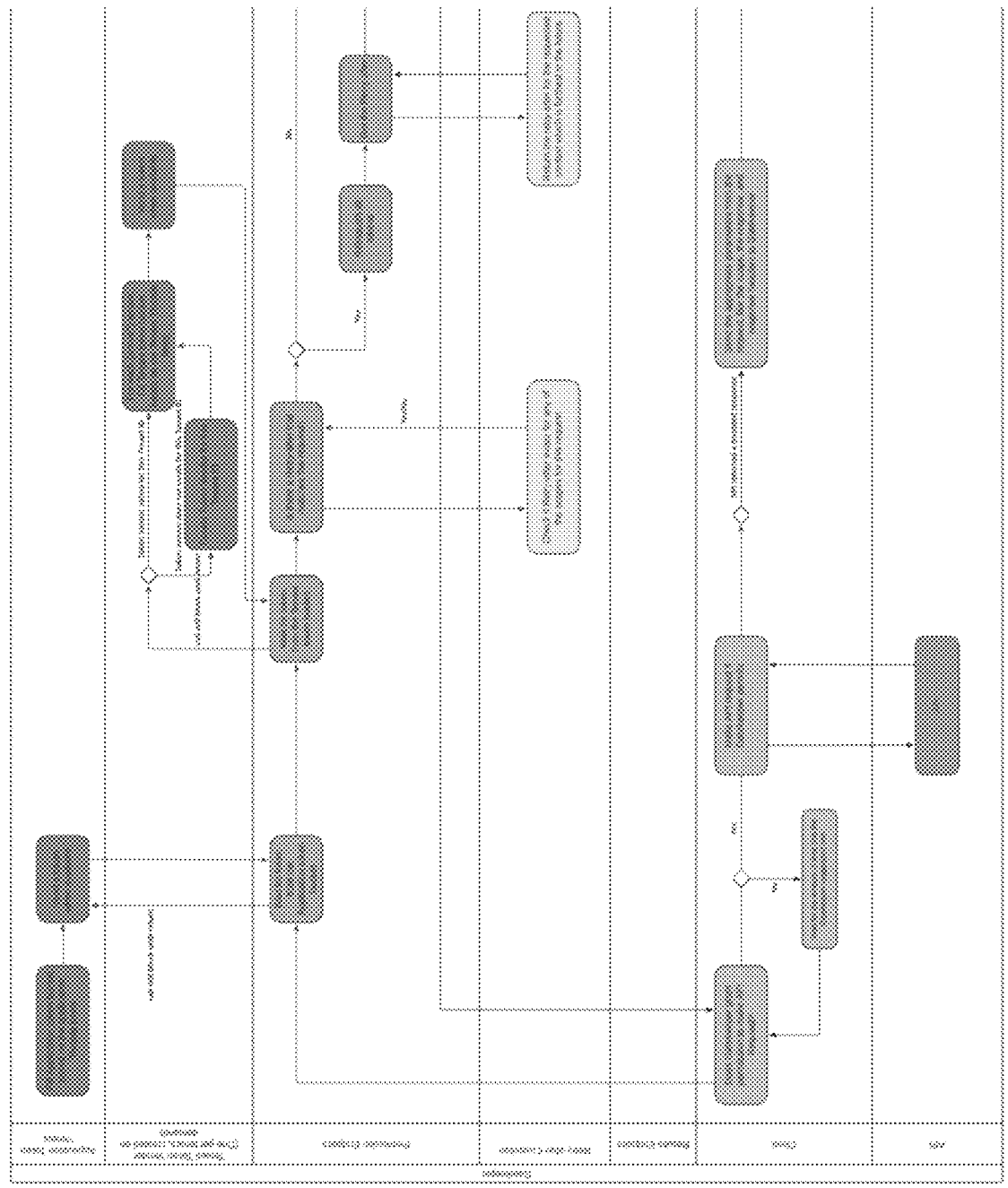
FIGURE 6A: FARLG ARCHITECTURE

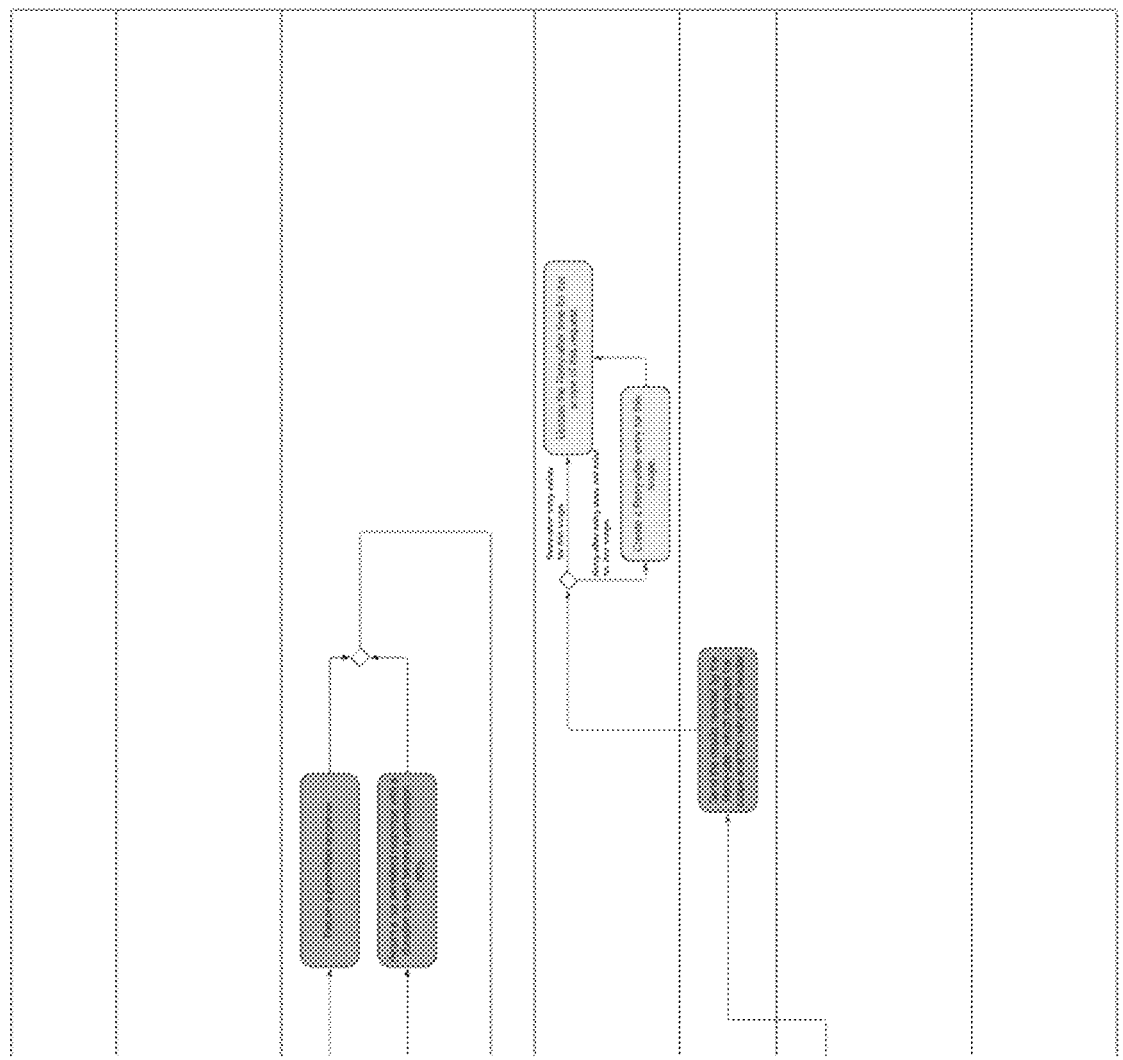
FIGURE 6B: FARLG ARCHITECTURE

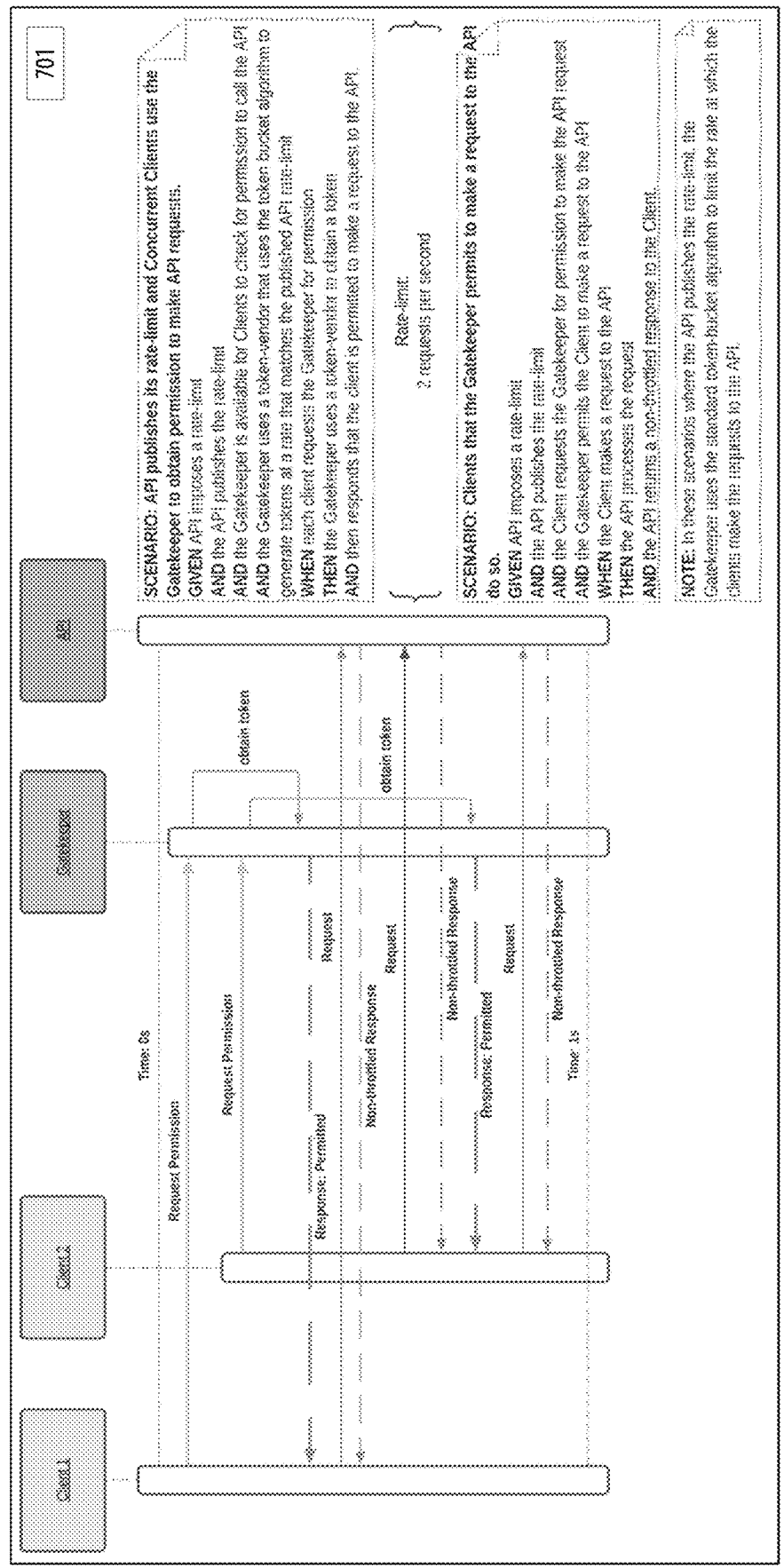

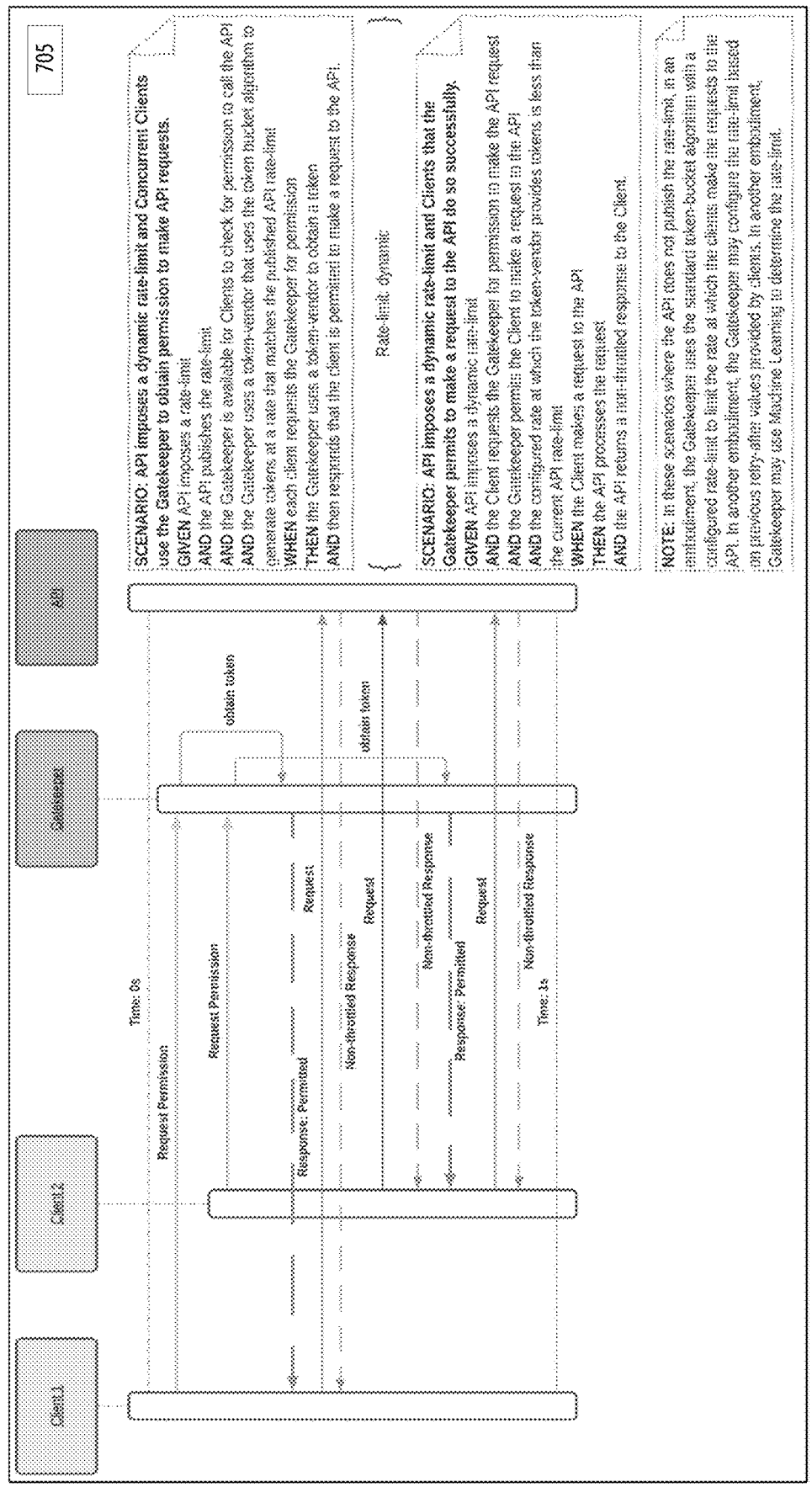

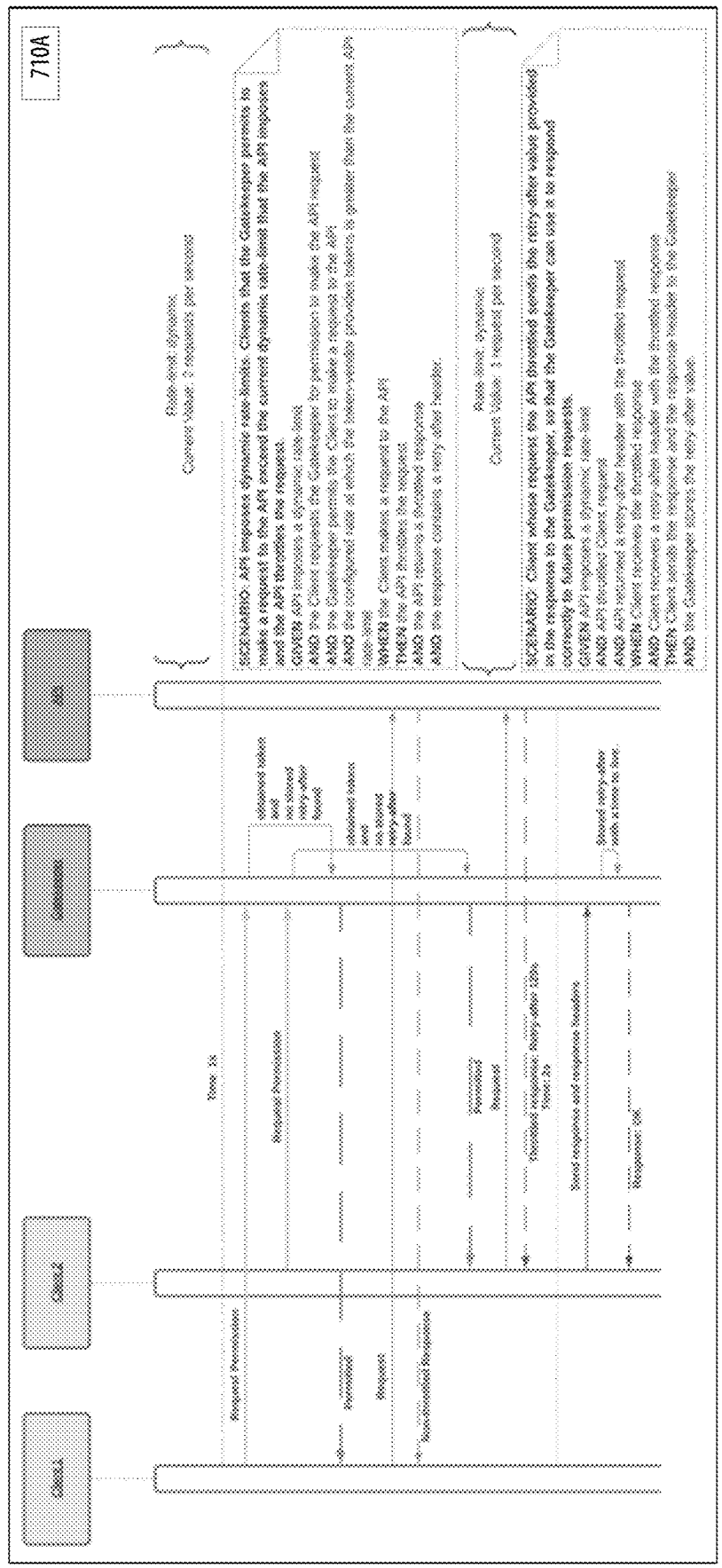
FIGURE 7C: FARLG IMPLEMENTATION CASE

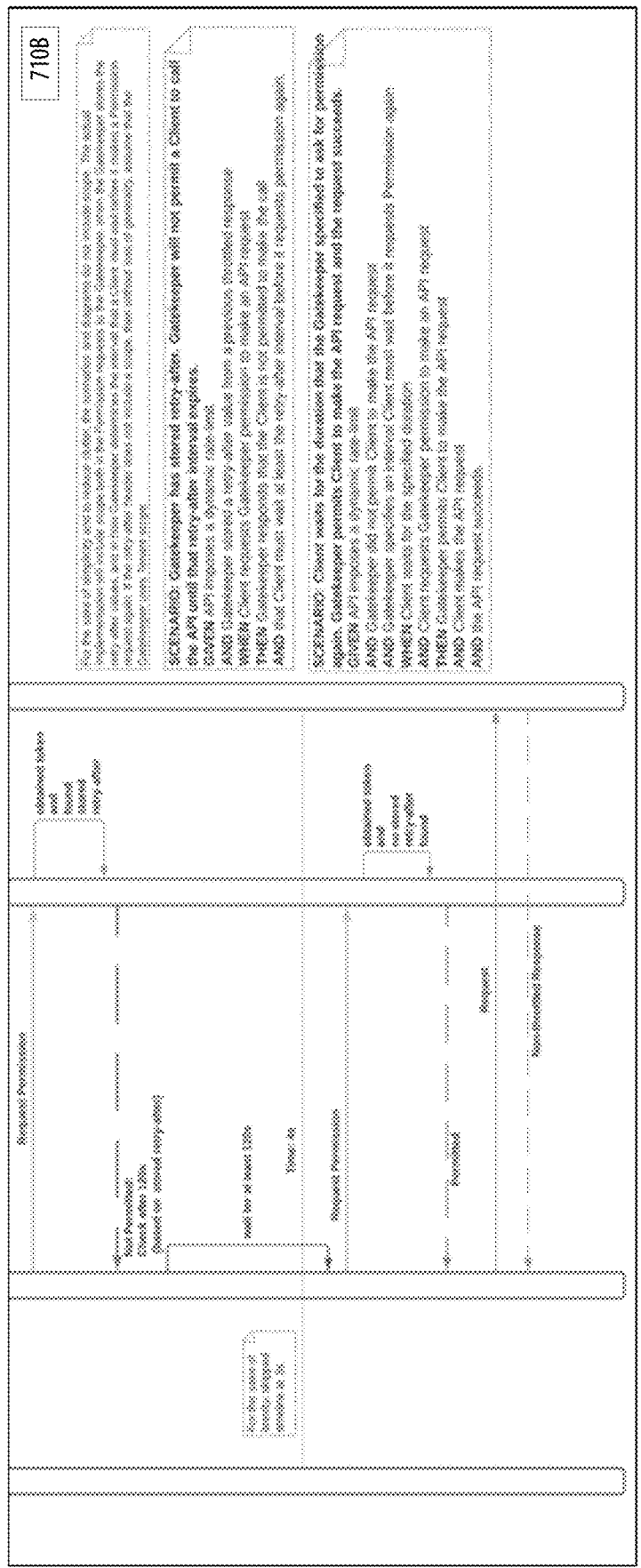
FIGURE 7D: FARLG IMPLEMENTATION CASE

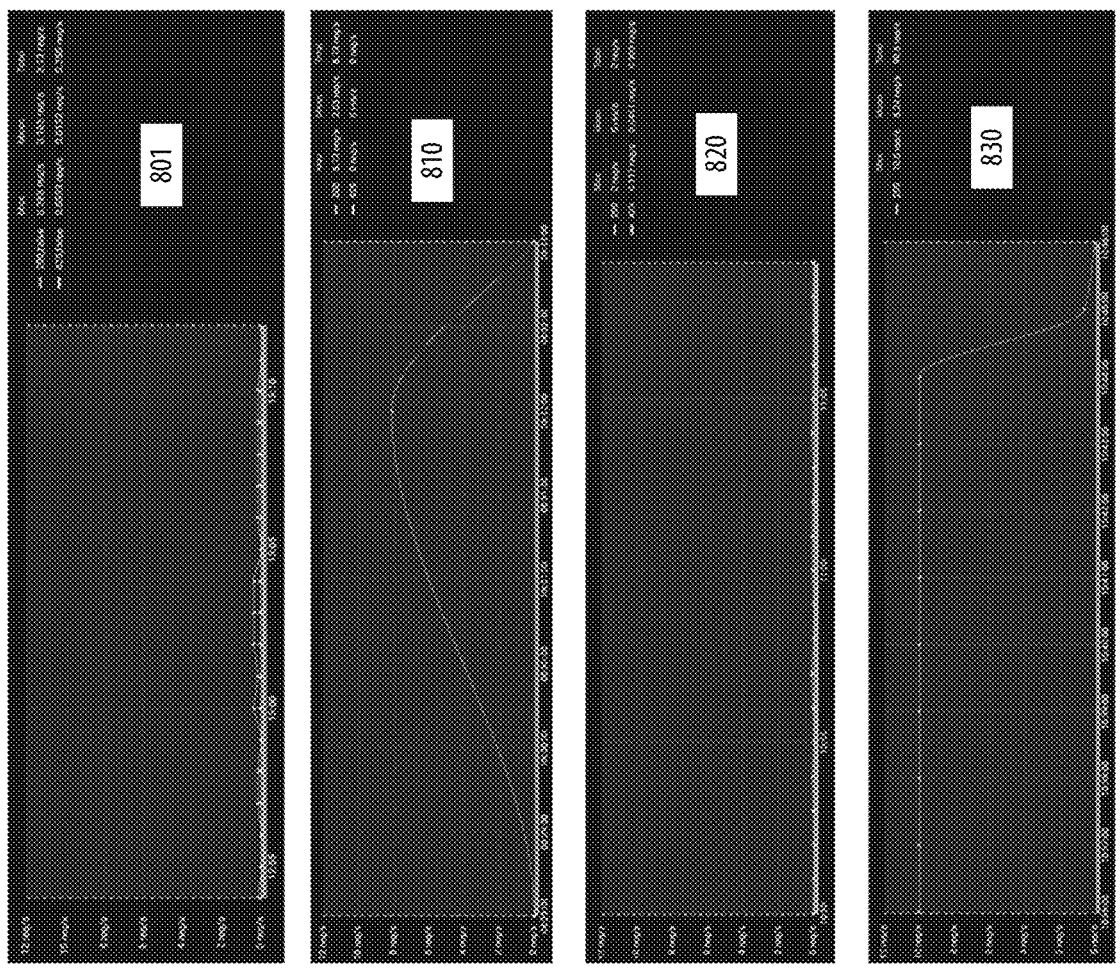
FIGURE 8: FARLG SCREENSHOT

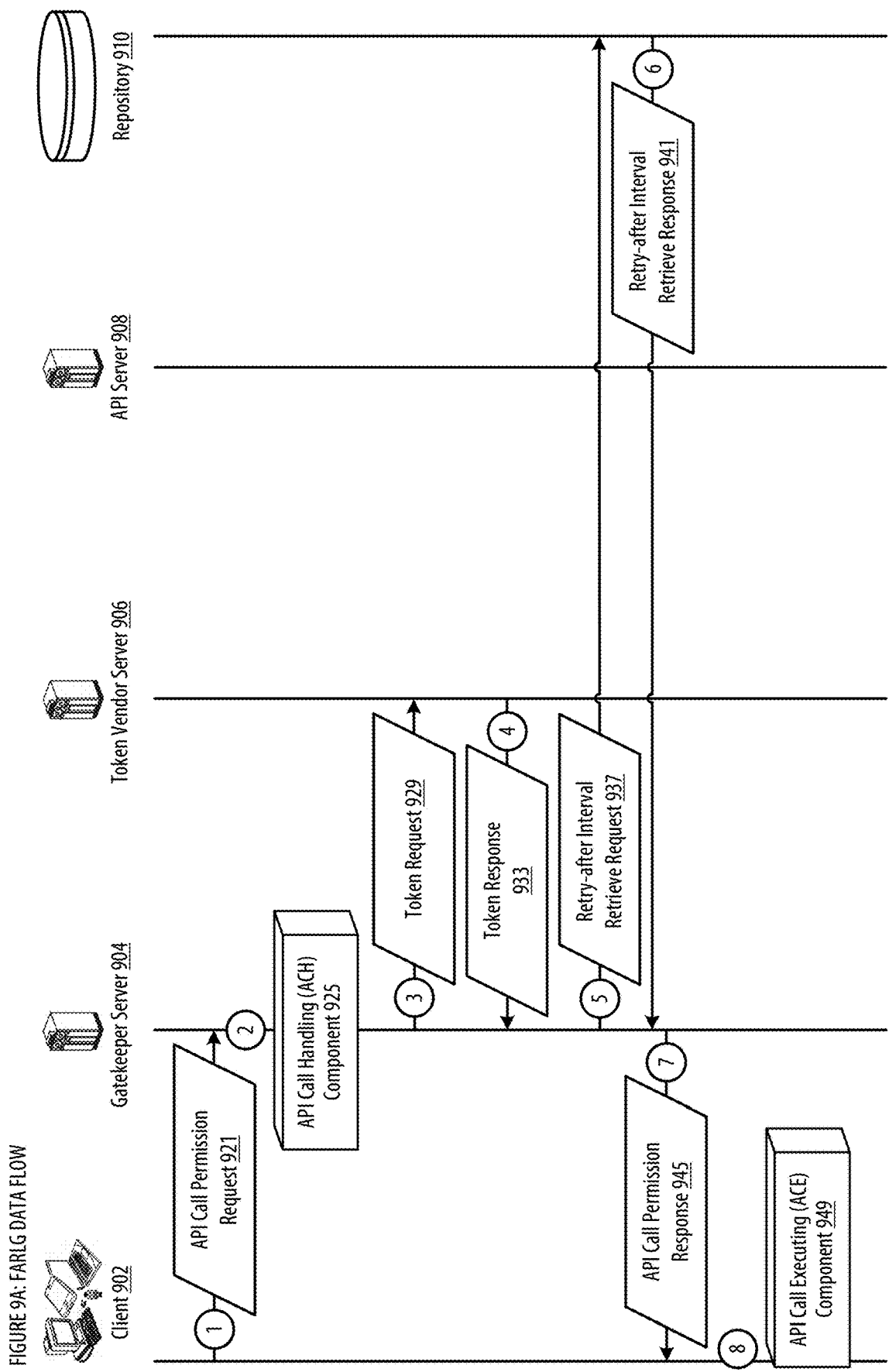

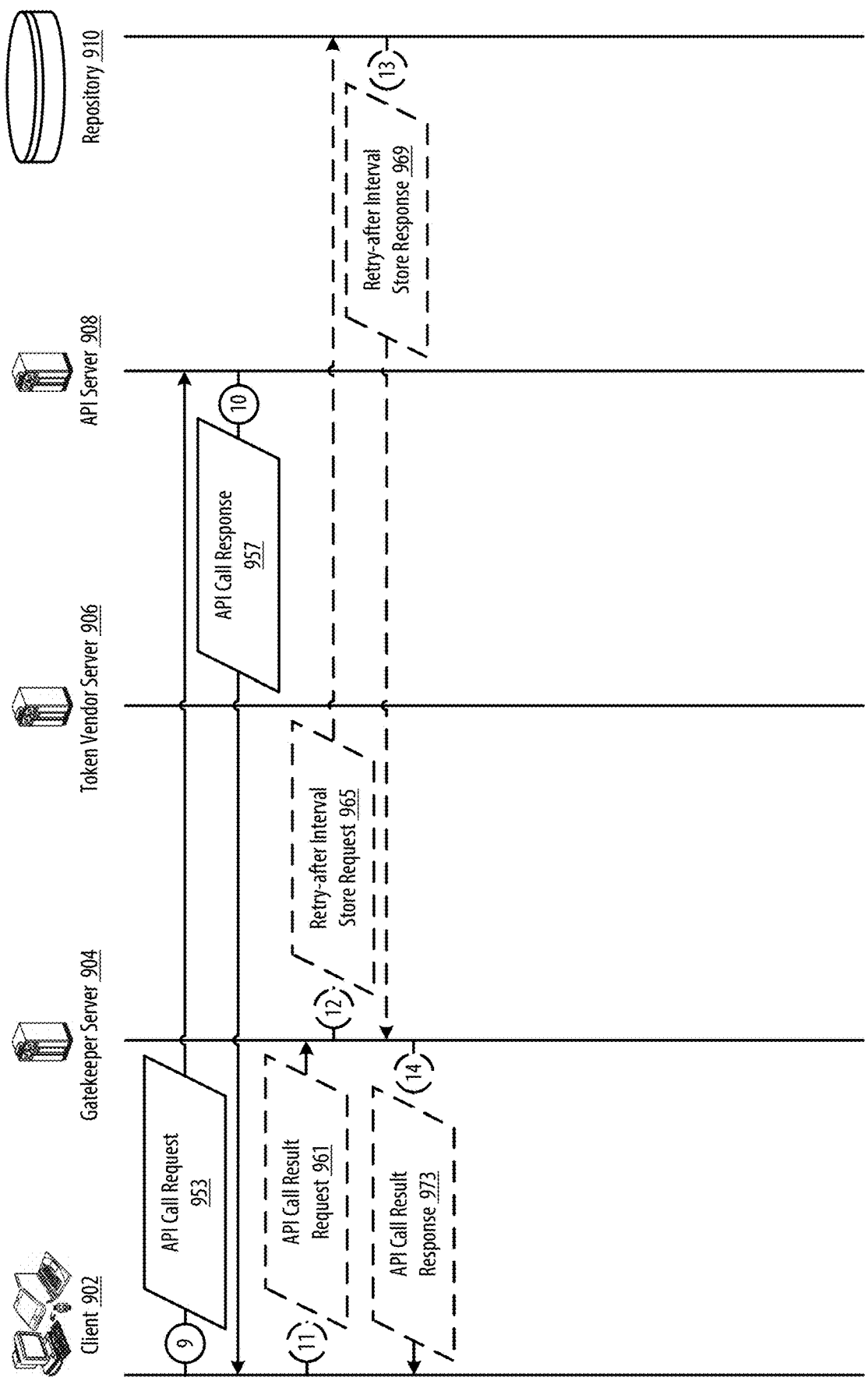

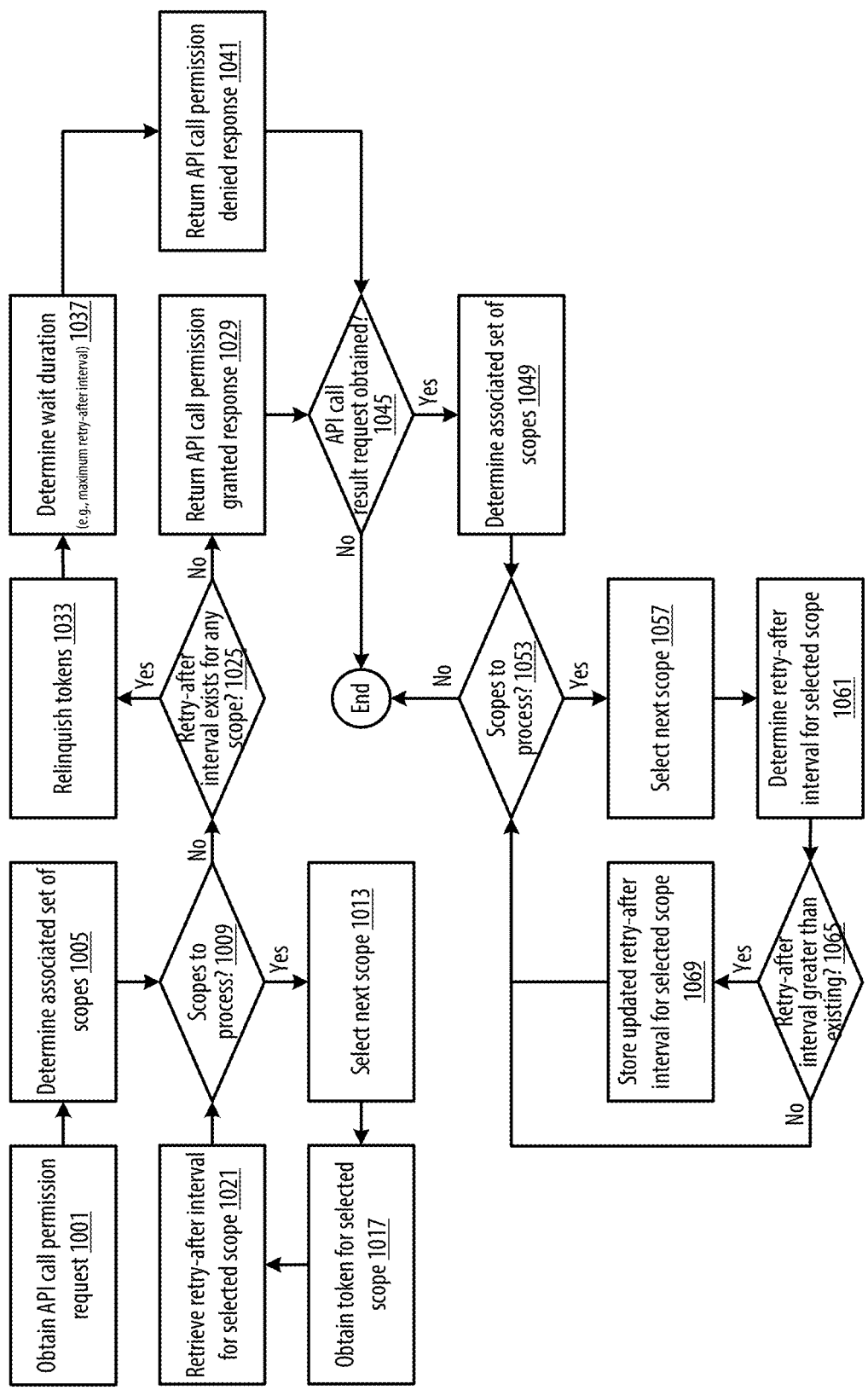
FIGURE 10: FARLG ACH COMPONENT

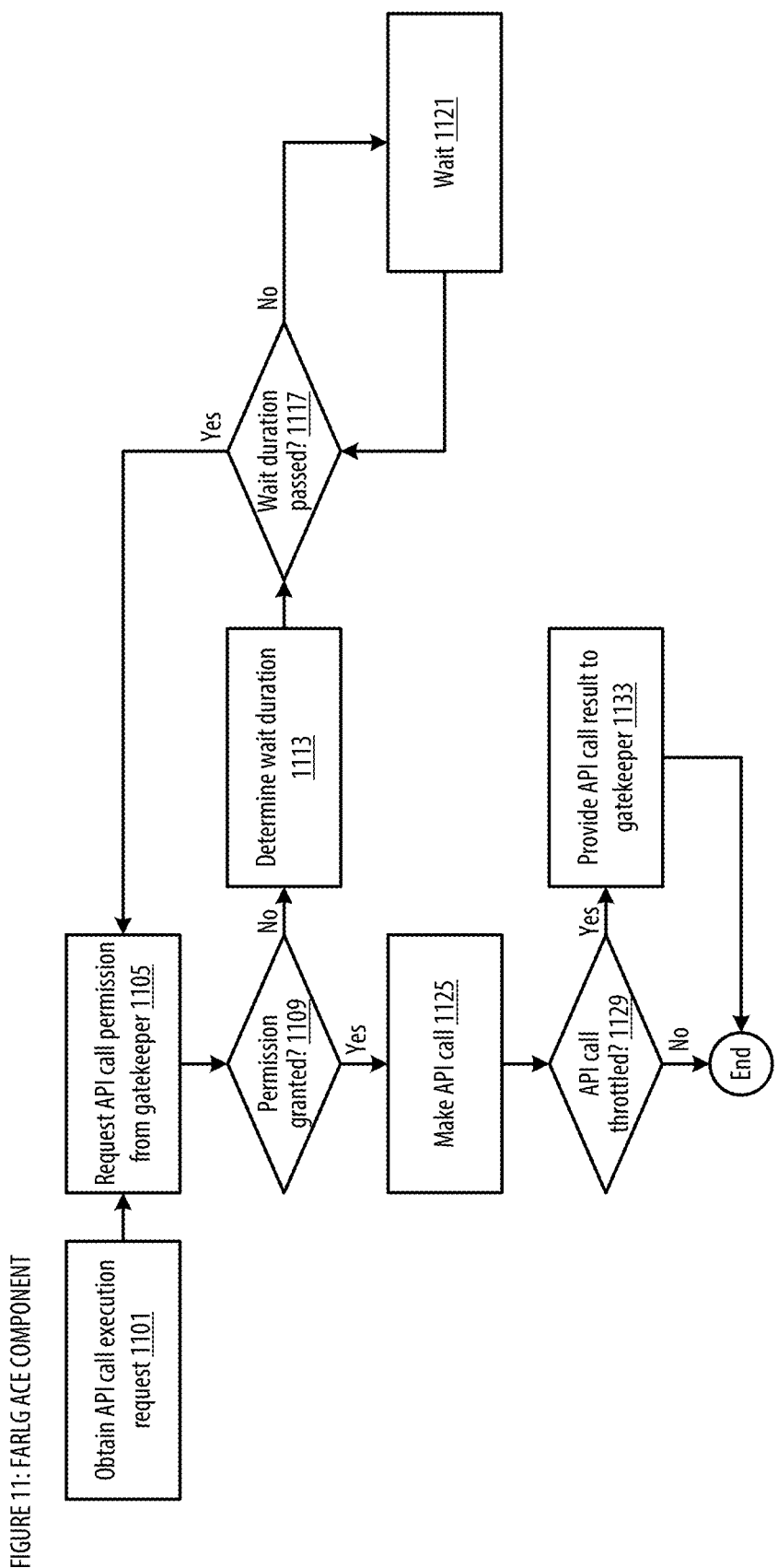

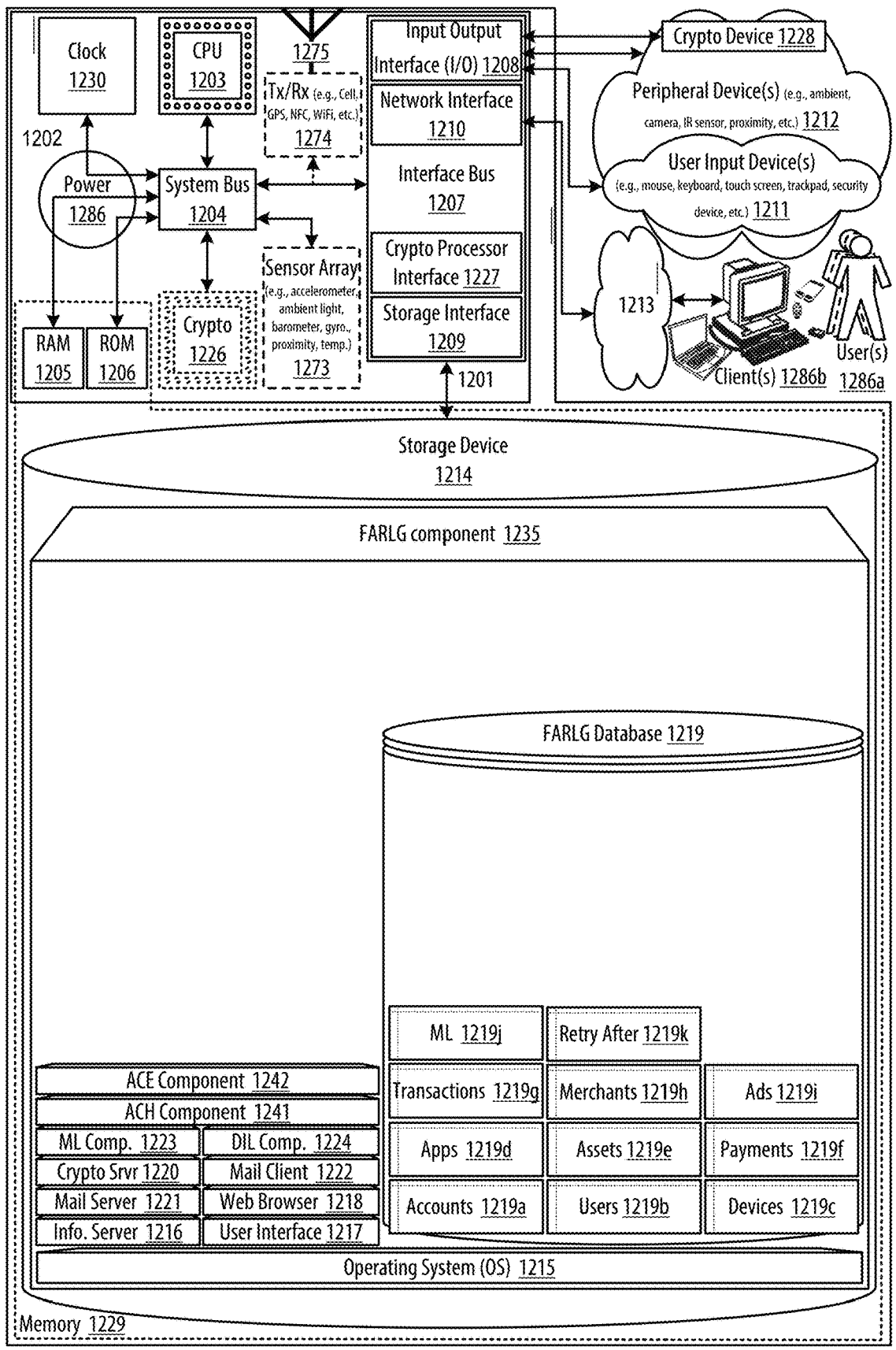
FIGURE 12: FARLG Controller

FLEETWIDE ADAPTIVE RATE LIMITING GATEKEEPER APPARATUSES, PROCESSES AND SYSTEMS This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations generally address backup systems, and more particularly, include Fleetwide Adaptive Rate Limiting Gatekeeper Apparatuses, Processes and Systems.

However, in order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. § 112.

BACKGROUND

Computer system backups are utilized to protect data from being lost due to equipment failures, malware and accidental deletions. A backup may involve copying files to be backed up from one location to another location. For example, files may be copied from a solid-state drive in a user's desktop to an external hard drive that may be connected to the user's desktop via USB. Software as a service (SaaS) is a way to deliver cloud-based applications over a network (e.g., Internet). Examples of SaaS services include Microsoft 365 (e.g., OneDrive, Teams, SharePoint, Office 365) and Google Workspace (e.g., Gmail, Calendar, Meet, Chat, Drive, Docs, Sheets, Slides, Forms, Sites).

BRIEF DESCRIPTION OF THE DRAWINGS

Appendices and/or drawings illustrating various, non-limiting, example, innovative aspects of the Fleetwide Adaptive Rate Limiting Gatekeeper Apparatuses, Processes and Systems (hereinafter "FARLG") disclosure, include:

FIGS. 1A-D show non-limiting, example embodiments of implementation case(s) for the FARLG;

FIGS. 2A-D show non-limiting, example embodiments of implementation case(s) for the FARLG;

FIGS. 3A-B show non-limiting, example embodiments of an architecture for the FARLG;

FIG. 4 shows non-limiting, example embodiments of an architecture for the FARLG;

FIGS. 5A-D show non-limiting, example embodiments of an architecture for the FARLG;

FIGS. 6A-B show non-limiting, example embodiments of an architecture for the FARLG;

FIGS. 7A-D show non-limiting, example embodiments of implementation case(s) for the FARLG;

FIG. 8 shows non-limiting, example embodiments of screenshots illustrating test results for the FARLG;

FIGS. 9A-B show non-limiting, example embodiments of a datagraph illustrating data flow(s) for the FARLG;

FIG. 10 shows non-limiting, example embodiments of a logic flow illustrating an API call handling (ACH) component for the FARLG;

FIG. 11 shows non-limiting, example embodiments of a logic flow illustrating an API call executing (ACE) component for the FARLG;

FIG. 12 shows a block diagram illustrating non-limiting, example embodiments of a FARLG controller;

APPENDIX 1 illustrates embodiments of the FARLG.

Generally, the leading number of each citation number within the drawings indicates the figure in which that citation number is introduced and/or detailed. As such, a detailed discussion of citation number 101 would be found and/or introduced in FIG. 1. Citation number 201 is introduced in FIG. 2, etc. Any citations and/or reference numbers are not necessarily sequences but rather just example orders that may be rearranged and other orders are contemplated. Citation number suffixes may indicate that an earlier introduced item has been re-referenced in the context of a later figure and may indicate the same item, evolved/modified version of the earlier introduced item, etc., e.g., server 199 of FIG. 1 may be a similar server 299 of FIG. 2 in the same and/or new context.

DETAILED DESCRIPTION

The Fleetwide Adaptive Rate Limiting Gatekeeper Apparatuses, Processes and Systems (hereinafter "FARLG") transforms API call permission request, API call result request datastructure/inputs, via FARLG components (e.g., ACH, ACE, etc. components), into API call permission response, API call result response outputs. The FARLG components, in various embodiments, implement advantageous features as set forth below.

Introduction

The FARLG provides unconventional features (e.g., determining whether a client with a given scope is allowed to make an API call to a SaaS service using a unified view of the retry-after values for each scope) that were never before available in backup systems.

Services that provide APIs (e.g., SaaS services) use rate limits to protect the services from excessive resource usage. While some APIs publish their rate limits, certain APIs such as Microsoft SharePoint API use dynamic rate limits that change based on various criteria like, for example, current overall resource usage. For some of these APIs, the overall resource usage includes requests from non-FARLG applications for the same tenant.

When API clients exceed the rate limit, these APIs throttle those requests, and return a retry-after header. The retry-after header may contain a retry-after interval. The APIs expect the client to repeat the request after the retry-after interval if it exists. If a retry-after interval does not exist, then the APIs expect the client to use a heuristic, for example—exponential backoff with jitter, to determine a retry-after interval. If the client calls the API within the retry-after interval, APIs like the Microsoft SharePoint API may apply punitive throttles, where they return a longer retry-after interval.

In some backup systems (e.g., providing SaaS Protection), the client of an API runs on compute instances, called nodes. The clients make concurrent API requests for the same tenant. If a request from one of the clients on one of the nodes gets throttled, other clients on the same or other nodes may continue to make requests within the retry-after interval. This will result in further throttled requests. The result is that requests do not succeed and progress on the work that requires the API call stalls. An example of this is remote seat discovery of seats for SaaS Protection to backup. In the problem scenario, seat discovery does not complete, customer seats don't get discovered, which means they won't get backed up. This leads to disgruntled customers and the potential for data loss. Metaphorically, this is a problem of "the left hand does not know what the right hand is doing".

In one embodiment, a customer, who is the tenant from the APIs point of view, may be confined to one node. Therefore, the problem due to the concurrent nodes does not occur, though the problem due to concurrent API calls may still exist (albeit to a smaller degree). In the cases where the requests do get throttled, an application could use an exponential backoff strategy to retry the requests. In another embodiment, applications may use horizontally scaled nodes that send requests concurrently to process larger customers than was possible with a single node.

In one embodiment, a gatekeeper component may be utilized to facilitate fleetwide adaptive rate limiting as follows:

1. A central component, called the gatekeeper, to gate requests to the API.
2. A client of the API, which runs on one of the concurrent compute instances, sends scope information to obtain permission from the gatekeeper to make the API call. The scope may include, but is not limited to information like the endpoint for the API call, app ID, and tenant ID.
3. The gatekeeper uses a token vendor, which provides a token after a delay, and then uses the scope information to determine whether to allow the call or respond with a retry-after value that specifies the amount of time the client should wait before it asks for permission again.
4. If the client receives a response with a retry-after value, then the client waits for at least that duration before it repeats element 3.
5. If the client receives permission to make the API call, then it proceeds to make the call.
6. If API throttles the request, then the client sends that result to the gatekeeper, which the gatekeeper uses to determine a scope and retry-after value based on the parameters passed to the gatekeeper. The client then goes back to element 2 for this same API call.
7. If the API call succeeds, then the client proceeds to whatever the next step is that uses the response.

The gatekeeper tracks retry-after values from compute instances that concurrently make API requests. This enables a unified view of the retry-after values for each scope. When the client on a compute instance with a given scope requests permission to make a call, the gatekeeper is now able to use the results it received from the compute instances to determine whether the client with the given scope is allowed to make a call. This solves the problem of "the left hand does not know what the right hand is doing".

In some alternative embodiments, the token bucket algorithm may be utilized to deal with the rate-limiting of distributed clients. While this works in the case of APIs with published rate limits, it does not work for the APIs with dynamic rate limits, for example the Microsoft SharePoint API.

FARLG

Customers expect a backup application to discover and back up new seats quickly.

0029.1. Ex: Discovering Microsoft SharePoint Sites (seats) for "Susan's IT"

For example, for a SaaS provider's (e.g., Microsoft's) customers, the SaaS provider's API may be used to discover their seats.

Nightly seat discovery can fail if the SaaS provider's API throttles the backup application.

This may happen because:
0032.1. API calls throttle requests:
   0032.1.1. HTTP: 429 Too Many Requests, 503 Service Unavailable
   0032.1.2. Retry-After header: time interval (e.g., number of seconds) until the backup application can query the API
0032.2. Throttling can happen for:
   0032.2.1. Individual endpoints
   0032.2.2. Tenants
   0032.2.3. Application as a whole
0032.3. Different reasons for throttling:
   0032.3.1. The backup application sends too many concurrent requests
   0032.3.2. Other, badly behaved competing applications
   0032.3.3. Overall load on the SaaS provider's servers
0032.4. Some APIs have published rate limits.
0032.5. Other APIs, such as Microsoft SharePoint, have dynamic rate limits that the SaaS provider does not publish.
   0032.5.1. Retry-After values are dynamically computed
   0032.5.2. Continuing to hit the SaaS provider's APIs in a retry-after window results in more punitive retry-after values that have longer delays Overview of the problem in one embodiment:
0033.1. Concurrent compute instances hit the SaaS provider's APIs
0033.2. Tenants not restricted to single instance FIGS. 1A-D show non-limiting, example embodiments of implementation case(s) for the FARLG. In FIGS. 1A-D, screen 101 shows an implementation case in which a single client makes a request to an API Endpoint. An API stands for Application Programming Interface. It is a software intermediary that allows two applications to talk to each other. For example, Microsoft Graph API, Google People API. An API Endpoint may be a uniform resource locator (URL) that provides the location of a resource on a server. For example, a URL may specify a Microsoft Graph Endpoint to access the authenticated users email messages. A client makes requests to endpoints of the API to satisfy the needs of the application the client is a part of. For example, an APIClient in an application that runs on a SaaS Protection node.

Screen 105 shows an implementation case in which the client makes a request to an API Endpoint and does not exceed rate-limits imposed by an API. A rate-limit may be a limit on the rate at which clients can make requests to the API imposed by the API to protect server resources. The rate-limits can vary by scope. In the context of rate-limits, scope is the granularity at which the API applies the rate-limits. For example, app rate-limits applies to calls made from a single application, while tenant rate-limits apply to calls made to access the resources of a single tenant. In this implementation case, when the client makes requests to the API at a rate less than the rate-limit, the API processes the request and the API returns a non-throttled response.

Screen 110 shows an implementation case in which the client makes a request to an API Endpoint and exceeds rate-limits imposed by the API. In this implementation case, when the client makes requests to the API at a rate more than the rate-limit, the API throttles the request and the API returns a throttled response. The response contains a retry-after header and the retry-after header may contain a retry-after interval and/or scopes.

Screen 115 shows an implementation case in which the client heeds the retry-after interval specified in the previous throttled response from the API. In this implementation case, when the client waits longer than the duration specified by the retry-after header and makes the next request to the API, the API processes the request and the API returns a non-throttled response.

Screen 120 shows an implementation case in which the client does not heed the retry-after interval specified in the previous throttled response from the API and the API throttles the next request harder. In this implementation case, when the client makes the next request within the time interval specified by the retry-after header, the API throttles the request and the response contains a retry-after header. The retry-after header has an interval longer than the retry-after interval in the previous throttled response.

FIGS. 2A-D show non-limiting, example embodiments of implementation case(s) for the FARLG. In FIGS. 2A-D, screen 201 shows an implementation case in which multiple clients make concurrent requests to an API Endpoint. In one embodiment, concurrent requests may be requests made by multiple clients to the same API Endpoint independent of each other. It is to be understood that in this embodiment concurrent requests do not have to occur at the same instant of time, though they may occur at the same instant of time.

Screen 205 shows an implementation case in which multiple concurrent clients (e.g., 3 clients) make requests to an API Endpoint and do not exceed rate-limits imposed by an API. In this implementation case, when the clients concurrently make requests to the API at a rate less than the rate-limit, the API processes the request and the API returns non-throttled responses to the clients.

Screen 210 shows an implementation case in which multiple concurrent clients (e.g., 3 clients) make requests to an API Endpoint and together exceed rate-limits imposed by an API. In this implementation case, when the clients concurrently make requests to the API and the combination of the requests exceeds the rate-limit imposed by the API, the API throttles the request that exceeded the rate-limit (e.g., request from client 3) and the API returns a throttled response. The response contains a retry-after header and the retry-after header may contain a retry-after interval and/or scopes.

Screen 215 shows an implementation case in which, when the API throttles the request from one client, other clients are not aware of the throttled request and call within the retry-after interval and the API throttles the next request harder. In this implementation case, when one client (e.g., client 3) exceeded the rate-limit and the API throttled the request from that client and returned a throttled response with a retry-after header, another client (e.g., client 1) may make the next request within the time interval specified by the retry-after header. The API then throttles the request from that other client (e.g., client 1) and the response contains a retry-after header. The retry-after header has an interval longer than the retry-after interval in the previous throttled response. The scenario remains the same or is usually worse if the API does not publish a rate-limit and/or the API uses a dynamic rate-limit. Clients do not know the retry-after values that the API returned for the other clients. This results in a vicious cycle that the clients may not be able to recover from and progress on the clients stalls.

FIGS. 3A-B show non-limiting, example embodiments of an architecture for the FARLG. In FIGS. 3A-B, embodiments of how a gatekeeper component may be utilized to minimize the risk that an API will throttle clients' requests are illustrated. In one embodiment, the gatekeeper provides an API that allows clients to synchronously request permission to make API requests, clients make the API requests themselves, and clients synchronously communicate some or all of the results of those API requests to the gatekeeper. Screen 301 shows the component relationships between the multiple clients, the gatekeeper, and the API and the flow of a single client request that uses this alternative embodiment. In this embodiment, clients communicate throttled responses to the gatekeeper. Throttled responses may include, but are not limited to:

0043.1. A throttled response may be represented by a 429 TOO MANY REQUESTS. The response may include a retry-after header.

0043.2. Other implementations may use 503 SERVICE UNAVAILABLE to indicate that a server is not available to handle the request, which may be due to an overloaded server.

In another embodiment, the gatekeeper provides an API that allows clients to request permission and provide a callback for the gatekeeper to call when it is ready to permit the client to make the API request, the gatekeeper uses the callback to let clients know when they are permitted to make the API requests themselves, and clients asynchronously communicate some or all of the results of those API requests to the gatekeeper. Screen 301 shows the component relationships between the multiple clients, the gatekeeper, and the API and the flow of a single client request that uses this alternative embodiment.

In another embodiment, the gatekeeper provides an API that allows clients to asynchronously submit details of the API request they want to make, the gatekeeper makes the API requests on behalf of the clients in a manner that mitigates the risk that the API will throttle the request, and the gatekeeper asynchronously sends responses back to the client Screen 305 shows the component relationships between the multiple clients, the gatekeeper, and the API and the flow of a single client request that uses this alternative embodiment.

In some embodiments, the gatekeeper and a client may communicate asynchronously through queues that may be durable.

FIG. 4 shows non-limiting, example embodiments of an architecture for the FARLG. In FIG. 4, an embodiment of how a gatekeeper component may be implemented is illustrated. The gatekeeper component may be used by clients to gate requests to an API so that the clients can adhere to rate-limits and retry-after guidance, and prevent occurrences of the vicious cycle where requests repeatedly violate rate-limits. In various implementations, the gatekeeper component may utilize the following components:

0047.1. Token Vendor—The component that the gatekeeper uses to proactively ensure that requests adhere to published, configured, or inferred rate limits. The gatekeeper may use different logical or physical token vendors per scope.

0047.1.1. To scale the token vendor independent of the gatekeeper, the token vendor may be a separate component that the gatekeeper depends on. (See FIGS. 5A-D, screens 501, 505, 520, 525)

0047.1.2. Alternatively, the token vendor may be part of the gatekeeper (See FIGS. 5A-D, screens 510, 515, 530, 535)

0047.2. Scope—A combination of parameters that define a unique context applying to a client request. The gatekeeper may gate requests based on the scope of the request
  0047.2.1. The following are parameters that may be present for multi-tenant APIs:
    0047.2.1.1. appID—The Application ID, which is, for example, a (e.g., one-time) unique identifier that the client application obtains from the API and identifies the client application to the API.
    0047.2.1.2. tenantID—The ID for the tenant whose data the client wants to access through the API.
  0047.2.2. Other examples of parameters may include, but are not limited to:
    0047.2.2.1. userID—The ID for the user on whose behalf the client makes the API requests.
    0047.2.2.2. resourceID—The ID of the resource that the client wants to access.
0047.3. Storage Alternatives
  0047.3.1. The gatekeeper may use a durable message queue, like RabbitMQ, to buffer the results from the clients. (See FIGS. 5A-D, screens 501, 510, 520, 530)
  0047.3.2. Alternatively, the gatekeeper can choose to use a design that allows it to keep up with client requests and not use a durable queue to buffer client requests. (See FIGS. 5A-D, screens 505, 515, 525, 535). One example, among other possibilities, of a design that allows the gatekeeper to keep up with client requests is through the use of goroutines in Golang and the ability to scale horizontally.

FIGS. 5A-D show non-limiting, example embodiments of an architecture for the FARLG. In FIGS. 5A-D, embodiments of how components may be structured to implement the FARLG are illustrated. Screens 501, 505, 510, 515 show implementations in which a client interacts with a gatekeeper and an API. Screens 520, 525, 530, 535 show implementations in which a client interacts with a gatekeeper and the gatekeeper interact with an API.

FIGS. 6A-B show non-limiting, example embodiments of an architecture for the FARLG. In FIGS. 6A-B, embodiments of how a gatekeeper component may operate are illustrated. In one implementation, the gatekeeper component provides an API that clients use to interact with the gatekeeper. For example, the API may have the following endpoints:
  0049.1. POST /permission—Clients use this endpoint to obtain permission to make API requests. Clients should provide an appID and a tenantID. Clients may provide other scope parameters as available.
  0049.2. POST /results—Clients use this endpoint to communicate results to the gatekeeper. Examples of when a client makes a request to this endpoint and what it sends in those cases may include, but are not limited to:
    0049.2.1. If the API throttles the client request to the API and the response from the API includes a retry-after header, then the client sends the scope of the request, the response status code, and the retry-after header, if present.
    0049.2.2. Clients should include the scope parameters from the request, the response, and the response header. Clients may include additional parameters.

In one implementation, first, a client makes a request to the /permission endpoint of the gatekeeper to determine if it can make a request to the API:
  0050.1. First, the /permission endpoint uses the application token vendor for the given appID to obtain a token. The token vendor generates tokens at the application rate-limit and provides a token when one becomes available. The purpose of the token vendor is to proactively delay calls to the API so that the client does not exceed the API rate limits (e.g., for the application scope).
  0050.2. Next, the /permission endpoint uses the tenant token vendor for the given tenantID to obtain another token. This token vendor generates tokens at the tenant rate-limit and provides a token when one becomes available. The purpose of the token vendor is to proactively delay calls to the API so that the client does not exceed the API rate limits (e.g., for the tenant scope).
  0050.3. Next, the /permission endpoint checks with a retry-after custodian to see if there are any retry-after values stored for the scope of this request:
    0050.3.1. If the retry-after custodian responds that there is no retry-after value for this scope (e.g., application and/or tenant), then the permissions endpoint responds with 200 OK HTTP Status Code and a body that states that the client is permitted to make the API request. Examples responses may include, but are not limited to:
      0050.3.1.1. A single string "Permitted"
      0050.3.1.2. An object that indicates that the client is permitted to make the API request and any additional details that the permissions endpoint wishes to communicate to the client.
    0050.3.2. If the retry-after custodian responds with a retry-after value for this scope, then example responses may include, but are not limited to:
      0050.3.2.1. 429 TOO MANY REQUESTS with a retry-after header that contains the retry-after value that the client should wait for before it makes a request to /permission endpoint again.
      0050.3.2.2. 200 OK with a body that indicates that the client is not permitted to make the API request along with the duration that the client should wait before it makes the request to /permission endpoint again. An example of such a body may be:

| 0050.3.2.2.1. | { |
| 0050.3.2.2.2. | "permitted": false, |
| 0050.3.2.2.3. | "check-after": 30s |
| 0050.3.2.2.4. | } |

Then, the client chooses the code path based on the result from the /permission endpoint:
  0051.1. If the /permission endpoint does not permit the client to make the API request immediately and returns a duration that the client should wait before it calls the /permission endpoint again to ask for permission to make the API call, then the client may choose whatever mechanism is available (e.g., a retry timer) to make the next request to the /permission endpoint past the specified wait duration.
  0051.2. If the /permission endpoint permits the client to make the API request, the client makes the API request.

Then, the client chooses from one of the alternatives below based on the response from the API:
  0052.1. API request fails. The client chooses one of the alternatives that may include but are not limited to:
    0052.1.1. If the API returns a throttled response, then the client makes a request to the gatekeeper's /results endpoint with a payload such as for example: (1) the scope information provided to the /permission endpoint, (2) the error code in the throttled response, (3) the retry-after header from the response, if present, (4) scope information from the response, if present, and/or the like. In some implementations, a default throttle scope (e.g., tenant) may be assumed. Other implementations may choose different payloads to the /results endpoint. In some implementations, if the throttled response does not include a retry-after header, the retry-after custodian may calculate a retry-after value to provide to clients.

0052.1.2. If API returns another failure response (e.g., unrelated to throttling), the client has further alternatives that may include but are not limited to:

0052.1.2.1. Proceed along the code path that the client would use to handle API responses that does not include the gatekeeper.

0052.1.2.2. Send failure responses to the gatekeeper's /results endpoint. The Gatekeeper may use these to provide other ways to gate the client permission to make API requests.

0052.2. API request succeeds. The client chooses from one of the alternatives that may include but are not limited to:

0052.2.1. The client proceeds along the same code path that it would have taken in the case of a successful API response, even if the gatekeeper did not exist.

0052.2.2. Send responses, which may include successes and/or failures, to the gatekeeper's /results endpoint. The gatekeeper may use these to provide other information or modes of operation. Examples may include, but are not limited to:

0052.2.2.1. Monitoring 0052.2.2.2. Reporting 0052.3. Description of /results endpoint:

0052.3.1. If the client provided retry-after information to this endpoint, then the /results endpoint requests the retry-after custodian to set the retry-after value for the given scope.

0052.3.2. If the client does not provide retry-after information (e.g., because the API did not provide a retry-after header in its response), then the /results endpoint requests the retry-after custodian to calculate and/or update the retry-after value for this scope. In some implementations, the retry-after custodian may provide multiple options for how it calculates and/or updates the retry-after value in the cases where the client does not provide a retry-after value and allows the /results endpoint to choose from one of those options.

API-Request Scopes

APIs, such as Microsoft Graph API, allow a client to make requests that interact with multiple services (e.g., Microsoft Teams, Outlook, OneNote). Each API might impose its own rate-limit.

Moreover, a separate rate-limit might apply to requests made on behalf of a specific application. Still another rate-limit might apply to requests made by a specific tenant, and another to requests made for a specific resource, such as a OneNote notebook or an Outlook email.

Therefore, the API might evaluate any request against multiple rate-limits, and return a throttle response if the request exceeds any of the rate-limits. Other factors may also affect the rate-limit for a given request, such as the request type (e.g., GET, POST, PATCH). Collectively, these factors and/or properties may be referred to as scopes. It is to be understood that any given request may be associated with multiple scopes.

An API (e.g., Microsoft) may deny a request based on any of a number of factors or "scopes" associated with the request. Common scopes may include, but are not limited to:

0058.1. the client application (e.g., registered with the API) that makes the request (e.g., a backup application).

0058.2. the tenant on whose behalf the system makes the request. A tenant may be an entity, such as a company or business, or it could be, for example, the Microsoft 365 organization where the application is installed.

0058.3. the resource that the request reads or modifies or affects (e.g., interacts with) in some other way. This could be, for example, a specific OneNote Notebook, Outlook Email, SharePoint Site, and/or the like.

0058.4. the operation or method that the request performs on the resource (e.g., read/GET, update/PATCH, create/POST, remove/DELETE, and/or the like).

0058.5. the API-Type the request accesses (e.g., Microsoft Graph API).

0058.6. the specific endpoint that the system made the request to (e.g., <tenant>.sharepoint.com, graph.microsoft.com/sites, graph.micrososft.com/teams).

0058.7. the specific provider service involved (e.g., Microsoft SharePoint, OneDrive, Exchange, Outlook, and/or the like).

0058.8. the user on whose behalf the system made the request.

In one implementation, the gatekeeper component may determine the scope(s) associated with a given API request in two distinct contexts:

0059.1. In the /permission endpoint, the gatekeeper may determine the full set of scopes associated with an API request, before it is sent to the API. The API may have previously imposed a retry-after interval in any of the applicable scopes. In order that the request does not violate that retry-after interval, the system should delay that request until the interval has expired for the scopes associated with the request.

0059.2. In the /result endpoint, when the API throttles a request because it exceeded rate-limits, the gatekeeper may determine which scope (or scopes) triggered the throttled response.

Determination of Request Scopes in the /Permission Endpoint

In the /permission endpoint, the gatekeeper determines the full set of scopes associated with an API request. There are multiple alternative ways to do this. These may include, but are not limited to:

0061.1. When a client makes a request to the /permission endpoint of the gatekeeper, the client indicates the HTTP METHOD (GET, POST, etc.), Tenant ID, Application ID, and API-Type ID of the intended API request. The gatekeeper then uses the METHOD to determine the operation scope (e.g., read, write). The gatekeeper uses other properties to determine the tenant, application, and API-Type scopes respectively.

0061.2. Alternatively (or in addition to the above), the client provides a list of applicable scopes and their values for the request. The client may provide these in a number of alternate formats, which may include, but are not limited to: an array of key-value pairs in which a key indicates the scope. For example:

0061.2.1. A JSON object in which the keys indicate the scope-name and the values indicate the scope-value, e.g.:

0061.2.2. {"tenant": 1234, "application": "backup-SaaS-protection", "operation": "read", "service": "SharePoint" }

0061.2.3. A JSON array of objects, in which each object represents one scope, e.g.:

0061.2.4. [{"scope": "tenant", "value": 1234}, {"scope": "application", "value": "backup-SaaS-protection", . . . ]

0061.2.5. In either case, the body of the /permission request includes the JSON data.

0061.3. Alternatively (or in addition to the above), the client includes the target URL path of the intended API request in the body of the /permission request. The gatekeeper uses this path to infer the scopes associated with the request. For example, it may determine the target resource, service, API-Type, and endpoint from the path.

Determination of Request Scopes in the /Result Endpoint:

In the /result endpoint, the gatekeeper determines the scope (or scopes) that cause the API to throttle a request to the API. The gatekeeper uses one or more methods, which may include, but are not limited to:

0063.1. Parse the response-headers from the API, included in the payload for /result request, to find headers such as x-ms-throttle-scope that directly indicate the scope under which the request was throttled.

0063.2. In the absence of any header or other indication of scope from the API, assume a default scope. For example, the tenant on whose behalf the system made the request.

0063.3. Use a heuristic algorithm in combination with monitoring to determine which of the applicable scopes were under heavy load at the time the API throttled the request.

Retry-After Custodian Component

In one embodiment, the gatekeeper uses the retry-after custodian to determine if there was any retry-after value for a given set of scopes due to a throttled response for that scope from the API.

The retry-after custodian provides an interface to store and retrieve retry-after intervals for each "scope" associated with a given client request. In one implementation, the retry-after custodian may have the following functions: GetRetryAfter and SetRetryAfter which may be called by the gatekeeper to retrieve and store the retry-after interval that applies to a given request, based on its associated scopes.

The gatekeeper calls GetRetryAfter when it processes the /permission request. The gatekeeper first determines the set of scopes associated with the API request. Then the gatekeeper passes the list of scopes to the retry-after custodian's GetRetryAfter function. GetRetryAfter retrieves the retry-after interval for each individual scope from persistent storage. GetRetryAfter then checks the retry-after value stored for each scope. If there is no value stored for a scope, GetRetryAfter uses 0 as the value for that scope. The reasons GetRetryAfter may not find a value stored for a scope may include: (1) the API did not previously return a throttled response for that scope, (2) the duration is past the retry-interval that corresponded to that scope and the storage expired as a result. If there is a value stored for that scope, then GetRetryAfter uses the stored value, which indicates the time that a request should wait before it reaches the API to minimize the risk that the API will throttle the request. Once GetRetryAfter reads the applicable retry-after interval for each scope, it returns the maximum interval across the scopes. This could be zero if the scopes returned zero.

Therefore, when GetRetryAfter returns zero, the gatekeeper knows that no retry-after interval is currently in effect for that request, and the request can proceed, unless prohibited by some other factor (e.g., unrelated to retry-after). When GetRetryAfter returns a (e.g., non-negative) non-zero value to the gatekeeper, that value indicates to the gatekeeper the time that a request should wait before it reaches the API to minimize the risk that the API will throttle the request.

The gatekeeper calls SetRetryAfter when it processes the /result endpoint when it determines that the intended API request returned a throttled response due to rate-limiting. In one implementation, the gatekeeper calls SetRetryAfter with the information below:

0069.1. API-Type—the name or ID of the API that caused the throttled response.

0069.2. Scope Name—the name of the scope for which the API throttled the request (e.g., "tenant", "application", "service", "resource", "user", and/or the like)

0069.3. Scope Value—the value of the scope that the API throttled. For example, if the Scope Name is "tenant", the Scope Value may be the ID (which could be a GUID or UUID) of the tenant that the API throttled.

0069.4. Retry-After Interval—This is the duration (e.g., number of seconds) that any client should wait before it makes another API request associated with the scope indicated by the Scope Name and Scope Value parameters. To determine this interval, the gatekeeper may use methods below that may include, but are not limited to:

0069.4.1. Parse the retry-after header that the API sent to the client (and which the client subsequently included in the /result request).

0069.4.2. Provide a default or minimum interval in the case that (A) the API did not provide an interval in the retry-after header, or (B) the retry-after header was not present or the retry-after header was unparseable, or (C) the interval specified by the API was lower than the default or minimum interval configured in the gatekeeper.

0069.4.3. Use an algorithm, such as exponential-backoff to determine the appropriate interval in the case that the API did not provide a retry-after header or the interval in the retry-after header was invalid for any of the reasons described above.

SetRetryAfter then proceeds to store the retry-after interval for the given combination of API-Type, Scope Name and Scope Value. In one implementation, the retry-after custodian does not overwrite an existing interval with a newer one that expires sooner than the existing one. For example, assume that two separate clients make requests to the API, and both requests are denied by the API under the same scope. The API responds to one of the clients with a retry-after interval of two seconds, and to the other client with a retry-after interval of ten seconds. If the retry-after custodian records the ten-second interval first, it should not overwrite that value with the two-second interval. Otherwise, the gatekeeper might allow clients to make requests in the same scope before the ten-second interval expires, and thus, the API may throttle the subsequent request. In one implementation, the retry-after custodian may facilitate this in the following way:

0070.1. Retry-after intervals may be stored as timestamps. An API might send a retry-after header that includes (A) a formatted Date-and-Time string or (B) a number of seconds to wait. In the former case, the retry-after custodian parses the Date/Time string directly to a timestamp. In the latter case, the retry-after custodian adds the specified number of seconds to the current time to produce a timestamp representing some time in the future. A timestamp could be represented in a number of ways that may include, but are not limited to:
0070.1.1. a UNIX timestamp
0070.1.2. a formatted date-and-time string
0070.1.3. a programming language or library's internal representation of a point-in-time in a (for example a Golang time.Time structure or a Java DateTime object. Internally these may be represented by a 64-bit integer or double-precision floating point number that indicates the number of seconds, milliseconds, or nanoseconds after a fixed point-in-time.
0070.2. When storing the timestamp, the retry-after custodian may instruct the storage engine to store the timestamp if it is greater than the existing timestamp for the given API-Type and scope.

Retry-After Interval Storage:

In order for multiple gatekeeper instances (e.g., in one implementation a gatekeeper instance may be utilized per application (Application ID)) to share information about retry-after intervals, in one implementation, the FARLG may use a separate data storage. The alternatives for this storage system may include, but are not limited to:
0072.1. Redis (or similar in-memory keyed data-structure store system). For example, the Redis in-memory data-structure store may be used and the Lua scripting feature of Redis may be utilized to perform atomic updates of stored retry-after intervals in a manner that guarantees that earlier timestamps will not overwrite later timestamps.
0072.2. A NoSQL database
0072.3. A custom web server that stores in-memory or persistent key-value pairs and supports atomic updates Token Vendor:

In order to reduce the probability that the API will throttle an API request, the gatekeeper, in one implementation, may use a token vendor to proactively rate-limit clients:
0074.1. The token vendor may be:
  0074.1.1. a component external to the gatekeeper. This may allow the token vendor to scale independently of the gatekeeper.
  0074.1.2. a component internal to the gatekeeper. The scale of the token vendor in this case may be bound by the scalability of the gatekeeper.
0074.2. The token vendor may use a token bucket algorithm to perform its responsibility.
0074.3. The token vendor may provide the ability for the gatekeeper to return a token that it obtained if it finds that the client is unable to use that token.
0074.4. The token vendor may provide the ability to specify different rate-limits for different scopes.
0074.5. The gatekeeper may use the token vendor to rate-limit clients at the application scope, at the tenant scope, and/or the like scopes.
0074.6. The token vendor may allow the rate at which it generates tokens, which may match the expected rate-limit for the clients, to be configurable per scope. There are multiple alternatives to set this configuration value, which may include, but are not limited to:
  0074.6.1. The token vendor may provide the ability to set this configuration as a static value.
  0074.6.2. The token vendor may provide the ability to set this configuration at run-time. Some examples for use cases for this ability may include, but are not limited to:
    0074.6.2.1. Allow an entity, which may include, but are not limited to: a human operator, another system, another service, and/or the like to update the rate-limit based on reasons that may include, but are not limited to:
      0074.6.2.1.1. The API vendor changes the published rate-limits for the API endpoint.
      0074.6.2.1.2. To prioritize requests for one scope over other scopes.
      0074.6.2.1.3. To prioritize one or more end-points over others.
      0074.6.2.1.4. To prioritize one or more applications over others.
      0074.6.2.1.5. To prioritize one or more tenants, clients, users, and/or the like over others (e.g., to provide a certain quality of service to tenants based on a subscribed to level of service, to penalize clients that repeatedly violate retry-after instructions from the gatekeeper).
    0074.6.2.2. Allow the gatekeeper to adjust the token vendor rate in response to dynamic rate-limiting. The mechanisms that the gatekeeper may use to compute the adjusted rate may include, but are not limited to:
      0074.6.2.2.1. Use the requests from clients, the results from clients, and possibly data from other sources, and employ machine learning algorithms to compute rate-limits and update the configured rate of the token vendor.
      0074.6.2.2.2. Propagate configuration changes made to it, either statically, dynamically, or by some other means, to the token vendor.

The token bucket algorithm is based on an analogy of a fixed capacity bucket into which tokens are added at a fixed rate. Before allowing an API to proceed, the bucket is inspected to see if it contains at least 1 token at that time. If so, one token is removed from the bucket, the API is allowed to proceed. In case there are no tokens available, the API is returned saying that the quota has exceeded during that window. There are various alternative ways to implement the token bucket algorithm, which may include, but are not limited to:
  0075.1. An in-process in-memory implementation, where the token vendor uses an in-memory data structure to represent the bucket.
  0075.2. An out-of-process in-memory component, where the token vendor uses another in-memory storage to represent the bucket. This out-of-process in-memory component may be, for example, Redis.

The token vendor may use the configured rate per scope to determine the rate at which the "bucket fills" for that scope. Accordingly, the rate for a token bucket instance may change if the token vendor implements a run-time configurable rate.

FIG. 7A-D show non-limiting, example embodiments of implementation case(s) for the FARLG. In FIGS. 7A-D, exemplary implementation cases in which the use of the gatekeeper component causes API calls to succeed even in the face of dynamic throttles are illustrated.

Screen 701 shows an implementation case in which an API publishes its rate-limits and concurrent clients use the gatekeeper to obtain permission to make API requests. The gatekeeper is available for clients to check for permission to call the API and the gatekeeper uses a token-vendor that uses the token bucket algorithm to generate tokens at a rate that matches the published API rate-limit. When each client requests permission from the gatekeeper, the gatekeeper uses a token-vendor to obtain a token and then responds that the client is permitted to make a request to the API. A client that the gatekeeper permits to make a request to the API does so. The API processes the request and returns a non-throttled response to the client.

Screen 705 shows an implementation case in which an API imposes a dynamic rate-limit and concurrent clients use the gatekeeper to obtain permission to make API requests. In the scenarios where the API does not publish the rate-limit, in one embodiment, the gatekeeper uses the standard token-bucket algorithm with a configured rate-limit to limit the rate at which the clients make the requests to the API. In another embodiment, the gatekeeper may configure the rate-limit based on previous retry-after values provided by clients. In another embodiment, the gatekeeper may use Machine Learning to determine the rate-limit. When each client requests permission from the gatekeeper, the gatekeeper uses a token-vendor to obtain a token and then responds that the client is permitted to make a request to the API. A client that the gatekeeper permits to make a request to the API does so. In this implementation case, when the configured rate at which the token-vendor provides tokens is less than the current dynamic API rate-limit, the API processes the request and the API returns a non-throttled response to the client.

Screens 710A-B show an implementation case in which an API imposes a dynamic rate-limit and concurrent clients use the gatekeeper to obtain permission to make API requests. When each client requests permission from the gatekeeper, the gatekeeper uses a token-vendor to obtain a token and then responds that the client is permitted to make a request to the API. A client that the gatekeeper permits to make a request to the API does so. In this implementation case, when the configured rate at which the token-vendor provides tokens is greater than the current dynamic API rate-limit, the API throttles the request and the API returns a throttled response. The response contains a retry-after header and the retry-after header may contain a retry-after interval and/or scopes. The client whose request the API throttled sends the retry-after value provided in the response to the gatekeeper, so that the gatekeeper can use it to respond correctly to future permission requests. For example, the client may send the throttled response and/or the retry-after header to the gatekeeper, and the gatekeeper may store the retry-after value. For the sake of simplicity and to reduce clutter, the scenarios and diagrams do not include scope. In various implementations, scope may be used in the permission requests to the gatekeeper, when the gatekeeper stores the retry-after values, in how the gatekeeper determines the interval that a client should wait before it makes a permission request again, and/or the like. If the retry-after header does not include a scope, the gatekeeper may use a default scope (e.g., tenant scope). When the gatekeeper has a stored retry-after value and a client requests the gatekeeper's permission to make an API request, the gatekeeper responds that the client is not permitted to make the call and the client should wait at least the retry-after interval before it requests permission again. When the client waits for the duration that the gatekeeper specified to ask for permission again, the gatekeeper permits the client to make the API request. The request succeeds and the API returns a non-throttled response to the client.

FIG. 8 shows non-limiting, example embodiments of screenshots illustrating test results for the FARLG. In FIG. 8, test results showing how the use of the FARLG improves API request throughput are illustrated. Screen 801 shows test results for a single threaded client with an API server limit of 10 requests per second and 1000 requests total without using the gatekeeper component. During this test, 199 requests were completed and the rest aborted after 20 minutes due to API throttling. Screen 810 shows test results for a single threaded client with an API server limit of 10 requests per second and 1000 requests total using the gatekeeper component. During this test, all 1000 requests were completed in 1 minute and 40 seconds.

Screen 820 shows test results for a multi-threaded client with an API server limit of 10 requests per second and 6000 requests total without using the gatekeeper component. During this test, 10 requests were completed and the rest aborted after 20 minutes due to API throttling. Screen 830 shows test results for a multi-threaded client with an API server limit of 10 requests per second and 6000 requests total using the gatekeeper component. During this test, all 1000 requests were completed in 16 minutes and 40 seconds.

FIGS. 9A-B show non-limiting, example embodiments of a datagraph illustrating data flow(s) for the FARLG. In FIGS. 9A-B, dashed lines indicate data flow elements that may be more likely to be optional. In FIGS. 9A-B, a client 902 (e.g., of a user, of a tenant) may send an API call permission request 921 to a gatekeeper server 904 to request permission for an application to call an API (e.g., of a SaaS service). For example, the client may be a compute instance, a virtual machine instance, a server, a desktop, a laptop, a tablet, a smartphone, a smartwatch, and/or the like that is executing the application (e.g., a backup system). In one implementation, the API call permission request may include data such as a request identifier, a request type, a set of scopes, and/or the like. In one embodiment, the client may provide the following example API call permission request, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
    <timestamp>2020-12-31 23:59:59</timestamp>
    <user_accounts_details>
        <user_account_credentials>
            <user_name>JohnDaDoeDoeDoooe@gmail.com</user_name>
            <password>abc123</password>
            //OPTIONAL <cookie>cookieID</cookie>
            //OPTIONAL <digital_cert_link>www.mydigitalcertificate.com/
JohnDoeDaDoeDoe@gmail.com/mycertifcate.dc</digital_cert_link>
            //OPTIONAL <digital_certificate>_DATA_</digital_certificate>
        </user_account_credentials>
```

```
      </user_accounts_details>
      <client_details> //iOS Client with App and Webkit
            //it should be noted that although several client details
            //sections are provided to show example variants of client
            //sources, further messages will include only one to save
            //space
            <client_IP>10.0.0.123</client_IP>
            <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
            <client_product_type>iPhone6,1</client_product_type>
            <client_serial_number>DNXXX1X1XXXX</client_serial_number>
            <client_UDID>3XXXXXXXXXXXXXXXXXXXXXXXXD</client_UDID>
            <client_OS>iOS</client_OS>
            <client_OS_version>7.1.1</client_OS_version>
            <client_app_type>app with webkit</client_app_type>
            <app_installed_flag>true</app_installed_flag>
            <app_name>FARLG.app</app_name>
            <app_version>1.0 </app_version>
            <app_webkit_name>Mobile Safari</client_webkit_name>
            <client_version>537.51.2</client_version>
      </client_details>
      <client_details> //iOS Client with Webbrowser
            <client_IP>10.0.0.123</client_IP>
            <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
            <client_product_type>iPhone6,1</client_product_type>
            <client_serial_number>DNXXX1X1XXXX</client_serial_number>
            <client_UDID>3XXXXXXXXXXXXXXXXXXXXXXXXD</client_UDID>
            <client_OS>iOS</client_OS>
            <client_OS_version>7.1.1</client_OS_version>
            <client_app_type>web browser</client_app_type>
            <client_name>Mobile Safari</client_name>
            <client_version>9537.53</client_version>
      </client_details>
      <client_details> //Android Client with Webbrowser
            <client_IP>10.0.0.123</client_IP>
            <user_agent_string>Mozilla/5.0 (Linux; U; Android 4.0.4; en-us; Nexus S
Build/IMM76D) AppleWebKit/534.30 (KHTML, like Gecko) Version/4.0 Mobile
Safari/534.30</user_agent_string>
            <client_product_type>Nexus S</client_product_type>
            <client_serial_number>YXXXXXXXXZ</client_serial_number>
            <client_UDID>FXXXXXXXXX-XXXX-XXXX-XXXX-XXXXXXXXXXXX</client_UDID>
            <client_OS>Android</client_OS>
            <client_OS_version>4.0.4</client_OS_version>
            <client_app_type>web browser</client_app_type>
            <client_name>Mobile Safari</client_name>
            <client_version>534.30</client_version>
      </client_details>
      <client_details> //Mac Desktop with Webbrowser
            <client_IP>10.0.0. 123</client_IP>
            <user_agent_string>Mozilla/5.0 (Macintosh; Intel Mac OS X 10_9_3)
AppleWebKit/537.75.14 (KHTML, like Gecko) Version/7.0.3
Safari/537.75.14</user_agent_string>
            <client_product_type>MacPro5,1</client_product_type>
            <client_serial_number>YXXXXXXXXZ</client_serial_number>
            <client_UDID>FXXXXXXXXX-XXXX-XXXX-XXXX-XXXXXXXXXXXX</client_UDID>
            <client_OS>Mac OS X</client_OS>
            <client_OS_version>10.9.3</client_OS_version>
            <client_app_type>web browser</client_app_type>
            <client_name>Mobile Safari</client_name>
            <client_version>537.75.14</client_version>
      </client_details>
      <API_call_permission_request>
         <request_identifier>ID_request_1</request_identifier>
         <request_type>PERMISSION</request_type>
         <scopes>
            <API_Type>Microsoft Graph API</API_Type>
            <tenant_identifier>1234</tenant_identifier>
            <application_identifier>backup-SaaS-protection</application_identifier>
            <service_identifier>SharePoint</service_identifier>
            <operation>read</operation>
         </scopes>
      </API_call_permission_request>
</auth_request>
```

An API call handling (ACH) component 925 may determine whether to grant the application permission to call the API using data provided in the API call permission request and/or may update retry-after intervals for the set of scopes if an associated API call result request is received. See FIG. 10 for additional details regarding the ACH component.

The gatekeeper server 904 may send a token request 929 to a token vendor server 906 to obtain a token for a scope. In one embodiment, separate token vendor servers may be utilized for each scope (or some combination of scopes), and a plurality of token requests may be sent (e.g., one for each scope in the set of scopes). In another embodiment, one token vendor may be utilized for the set of scopes, and a single token request may be sent for the set of scopes. In one implementation, the token request may include data such as a request identifier, a scope, and/or the like. In one embodiment, the gatekeeper server may provide the following example token request, substantially in the form of a HTTP (S) POST message including XML-formatted data, as provided below:

```
POST /token_request.php HTTP/1.1
Host: www.server.com
Content-Type: Application/XML
Content-Length: 667
<?XML version = "1.0" encoding = "UTF-8"?>
<token_request>
    <request_identifier>ID_request_2</request_identifier>
    <scope>
        <application_identifier>backup-SaaS-protection</application_identifier>
    </scope>
</token_request>
```

The token vendor server 906 may send a token response 933 to the gatekeeper server 904 with the requested token (e.g., when a token is available). In one implementation, the token response may include data such as a response identifier, the requested token, and/or the like. In one embodiment, the token vendor server may provide the following example token response, substantially in the form of a HTTP(S) POST message including XML-formatted data, as provided below:

```
POST /token_response.php HTTP/1.1
Host: www.server.com
Content-Type: Application/XML
Content-Length: 667
<?XML version = "1.0" encoding = "UTF-8"?>
<token_response>
    <response_identifier>ID_response_2</response_identifier>
    <token>token data (e.g., 204 No Content)</token>
</token_response>
```

The gatekeeper server 904 may send a retry-after interval retrieve request 937 to a repository 910 to determine a retry-after interval (if one exists) for a scope. In one embodiment, separate retry-after intervals may be utilized for each scope (or some combination of scopes), and a plurality of retry-after interval retrieve requests may be sent (e.g., one for each scope in the set of scopes). In another embodiment, one retry-after interval may be utilized for the set of scopes, and a single retry-after interval retrieve request may be sent for the set of scopes. In one implementation, the retry-after interval retrieve request may include data such as a request identifier, a scope, and/or the like. In one embodiment, the gatekeeper server may provide the following example retry-after interval retrieve request, substantially in the form of a HTTP(S) POST message including XML-formatted data, as provided below:

```
POST /retry_after_interval_retrieve_request.php HTTP/1.1
Host: www.server.com
Content-Type: Application/XML
Content-Length: 667
<?XML version = "1.0" encoding = "UTF-8"?>
<retry_after_interval_retrieve_request>
    <request_identifier>ID_request_3</request_identifier>
```

```
                    <scope>
                        <application_identifier>backup-SaaS-protection</application_identifier>
                    </scope>
                </retry_after_interval_retrieve_request>
```

The repository 910 may send a retry-after interval retrieve response 941 to the gatekeeper server 904 with the requested retry-after interval. In one implementation, the retry-after interval retrieve response may include data such as a response identifier, the requested retry-after interval (e.g., in seconds), and/or the like. In one embodiment, the repository may provide the following example retry-after interval retrieve response, substantially in the form of a HTTP(S) POST message including XML-formatted data, as provided below:

```
POST /retry_after_interval_retrieve_response.php HTTP/1.1
Host: www.server.com
Content-Type: Application/XML
Content-Length: 667
<?XML version = "1.0" encoding = "UTF-8"?>
<retry_after_interval_retrieve_response>
    <response_identifier>ID_response_3</response_identifier>
    <retry_after_interval>30s</retry_after_interval>
</retry_after_interval_retrieve_response>
```

The gatekeeper server 904 may send an API call permission response 945 to the client 902 to inform the application whether the API call is permitted. In one implementation, the API call permission response may include data such as a response identifier, a status, and/or the like. In one embodiment, the gatekeeper server may provide the following example API call permission response (e.g., if a retry-after interval does not exist (e.g., 0 seconds) for any scope in the set of scopes), substantially in the form of a HTTP(S) POST message including XML-formatted data, as provided below:

```
POST /API_call_permission_response.php HTTP/1.1
Host: www.server.com
Content-Type: Application/XML
Content-Length: 667
<?XML version = "1.0" encoding = "UTF-8"?>
<API_call_permission_response>
    <response_identifier>ID_response_1</response_identifier>
    <status>
        <code>200</code>
        <permitted>TRUE</permitted>
    </status>
</API_call_permission_response>
```

In another embodiment, the gatekeeper server may provide the following example API call permission response (e.g., if a retry-after interval exists (e.g., 30 seconds) for a scope in the set of scopes), substantially in the form of a HTTP(S) POST message including XML-formatted data, as provided below:

```
POST /API_call_permission_response.php HTTP/1.1
Host: www.server.com
Content-Type: Application/XML
Content-Length: 667
<?XML version = "1.0" encoding = "UTF-8"?>
<API_call_permission_response>
    <response_identifier>ID_response_1</response_identifier>
    <status>
```

```
        <code>429</code>
        <permitted>FALSE</permitted>
        <wait_duration>30s</wait_duration>
    </status>
</API_call_permission_response>
```

An API call executing (ACE) component 949 may facilitate making the API call using data provided in the API call permission response and/or may inform the gatekeeper server if the API call is throttled by the API. See FIG. 11 for additional details regarding the ACE component.

The client 902 may send an API call request 953 to an API server 908 (e.g., of a SaaS provider, such as a Microsoft SharePoint API server) to make the API call. In one implementation, the API call request may include data such as a request identifier, the API call, and/or the like. In one embodiment, the client may provide the following example API call request, substantially in the form of a HTTP(S) POST message including XML-formatted data, as provided below:

```
POST /API_call_request.php HTTP/1.1
Host: www.server.com
Content-Type: Application/XML
Content-Length: 667
<?XML version = "1.0" encoding = "UTF-8"?>
<API_call_request>
    <request_identifier>ID_request_4</request_identifier>
    <API_call>Discover Microsoft SharePoint sites (seats)
    for tenant 1234</API_call>
</API_call_request>
```

The API server 908 may send an API call response 957 to the client 902 with the API response. In one implementation, the API call response may include data such as a response identifier, a status, response data, and/or the like. In one embodiment, the API server may provide the following example API call response (e.g., for a non-throttled response), substantially in the form of a HTTP(S) POST message including XML-formatted data, as provided below:

```
POST /API_call_response.php HTTP/1.1
Host: www.server.com
Content-Type: Application/XML
Content-Length: 667
<?XML version = "1.0" encoding = "UTF-8"?>
<API_call_response>
    <response_identifier>ID_response_4</response_identifier>
    <status>
        <code>200</code>
    </status>
    <response_data>List of Microsoft SharePoint sites
    for tenant 1234</response_data>
</API_call_response>
```

In another embodiment, the API server may provide the following example API call response (e.g., for a throttled response), substantially in the form of a HTTP(S) POST message including XML-formatted data, as provided below:

```
POST /API_call_response.php HTTP/1.1
Host: www.server.com
Content-Type: Application/XML
Content-Length: 667
<?XML version = "1.0" encoding = "UTF-8"?>
<API_call_response>
    <response_identifier>ID_response_4</response_identifier>
    <status>
        <code>429</code>
        <retry_after>60s</retry_after>
    </status>
</API_call_response>
```

If a throttled response was received (and, in some implementations, for non-throttled responses for monitoring and/or reporting purposes), the client 902 may send an API call result request 961 to the gatekeeper server 904 to inform the gatekeeper server regarding the result of the API call. In one implementation, the API call result request may include data such as a request identifier, a request type, scope information from the API call permission request, the status (e.g., error code, retry-after header, scope) from the response, and/or the like. In one embodiment, the client may provide the following example API call result request, substantially in the form of a HTTP(S) POST message including XML-formatted data, as provided below:

```
POST /API_call_result_request.php HTTP/1.1
Host: www.server.com
Content-Type: Application/XML
Content-Length: 667
<?XML version = "1.0" encoding = "UTF-8"?>
<API_call_result_request>
    <request_identifier>ID_request_5</request_identifier>
    <request_type>RESULTS</request_type>
    <scopes>
        <API_Type>Microsoft Graph API</API_Type>
        <tenant_identifier>1234</tenant_identifier>
        <application_identifier>backup-SaaS-
        protection</application_identifier>
        <service_identifier>SharePoint</service_identifier>
        <operation>read</operation>
    </scopes>
    <status>
        <code>429</code>
        <retry_after>60s</retry_after>
    </status>
</API_call_result_request>
```

The gatekeeper server 904 may send a retry-after interval store request 965 to the repository 910 to store a retry-after interval for a determined throttled scope. In one embodiment, separate retry-after intervals may be utilized for each scope (or some combination of scopes), and a plurality of retry-after interval store requests may be sent (e.g., one for each scope in a set of determined throttled scopes). In another embodiment, one retry-after interval may be utilized for a set of determined throttled scopes, and a single retry-after interval store request may be sent for the set of determined throttled scopes. In one implementation, the retry-after interval store request may include data such as a request identifier, a determined throttled scope, a retry-after interval (e.g., in seconds), and/or the like. In one embodiment, the gatekeeper server may provide the following example retry-after interval store request, substantially in the form of a HTTP(S) POST message including XML-formatted data, as provided below:

```
POST /retry_after_interval_store_request.php HTTP/1.1
Host: www.server.com
Content-Type: Application/XML
Content-Length: 667
<?XML version = "1.0" encoding = "UTF-8"?>
<retry_after_interval_store_request>
    <request_identifier>ID_request_6</request_identifier>
    <scope>
        <application_identifier>backup-SaaS-
        protection</application_identifier>
    </scope>
    <retry_after_interval>60s</retry_after_interval>
</retry_after_interval_store_request>
```

The repository 910 may send a retry-after interval store response 969 to the gatekeeper server 904 to confirm whether the retry-after interval for the determined throttled scope was stored successfully. In one implementation, the retry-after interval store response may include data such as a response identifier, a status, and/or the like. In one embodiment, the repository may provide the following example retry-after interval store response, substantially in the form of a HTTP(S) POST message including XML-formatted data, as provided below:

```
POST /retry_after_interval_store_response.php HTTP/1.1
Host: www.server.com
Content-Type: Application/XML
Content-Length: 667
<?XML version = "1.0" encoding = "UTF-8"?>
<retry_after_interval_store_response>
    <response_identifier>ID_response_6</response_identifier>
    <status>OK</status>
</retry_after_interval_store_response>
```

The gatekeeper server 904 may send an API call result response 973 to the client 902 to inform the client whether the API call result request was processed successfully. In one implementation, the API call result response may include data such as a response identifier, a status, and/or the like. In one embodiment, the gatekeeper server may provide the following example API call result response, substantially in the form of a HTTP(S) POST message including XML-formatted data, as provided below:

```
POST /API_call_result_response.php HTTP/1.1
Host: www.server.com
Content-Type: Application/XML
Content-Length: 667
<?XML version = "1.0" encoding = "UTF-8"?>
<API_call_result_response>
    <response_identifier>ID_response_5</response_identifier>
    <status>OK</status>
</API_call_result_response>
```

FIG. 10 shows non-limiting, example embodiments of a logic flow illustrating an API call handling (ACH) component for the FARLG. In FIG. 10, an API call permission request may be obtained at 1001. For example, the API call permission request may be obtained as a result of a request from an application (e.g., executing on a compute instance client) for permission to execute an API call to an API (e.g., of a SaaS service) that uses rate limits to protect the service from excessive resource usage.

A set of scopes associated with the API call permission request may be determined at 1005. For example, the application may specify the set of scopes associated with the API call (e.g., API-Type, tenant, application, service, resource, user, operation, endpoint, and/or the like). In one implementation, the API call permission request may be parsed (e.g., using PHP commands) to determine the set of scopes (e.g., based on the value of the scopes field). In another implementation, the set of scopes may be inferred based on the target URL path of the API call (e.g., specified in the API call permission request). In another implementation, a default set of scopes (e.g., application and tenant) may be used.

A determination may be made at 1009 whether there remain scopes to process. In one implementation, each of the scopes in the set of scopes may be processed. If there remain scopes to process, the next scope may be selected for processing at 1013.

A token for the selected scope may be obtained from a token vendor at 1017. For example, the token may be a response datastructure from the token vendor that indicates that sufficient time elapsed, based on a specified rate-limit for the selected scope, to potentially allow the API call for the selected scope. In one embodiment, the token vendor may be used to proactively rate-limit clients to reduce the probability that the API will throttle an API call. In one implementation, a call to the token vendor (e.g., a token request) may block until the token is returned. In another implementation, a callback mechanism may be used to wait until the token is returned. It is to be understood that different scopes may have different rate-limits used for vending tokens. In various implementations, such rate limits may be set to prioritize requests associated with certain scopes over other scopes, may be set as static values or modified at run-time, may be adjusted dynamically (e.g., in response to dynamic rate-limiting), and/or the like.

A retry-after interval for the selected scope may be retrieved at 1021. In one embodiment, if there is a (e.g., non-zero) retry-after interval stored for the selected scope, the API previously returned a throttled response for that scope, and the client should wait for the retry-after interval to minimize the risk that the API will throttle the API call. In one implementation, the retry-after interval for the selected scope may be retrieved from a repository. For example, the retry-after interval for selected scope may be retrieved via a MySQL database command similar to the following:

```
SELECT retryAfterTimeInterval
FROM RetryAfter
WHERE retryAfterAPI_Type = "Microsoft Graph API" AND
    retryAfterScopeName = "application" AND
    retryAfterScopeValue = "backup-SaaS-protection";
```

In another implementation, the retry-after interval for the selected scope may be determined using a retry-after custodian (e.g., using the GetRetryAfter function).

A determination may be made at 1025 whether a retry-after interval exists for any of the scopes in the set of scopes. In one implementation, this determination may be made based on whether a non-zero retry-after interval is determined for any of the scopes in the set of scopes.

If a retry-after interval does not exist for any of the scopes in the set of scopes, an API call permission granted response may be returned at 1029. In one embodiment, the API call permission granted response may inform the client that permission to make the API call is granted. In one implementation, the API call permission granted response may be provided via an API call permission response.

If a retry-after interval exists for any of the scopes in the set of scopes, the client should wait before calling the API to minimize the risk that the API will throttle the API call. Tokens obtained for the scopes in the set of scopes may be relinquished at 1033. In one embodiment, relinquishing the tokens may allow another client that uses a different set of scopes (e.g., unaffected by any retry-after intervals) to call the API sooner.

A wait duration associated with the API call may be determined at 1037. In one embodiment, the wait duration may specify how long the client should wait before retrying requesting permission to make the API call. In one implementation, the wait duration may be determined as the maximum retry-after interval across retry-after intervals that exist for any of the scopes in the set of scopes. In some implementations, the wait duration may be further adjusted with a randomized jitter, so that multiple clients that get a retry-after response do not request permission to call the API at the same time and create a thundering herd effect. In some implementations, the wait duration may be further adjusted so that a request to call the API does not get preempted by newer requests (e.g., by adding an additional recency wait duration to the wait duration of each request that decreases as the number of retry attempts associated with a request increases or that decreases as the timestamp of the initial permission request ages).

An API call permission denied response may be returned at 1041. In one embodiment, the API call permission denied response may inform the client that permission to make the API call is denied and/or may provide the wait duration associated with the API call. In one implementation, the API call permission denied response may be provided via an API call permission response.

A determination may be made at 1045 whether an API call result request was obtained. For example, the API call result request may be obtained from the client if the application was granted permission to execute the API call and was throttled by the API.

If an API call result request was obtained, a set of scopes associated with the API call result request may be determined at 1049. In one implementation, the API call result request may be parsed (e.g., using PHP commands) to determine the set of scopes associated with the API call result request. For example, the API call result request may be parsed to determine the set of scopes originally specified in the API call permission request. In another example, the API call result request may be parsed to find response-headers (e.g., x-ms-throttle-scope) from the API that indicate the scope (e.g., endpoint) under which the API call was throttled. In another implementation, a default set of scopes (e.g., tenant) may be used as the set of scopes associated with the API call result request. In another implementation, a machine learning technique (e.g., a neural network) may be utilized in combination with monitoring to determine which of the scopes in the set of scopes originally specified in the API call permission request were under heavy load (e.g., based on an absolute performance benchmark, compared to other scopes, and/or the like) at the time the API throttled the API call, and such heavy load scopes may be used as the set of scopes associated with the API call result request.

A determination may be made at 1053 whether there remain scopes to process. In one implementation, each of the scopes in the set of scopes associated with the API call result request may be processed. If there remain scopes to process, the next scope may be selected for processing at 1057.

A retry-after interval for the selected scope may be determined at 1061. In one embodiment, the retry-after interval for the selected scope may be the duration (e.g., number of seconds) that any client should wait before it makes another API call associated with the scope. In one implementation, the API call result request may be parsed (e.g., using PHP commands) to determine the retry-after interval for the selected scope. For example, the API call result request may be parsed to find the retry-after header from the API that indicates the retry-after interval. In another implementation, a default retry-after interval (e.g., if the API did not provide a retry-after interval) and/or a minimum retry-after interval (e.g., if the API provided a retry-after interval lower than a threshold) may be used to determine the retry-after interval for the selected scope. In another implementation, an exponential-backoff technique may be used (e.g., if the API uses dynamic rate-limiting and did not provide a retry-after interval) to determine the retry-after interval for the selected scope.

A determination may be made at 1065 whether the determined retry-after interval for the selected scope is greater than an existing retry-after interval (e.g., if one exists) for the selected scope. If so (or if there is no existing retry-after interval yet), an updated (or new) retry-after interval for the selected scope may be stored at 1069. For example, the retry-after interval may be stored as a timestamp calculated by adding the determined retry-after interval (e.g., number of seconds) to the current time to produce a timestamp representing some time in the future. In one implementation, the retry-after interval for the selected scope may be stored in a repository. For example, the retry-after interval for the selected scope may be stored via a MySQL database command similar to the following:

```
INSERT INTO RetryAfter (retryAfterAPI_Type,
  retryAfterScopeName, retryAfterScopeValue,
    retryAfterTimeInterval)
VALUES ("Microsoft Graph API", "application",
  "backup-SaaS-protection",
    "current time + 60 seconds") ;
```

In another implementation, the retry-after interval for the selected scope may be stored using the retry-after custodian (e.g., using the SetRetryAfter function).

FIG. 11 shows non-limiting, example embodiments of a logic flow illustrating an API call executing (ACE) component for the FARLG. In FIG. 11, an API call execution request may be obtained at 1101. For example, the API call execution request may be obtained as a result of an application (e.g., executing on a compute instance client) utilizing an API call to an API (e.g., of a SaaS service) that uses rate limits to protect the service from excessive resource usage.

An API call permission for executing the API call may be requested from a gatekeeper at 1105. For example, the application may specify a set of scopes associated with the API call (e.g., API-Type, tenant, application, service, resource, user, operation, endpoint, and/or the like). In one embodiment, the gatekeeper provides a permission API that allows the application to synchronously request permission to make API calls. In another embodiment, the gatekeeper provides a permission API that allows the application to request permission and provide a callback for the gatekeeper to call when it is ready to permit the application to make the API call. In one implementation, an API call permission request may be sent to the gatekeeper to request the API call permission.

A determination may be made at 1109 whether permission to make the API call was granted. In one implementation, an API call permission response from the gatekeeper may be parsed (e.g., using PHP commands) to determine whether permission was granted (e.g., based on the value of the permitted field).

If permission was denied, a wait duration may be determined at 1113. In one embodiment, the wait duration may specify how long the application should wait before retrying requesting permission to make the API call. In one implementation, the API call permission response from the gatekeeper may be parsed (e.g., using PHP commands) to determine the wait duration (e.g., based on the value of the wait_duration field). A determination may be made at 1117 whether the wait duration passed. If not, the application may wait at 1121. If so, the application may request API call permission from the gatekeeper again at 1105.

If permission was granted, the API call may be made at 1125. In one embodiment, the application makes the API call via the client (e.g., in the same manner that it would have used even if the gatekeeper did not exist). In an alternative embodiment, the gatekeeper provides an API that allows the client to asynchronously submit details of the API call, the gatekeeper makes the API call on behalf of the client in a manner that mitigates the risk that the API will throttle the API call, and the gatekeeper asynchronously sends a response back to the client.

A determination may be made at 1129 whether the API call was throttled. In one implementation, an API call response from an API server (e.g., a SaaS service API server) may be parsed (e.g., using PHP commands) to determine whether the API call was throttled (e.g., based on the value of the status field).

If the API call was throttled, an API call result may be provided to the gatekeeper at 1133. For example, the API call result may specify scope information from the API call permission request, the status (e.g., error code, retry-after header, scope) from the API call response, and/or the like. In one implementation, an API call result request may be sent to the gatekeeper to provide the API call result. In an alternative embodiment, the API call result may be provided to the gatekeeper for non-throttled responses (e.g., for monitoring and/or reporting purposes).

Additional Alternative Embodiment Examples

The following alternative example embodiments provide a number of variations of some of the already discussed principles for expanded color on the abilities of the FARLG. Additional embodiments may include:

1. A fleetwide adaptive rate limiting apparatus, comprising:
  at least one memory;
  a component collection stored in the at least one memory;
  at least one processor disposed in communication with the at least one memory, the at least one processor executing processor-executable instructions from the component collection, the component collection storage structured with processor-executable instructions, comprising:
    obtain, via the at least one processor, an API call permission request datastructure associated with an API call of an application, in which the API call permission request datastructure is structured to identify an API and a set of scopes;
    determine, via the at least one processor, a retry-after interval for each scope in the set of scopes, in which existence of a retry-after interval for a scope indicates that the API previously returned a throttled response for the respective scope;

determine, via the at least one processor, a wait duration associated with the API call, in which the wait duration is determined as the maximum retry-after interval across retry-after intervals that exist for any scope in the set of scopes; and provide, via the at least one processor, an API call permission response datastructure, in which the API call permission response datastructure is structured to specify the wait duration.

2. The apparatus of embodiment 1, in which the application is executing in a multi-tenant shared computing infrastructure.

3. The apparatus of embodiment 1, in which the component collection storage is further structured with processor-executable instructions, comprising:

obtain, via the at least one processor, a token from a token vendor for each scope in the set of scopes, in which a token vendor for a scope is structured to vend tokens at a rate-limit that is equal to or greater than the rate-limit of the API for the respective scope.

4. The apparatus of embodiment 3, in which separate token vendors are utilized for each scope in the set of scopes.

5. The apparatus of embodiment 3, in which one token vendor is utilized for the set of scopes.

6. The apparatus of embodiment 3, in which the component collection storage is further structured with processor-executable instructions, comprising:

relinquish, via the at least one processor, any tokens obtained for the set of scopes after determining existence of a retry-after interval for a scope in the set of scopes.

7. The apparatus of embodiment 1, in which a rate-limit associated with a scope is set to prioritize requests associated with the respective scope over other scopes.

8. The apparatus of embodiment 1, in which a rate-limit associated with a scope is adjusted dynamically in response to dynamic rate-limiting by the API.

9. The apparatus of embodiment 1, in which separate rate-limits are utilized for each scope in the set of scopes.

10. The apparatus of embodiment 1, in which the component collection storage is further structured with processor-executable instructions, comprising:

adjust, via the at least one processor, the wait duration associated with the API call using a randomly generated jitter.

11. The apparatus of embodiment 1, in which the component collection storage is further structured with processor-executable instructions, comprising:

adjust, via the at least one processor, the wait duration associated with the API call based on request recency associated with the API call permission request datastructure, in which the API call permission request datastructure is structured to specify an associated number of retry attempts or a timestamp associated with an initial permission request.

12. The apparatus of embodiment 1, in which the component collection storage is further structured with processor-executable instructions, comprising:

obtain, via the at least one processor, an API call result request datastructure associated with the API call, in which the API call result request datastructure is structured to specify that the API call was throttled by the API;

determine, via the at least one processor, a set of affected scopes associated with the throttling by the API;

determine, via the at least one processor, an updated retry-after interval for each scope in the set of affected scopes; and store, via the at least one processor, any updated retry-after intervals for the set of affected scopes.

13. The apparatus of embodiment 12, in which the API call result request datastructure is structured to specify the set of affected scopes and a retry-after interval for the set of affected scopes indicated by the API.

14. The apparatus of embodiment 12, in which the instructions to determine the set of affected scopes are structured as instructions to determine which scopes in the set of scopes originally specified in the API call permission request datastructure were under heavy load at the time the API throttled the API call.

15. The apparatus of embodiment 12, in which an updated retry-after interval for a scope in the set of affected scopes is determined using an exponential-backoff technique.

16. The apparatus of embodiment 12, in which an updated retry-after interval for a scope in the set of affected scopes is stored upon determining that the updated retry-after interval is greater than an existing retry-after interval stored for the respective scope.

17. The apparatus of embodiment 1, in which a scope is one of API-Type, tenant, application, service, resource, user, operation, method, endpoint.

18. A fleetwide adaptive rate limiting processor-readable, non-transient medium, the medium storing a component collection, the component collection storage structured with processor-executable instructions comprising:

obtain, via the at least one processor, an API call permission request datastructure associated with an API call of an application, in which the API call permission request datastructure is structured to identify an API and a set of scopes;

determine, via the at least one processor, a retry-after interval for each scope in the set of scopes, in which existence of a retry-after interval for a scope indicates that the API previously returned a throttled response for the respective scope;

determine, via the at least one processor, a wait duration associated with the API call, in which the wait duration is determined as the maximum retry-after interval across retry-after intervals that exist for any scope in the set of scopes; and provide, via the at least one processor, an API call permission response datastructure, in which the API call permission response datastructure is structured to specify the wait duration.

19. The medium of embodiment 18, in which the application is executing in a multi-tenant shared computing infrastructure.

20. The medium of embodiment 18, in which the component collection storage is further structured with processor-executable instructions, comprising:

obtain, via the at least one processor, a token from a token vendor for each scope in the set of scopes, in which a token vendor for a scope is structured to vend tokens at a rate-limit that is equal to or greater than the rate-limit of the API for the respective scope.
21. The medium of embodiment 20, in which separate token vendors are utilized for each scope in the set of scopes.
22. The medium of embodiment 20, in which one token vendor is utilized for the set of scopes.
23. The medium of embodiment 20, in which the component collection storage is further structured with processor-executable instructions, comprising:
relinquish, via the at least one processor, any tokens obtained for the set of scopes after determining existence of a retry-after interval for a scope in the set of scopes.
24. The medium of embodiment 18, in which a rate-limit associated with a scope is set to prioritize requests associated with the respective scope over other scopes.
25. The medium of embodiment 18, in which a rate-limit associated with a scope is adjusted dynamically in response to dynamic rate-limiting by the API.
26. The medium of embodiment 18, in which separate rate-limits are utilized for each scope in the set of scopes.
27. The medium of embodiment 18, in which the component collection storage is further structured with processor-executable instructions, comprising:
adjust, via the at least one processor, the wait duration associated with the API call using a randomly generated jitter.
28. The medium of embodiment 18, in which the component collection storage is further structured with processor-executable instructions, comprising:
adjust, via the at least one processor, the wait duration associated with the API call based on request recency associated with the API call permission request datastructure, in which the API call permission request datastructure is structured to specify an associated number of retry attempts or a timestamp associated with an initial permission request.
29. The medium of embodiment 18, in which the component collection storage is further structured with processor-executable instructions, comprising:
obtain, via the at least one processor, an API call result request datastructure associated with the API call, in which the API call result request datastructure is structured to specify that the API call was throttled by the API;
determine, via the at least one processor, a set of affected scopes associated with the throttling by the API;
determine, via the at least one processor, an updated retry-after interval for each scope in the set of affected scopes; and
store, via the at least one processor, any updated retry-after intervals for the set of affected scopes.
30. The medium of embodiment 29, in which the API call result request datastructure is structured to specify the set of affected scopes and a retry-after interval for the set of affected scopes indicated by the API.
31. The medium of embodiment 29, in which the instructions to determine the set of affected scopes are structured as instructions to determine which scopes in the set of scopes originally specified in the API call permission request datastructure were under heavy load at the time the API throttled the API call.
32. The medium of embodiment 29, in which an updated retry-after interval for a scope in the set of affected scopes is determined using an exponential-backoff technique.
33. The medium of embodiment 29, in which an updated retry-after interval for a scope in the set of affected scopes is stored upon determining that the updated retry-after interval is greater than an existing retry-after interval stored for the respective scope.
34. The medium of embodiment 18, in which a scope is one of API-Type, tenant, application, service, resource, user, operation, method, endpoint.
35. A fleetwide adaptive rate limiting processor-implemented system, comprising: means to store a component collection;
means to process processor-executable instructions from the component collection, the component collection storage structured with processor-executable instructions including:
obtain, via the at least one processor, an API call permission request datastructure associated with an API call of an application, in which the API call permission request datastructure is structured to identify an API and a set of scopes;
determine, via the at least one processor, a retry-after interval for each scope in the set of scopes, in which existence of a retry-after interval for a scope indicates that the API previously returned a throttled response for the respective scope;
determine, via the at least one processor, a wait duration associated with the API call, in which the wait duration is determined as the maximum retry-after interval across retry-after intervals that exist for any scope in the set of scopes; and
provide, via the at least one processor, an API call permission response datastructure, in which the API call permission response datastructure is structured to specify the wait duration.
36. The system of embodiment 35, in which the application is executing in a multi-tenant shared computing infrastructure.
37. The system of embodiment 35, in which the component collection storage is further structured with processor-executable instructions, comprising:
obtain, via the at least one processor, a token from a token vendor for each scope in the set of scopes, in which a token vendor for a scope is structured to vend tokens at a rate-limit that is equal to or greater than the rate-limit of the API for the respective scope.
38. The system of embodiment 37, in which separate token vendors are utilized for each scope in the set of scopes.
39. The system of embodiment 37, in which one token vendor is utilized for the set of scopes.
40. The system of embodiment 37, in which the component collection storage is further structured with processor-executable instructions, comprising:
relinquish, via the at least one processor, any tokens obtained for the set of scopes after determining existence of a retry-after interval for a scope in the set of scopes.
41. The system of embodiment 35, in which a rate-limit associated with a scope is set to prioritize requests associated with the respective scope over other scopes.

42. The system of embodiment 35, in which a rate-limit associated with a scope is adjusted dynamically in response to dynamic rate-limiting by the API.
43. The system of embodiment 35, in which separate rate-limits are utilized for each scope in the set of scopes.
44. The system of embodiment 35, in which the component collection storage is further structured with processor-executable instructions, comprising:
adjust, via the at least one processor, the wait duration associated with the API call using a randomly generated jitter.
45. The system of embodiment 35, in which the component collection storage is further structured with processor-executable instructions, comprising:
adjust, via the at least one processor, the wait duration associated with the API call based on request recency associated with the API call permission request datastructure, in which the API call permission request datastructure is structured to specify an associated number of retry attempts or a timestamp associated with an initial permission request.
46. The system of embodiment 35, in which the component collection storage is further structured with processor-executable instructions, comprising:
obtain, via the at least one processor, an API call result request datastructure associated with the API call, in which the API call result request datastructure is structured to specify that the API call was throttled by the API;
determine, via the at least one processor, a set of affected scopes associated with the throttling by the API;
determine, via the at least one processor, an updated retry-after interval for each scope in the set of affected scopes; and
store, via the at least one processor, any updated retry-after intervals for the set of affected scopes.
47. The system of embodiment 46, in which the API call result request datastructure is structured to specify the set of affected scopes and a retry-after interval for the set of affected scopes indicated by the API.
48. The system of embodiment 46, in which the instructions to determine the set of affected scopes are structured as instructions to determine which scopes in the set of scopes originally specified in the API call permission request datastructure were under heavy load at the time the API throttled the API call.
49. The system of embodiment 46, in which an updated retry-after interval for a scope in the set of affected scopes is determined using an exponential-backoff technique.
50. The system of embodiment 46, in which an updated retry-after interval for a scope in the set of affected scopes is stored upon determining that the updated retry-after interval is greater than an existing retry-after interval stored for the respective scope.
51. The system of embodiment 35, in which a scope is one of API-Type, tenant, application, service, resource, user, operation, method, endpoint.
52. A fleetwide adaptive rate limiting processor-implemented process, including processing processor-executable instructions via at least one processor from a component collection stored in at least one memory, the component collection storage structured with processor-executable instructions comprising:
obtain, via the at least one processor, an API call permission request datastructure associated with an API call of an application, in which the API call permission request datastructure is structured to identify an API and a set of scopes;
determine, via the at least one processor, a retry-after interval for each scope in the set of scopes, in which existence of a retry-after interval for a scope indicates that the API previously returned a throttled response for the respective scope;
determine, via the at least one processor, a wait duration associated with the API call, in which the wait duration is determined as the maximum retry-after interval across retry-after intervals that exist for any scope in the set of scopes; and
provide, via the at least one processor, an API call permission response datastructure, in which the API call permission response datastructure is structured to specify the wait duration.
53. The process of embodiment 52, in which the application is executing in a multi-tenant shared computing infrastructure.
54. The process of embodiment 52, in which the component collection storage is further structured with processor-executable instructions, comprising:
obtain, via the at least one processor, a token from a token vendor for each scope in the set of scopes, in which a token vendor for a scope is structured to vend tokens at a rate-limit that is equal to or greater than the rate-limit of the API for the respective scope.
55. The process of embodiment 54, in which separate token vendors are utilized for each scope in the set of scopes.
56. The process of embodiment 54, in which one token vendor is utilized for the set of scopes.
57. The process of embodiment 54, in which the component collection storage is further structured with processor-executable instructions, comprising:
relinquish, via the at least one processor, any tokens obtained for the set of scopes after determining existence of a retry-after interval for a scope in the set of scopes.
58. The process of embodiment 52, in which a rate-limit associated with a scope is set to prioritize requests associated with the respective scope over other scopes.
59. The process of embodiment 52, in which a rate-limit associated with a scope is adjusted dynamically in response to dynamic rate-limiting by the API.
60. The process of embodiment 52, in which separate rate-limits are utilized for each scope in the set of scopes.
61. The process of embodiment 52, in which the component collection storage is further structured with processor-executable instructions, comprising:
adjust, via the at least one processor, the wait duration associated with the API call using a randomly generated jitter.
62. The process of embodiment 52, in which the component collection storage is further structured with processor-executable instructions, comprising:
adjust, via the at least one processor, the wait duration associated with the API call based on request recency associated with the API call permission request datastructure, in which the API call permission request datastructure is structured to specify an associated number of retry attempts or a timestamp associated with an initial permission request.

63. The process of embodiment 52, in which the component collection storage is further structured with processor-executable instructions, comprising:
obtain, via the at least one processor, an API call result request datastructure associated with the API call, in which the API call result request datastructure is structured to specify that the API call was throttled by the API;
determine, via the at least one processor, a set of affected scopes associated with the throttling by the API;
determine, via the at least one processor, an updated retry-after interval for each scope in the set of affected scopes; and
store, via the at least one processor, any updated retry-after intervals for the set of affected scopes.

64. The process of embodiment 63, in which the API call result request datastructure is structured to specify the set of affected scopes and a retry-after interval for the set of affected scopes indicated by the API.

65. The process of embodiment 63, in which the instructions to determine the set of affected scopes are structured as instructions to determine which scopes in the set of scopes originally specified in the API call permission request datastructure were under heavy load at the time the API throttled the API call.

66. The process of embodiment 63, in which an updated retry-after interval for a scope in the set of affected scopes is determined using an exponential-backoff technique.

67. The process of embodiment 63, in which an updated retry-after interval for a scope in the set of affected scopes is stored upon determining that the updated retry-after interval is greater than an existing retry-after interval stored for the respective scope.

68. The process of embodiment 52, in which a scope is one of API-Type, tenant, application, service, resource, user, operation, method, endpoint.

88. Apparatus, comprising:
a processor;
computer memory holding computer program instructions that when executed by the processor improve an operation of a multi-tenant shared computing infrastructure by reducing the number of tenant-level [or other scope level] throttle responses received from third party REST, SOAP, or any other type of rate-limited APIs when compute resources in the multi-tenant shared computing infrastructure make requests to said APIs,
wherein a set of tenant applications available in the multi-tenant shared computing infrastructure access third party APIs, which includes but is not limited to REST APIs and SOAP APIs, the computer program instructions comprising:
program code to provide a set of accessor usage profiles, at least one accessor usage profile representing legitimate behavior in the multi-tenant shared computing infrastructure by defining a time period, at least one usage constraint, and an accessor type;
program code operative upon receipt from an accessor of a request to access a given application in the multi-tenant shared computing infrastructure to select a given accessor usage profile from the set of usage profiles;
program code operative upon matching the accessor type to apply the at least usage constraint in the selected accessor usage profile with respect to the defined time period to determine whether the request to access the given application should proceed; and
program code responsive to a determination that permitting the request to access triggers the at least one usage constraint in the selected accessor usage profile with respect to the defined time period, to provide the given application a notification.

89. Apparatus, comprising:
a processor;
computer memory holding computer program instructions that when executed by the processor improve an operation of a multi-tenant shared computing infrastructure by reducing the number of tenant-level [or other scope level] error responses from third party REST, SOAP, or any other type of Rate-limited APIs when compute resources in the multi-tenant shared computing infrastructure make requests to said APIs,
wherein a set of tenant applications available in the multi-tenant shared computing infrastructure access third party APIs, which include but are not limited to REST APIs and SOAP APIs, the computer program instructions comprising:
program code to provide a set of accessor usage profiles, at least one accessor usage profile representing legitimate behavior in the multi-tenant shared computing infrastructure by defining a time period, at least one usage constraint, and an accessor type;
program code operative upon receipt from an accessor of a request to access a given application in the multi-tenant shared computing infrastructure to select a given accessor usage profile from the set of usage profiles;
program code operative upon matching the accessor type to apply the at least usage constraint in the selected accessor usage profile with respect to the defined time period to determine whether the request to access the given application should proceed; and
program code responsive to a determination that permitting the request to access triggers the at least one usage constraint in the selected accessor usage profile with respect to the defined time period, to provide the given application a notification.

FARLG Controller

FIG. 12 shows a block diagram illustrating non-limiting, example embodiments of a FARLG controller. In this embodiment, the FARLG controller 1201 may serve to aggregate, process, store, search, serve, identify, instruct, generate, match, and/or facilitate interactions with a computer through backup systems technologies, and/or other related data.

Users, which may be people and/or other systems, may engage information technology systems (e.g., computers) to facilitate information processing. In turn, computers employ processors to process information; such processors 1203 may be referred to as central processing units (CPU). One form of processor is referred to as a microprocessor. CPUs use communicative circuits to pass binary encoded signals acting as instructions to allow various operations. These instructions may be operational and/or data instructions containing and/or referencing other instructions and data in various processor accessible and operable areas of memory 1229 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the FARLG controller 1201 may be connected to and/or communicate with entities such as, but not limited to: one or more users from peripheral devices 1212 (e.g., user input devices 1211); an optional cryptographic processor device 1228; and/or a communications network 1213.

Networks comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is referred to as a "node." Networks are generally thought to facilitate the transfer of information from source points to destinations. A node specifically tasked with furthering the passage of information from a source to a destination is called a "router." There are many forms of networks such as Local Area Networks (LANs), Pico networks, Wide Area Networks (WANs), Wireless Networks (WLANs), etc. For example, the Internet is, generally, an interconnection of a multitude of networks whereby remote clients and servers may access and interoperate with one another.

The FARLG controller 1201 may be based on computer systems that may comprise, but are not limited to, components such as: a computer systemization 1202 connected to memory 1229.

Computer Systemization

A computer systemization 1202 may comprise a clock 1230, central processing unit ("CPU(s)" and/or "processor(s)" (these terms are used interchangeably throughout the disclosure unless noted to the contrary)) 1203, a memory 1229 (e.g., a read only memory (ROM) 1206, a random access memory (RAM) 1205, etc.), and/or an interface bus 1207, and most frequently, although not necessarily, are all interconnected and/or communicating through a system bus 1204 on one or more (mother)board(s) 1202 having conductive and/or otherwise transportive circuit pathways through which instructions (e.g., binary encoded signals) may travel to effectuate communications, operations, storage, etc. The computer systemization may be connected to a power source 1286; e.g., optionally the power source may be internal. Optionally, a cryptographic processor 1226 may be connected to the system bus. In another embodiment, the cryptographic processor, transceivers (e.g., ICs) 1274, and/or sensor array (e.g., accelerometer, altimeter, ambient light, barometer, global positioning system (GPS) (thereby allowing FARLG controller to determine its location), gyroscope, magnetometer, pedometer, proximity, ultra-violet sensor, etc.) 1273 may be connected as either internal and/or external peripheral devices 1212 via the interface bus I/O 1208 (not pictured) and/or directly via the interface bus 1207. In turn, the transceivers may be connected to antenna(s) 1275, thereby effectuating wireless transmission and reception of various communication and/or sensor protocols; for example the antenna(s) may connect to various transceiver chipsets (depending on deployment needs), including: Broadcom® BCM4329FKUBG transceiver chip (e.g., providing 802.11n, Bluetooth 2.1+EDR, FM, etc.); a Broadcom® BCM4752 GPS receiver with accelerometer, altimeter, GPS, gyroscope, magnetometer; a Broadcom® BCM4335 transceiver chip (e.g., providing 2G, 3G, and 4G long-term evolution (LTE) cellular communications; 802.11ac, Bluetooth 4.0 low energy (LE) (e.g., beacon features)); a Broadcom® BCM43341 transceiver chip (e.g., providing 2G, 3G and 4G LTE cellular communications; 802.11g/, Bluetooth 4.0, near field communication (NFC), FM radio); an Infineon Technologies® X-Gold 618-PMB9800 transceiver chip (e.g., providing 2G/3G HSDPA/HSUPA communications); a MediaTek® MT6620 transceiver chip (e.g., providing 802.11a/ac/b/g/n (also known as WiFi in numerous iterations), Bluetooth 4.0 LE, FM, GPS; a Lapis Semiconductor® ML8511 UV sensor; a maxim integrated MAX44000 ambient light and infrared proximity sensor; a Texas Instruments® WiLink WL1283 transceiver chip (e.g., providing 802.11n, Bluetooth 3.0, FM, GPS); and/or the like. The system clock may have a crystal oscillator and generates a base signal through the computer systemization's circuit pathways. The clock may be coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU is often packaged in a number of formats varying from large supercomputer(s) and mainframe(s) computers, down to mini computers, servers, desktop computers, laptops, thin clients (e.g., Chromebooks®), netbooks, tablets (e.g., Android®, iPads®, and Windows® tablets, etc.), mobile smartphones (e.g., Android®, iPhones®, Nokia®, Palm® and Windows® phones, etc.), wearable device(s) (e.g., headsets (e.g., Apple AirPods (Pro)®, glasses, goggles (e.g., Google Glass®), watches, etc.), and/or the like. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 1229 beyond the processor itself; internal memory may include, but is not limited to: fast registers, various levels of cache memory (e.g., level 1, 2, 3, etc.), (dynamic/static) RAM, solid state memory, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon®, Duron® and/or Opteron®; Apple's® A series of processors (e.g., A5, A6, A7, A8, etc.); ARM's® application, embedded and secure processors; IBM® and/or Motorola's DragonBall® and PowerPC®; IBM's® and Sony's® Cell processor; Intel's® 80X86 series (e.g., 80386, 80486), Pentium®, Celeron®, Core (2) Duo®, i series (e.g., i3, i5, i7, i9, etc.), Itanium®, Xeon®, and/or XScale®; Motorola's® 680X0 series (e.g., 68020, 68030, 68040, etc.); and/or the like processor(s). The CPU interacts with memory through instruction passing through conductive and/or transportive conduits (e.g., (printed) electronic and/or optic circuits) to execute stored instructions (i.e., program code), e.g., via load/read address commands; e.g., the CPU may read processor issuable instructions from memory (e.g., reading it from a component collection (e.g., an interpreted and/or compiled program application/library including allowing the processor to execute instructions from the application/library) stored in the memory). Such instruction passing facilitates communication within the FARLG controller and beyond through various interfaces. Should processing requirements dictate a greater amount speed and/or capacity, distributed processors (e.g., see Distributed FARLG below), mainframe, multi-core, parallel, and/or super-computer architectures may similarly be employed. Alternatively, should deployment requirements dictate greater portability, smaller mobile devices (e.g., Personal Digital Assistants (PDAs)) may be employed.

Depending on the particular implementation, features of the FARLG may be achieved by implementing a microcontroller such as CAST's® R8051XC2 microcontroller; Diligent's® Basys 3 Artix-7, Nexys A7-100T, U192015125IT, etc.; Intel's® MCS 51 (i.e., 8051 microcontroller); and/or the like. Also, to implement certain features of the FARLG, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the FARLG component collection (distributed or otherwise) and/or features may be implemented via the microprocessor and/or via embedded components; e.g., via ASIC, coprocessor, DSP, FPGA, and/or the like. Alternately, some implementations of the FARLG may be implemented with embedded components that are configured and used to achieve a variety of features or signal processing.

Depending on the particular implementation, the embedded components may include software solutions, hardware solutions, and/or some combination of both hardware/software solutions. For example, FARLG features discussed herein may be achieved through implementing FPGAs, which are a semiconductor devices containing programmable logic components called "logic blocks", and programmable interconnects, such as the high performance FPGA Virtex® series and/or the low cost Spartan® series manufactured by Xilinx®. Logic blocks and interconnects can be programmed by the customer or designer, after the FPGA is manufactured, to implement any of the FARLG features. A hierarchy of programmable interconnects allow logic blocks to be interconnected as needed by the FARLG system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the FARLG may be developed on FPGAs and then migrated into a fixed version that more resembles ASIC implementations. Alternate or coordinating implementations may migrate FARLG controller features to a final ASIC instead of or in addition to FPGAs. Depending on the implementation all of the aforementioned embedded components and microprocessors may be considered the "CPU" and/or "processor" for the FARLG.

Power Soure

The power source 1286 may be of any various form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 1286 is connected to at least one of the interconnected subsequent components of the FARLG thereby providing an electric current to all subsequent components. In one example, the power source 1286 is connected to the system bus component 1204. In an alternative embodiment, an outside power source 1286 is provided through a connection across the I/O 1208 interface. For example, Ethernet (with power on Ethernet), IEEE 1394, USB and/or the like connections carry both data and power across the connection and is therefore a suitable source of power.

Interface Adapters

Interface bus(ses) 1207 may accept, connect, and/or communicate to a number of interface adapters, variously although not necessarily in the form of adapter cards, such as but not limited to: input output interfaces (I/O) 1208, storage interfaces 1209, network interfaces 1210, and/or the like. Optionally, cryptographic processor interfaces 1227 similarly may be connected to the interface bus. The interface bus provides for the communications of interface adapters with one another as well as with other components of the computer systemization. Interface adapters are adapted for a compatible interface bus. Interface adapters variously connect to the interface bus via a slot architecture. Various slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 1209 may accept, communicate, and/or connect to a number of storage devices such as, but not limited to: (removable) storage devices 1214, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Non-Volatile Memory (NVM) Express (NVMe), Small Computer Systems Interface (SCSI), Thunderbolt, Universal Serial Bus (USB), and/or the like.

Network interfaces 1210 may accept, communicate, and/or connect to a communications network 1213. Through a communications network 1213, the FARLG controller is accessible through remote clients 1233b (e.g., computers with web browsers) by users 1233a. Network interfaces may employ connection protocols such as, but not limited to: direct connect, Ethernet (thick, thin, twisted pair 10/100/1000/10000 Base T, and/or the like), Token Ring, wireless connection such as IEEE 802.11a-x, and/or the like. Should processing requirements dictate a greater amount speed and/or capacity, distributed network controllers (e.g., see Distributed FARLG below), architectures may similarly be employed to pool, load balance, and/or otherwise decrease/increase the communicative bandwidth required by the FARLG controller. A communications network may be any one and/or the combination of the following: a direct interconnection; the Internet; Interplanetary Internet (e.g., Coherent File Distribution Protocol (CFDP), Space Communications Protocol Specifications (SCPS), etc.); a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a cellular, WiFi, Wireless Application Protocol (WAP), I-mode, and/or the like); and/or the like. A network interface may be regarded as a specialized form of an input output interface. Further, multiple network interfaces 1210 may be used to engage with various communications network types 1213. For example, multiple network interfaces may be employed to allow for the communication over broadcast, multicast, and/or unicast networks.

Input Output interfaces (I/O) 1208 may accept, communicate, and/or connect to user, peripheral devices 1212 (e.g., input devices 1211), cryptographic processor devices 1228, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; touch interfaces: capacitive, optical, resistive, etc. displays; video interface: Apple Desktop Connector (ADC), BNC, coaxial, component, composite, digital, Digital Visual Interface (DVI), (mini) display port, high-definition multimedia interface (HDMI), RCA, RF antennae, S-Video, Thunderbolt/USB-C, VGA, and/or the like; wireless transceivers: 802.11a/ac/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One output device may include a video display, which may comprise a Cathode Ray Tube (CRT), Liquid Crystal Display (LCD), Light-Emitting Diode (LED), Organic Light-Emitting Diode (OLED), and/or the like based monitor with an interface (e.g., HDMI circuitry and cable) that accepts signals from a video interface, may be used. The video interface composites information generated by a computer systemization and generates video signals based on the composited information in a video memory frame. Another output device is a television set, which accepts signals from a video interface. The video interface provides the composited video information through a video connection interface that accepts a video display interface (e.g., an RCA composite video connector accepting an RCA composite video cable; a DVI connector accepting a DVI display cable, etc.).

Peripheral devices 1212 may be connected and/or communicate to I/O and/or other facilities of the like such as network interfaces, storage interfaces, directly to the interface bus, system bus, the CPU, and/or the like. Peripheral devices may be external, internal and/or part of the FARLG controller. Peripheral devices may include: antenna, audio devices (e.g., line-in, line-out, microphone input, speakers, etc.), cameras (e.g., gesture (e.g., Microsoft Kinect) detection, motion detection, still, video, webcam, etc.), dongles (e.g., for copy protection ensuring secure transactions with a digital signature, as connection/format adaptors, and/or the like), external processors (for added capabilities; e.g., crypto devices 528), force-feedback devices (e.g., vibrating motors), infrared (IR) transceiver, network interfaces, printers, scanners, sensors/sensor arrays and peripheral extensions (e.g., ambient light, GPS, gyroscopes, proximity, temperature, etc.), storage devices, transceivers (e.g., cellular, GPS, etc.), video devices (e.g., goggles, monitors, etc.), video sources, visors, and/or the like. Peripheral devices often include types of input devices (e.g., cameras).

User input devices 1211 often are a type of peripheral device 512 (see above) and may include: accelerometers, cameras, card readers, dongles, finger print readers, gloves, graphics tablets, joysticks, keyboards, microphones, mouse (mice), remote controls, security/biometric devices (e.g., facial identifiers, fingerprint reader, iris reader, retina reader, etc.), styluses, touch screens (e.g., capacitive, resistive, etc.), trackballs, trackpads, watches, and/or the like.

It should be noted that although user input devices and peripheral devices may be employed, the FARLG controller may be embodied as an embedded, dedicated, and/or monitor-less (i.e., headless) device, and access may be provided over a network interface connection.

Cryptographic units such as, but not limited to, microcontrollers, processors 1226, interfaces 1227, and/or devices 1228 may be attached, and/or communicate with the FARLG controller. A MC68HC16 microcontroller, manufactured by Motorola, Inc.®, may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other specialized cryptographic processors include: Broadcom's® CryptoNetX and other Security Processors; nCipher's® nShield; SafeNet's® Luna PCI (e.g., 7100) series; Semaphore Communications'® 40 MHz Roadrunner 184; Sun's® Cryptographic Accelerators (e.g., Accelerator 6000 PCIe Board, Accelerator 500 Daughtercard); Via Nano® Processor (e.g., L2100, L2200, U2400) line, which is capable of performing 500+ MB/s of cryptographic instructions; VLSI Technology's® 33 MHz 6868; and/or the like.

Memory

Generally, any mechanization and/or embodiment allowing a processor to affect the storage and/or retrieval of information is regarded as memory 1229. The storing of information in memory may result in a physical alteration of the memory to have a different physical state that makes the memory a structure with a unique encoding of the memory stored therein. Often, memory is a fungible technology and resource, thus, any number of memory embodiments may be employed in lieu of or in concert with one another. It is to be understood that the FARLG controller and/or a computer systemization may employ various forms of memory 1229. For example, a computer systemization may be configured to have the operation of on-chip CPU memory (e.g., registers), RAM, ROM, and any other storage devices performed by a paper punch tape or paper punch card mechanism; however, such an embodiment would result in an extremely slow rate of operation. In one configuration, memory 1229 will include ROM 1206, RAM 1205, and a storage device 1214. A storage device 1214 may be any various computer system storage. Storage devices may include: an array of devices (e.g., Redundant Array of Independent Disks (RAID)); a cache memory, a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); RAM drives; register memory (e.g., in a CPU), solid state memory devices (USB memory, solid state drives (SSD), etc.); other processor-readable storage mediums; and/or other devices of the like. Thus, a computer systemization generally employs and makes use of memory.

Component Collection

The memory 1229 may contain a collection of processor-executable application/library/program and/or database components (e.g., including processor-executable instructions) and/or data such as, but not limited to: operating system component(s) 1215 (operating system); information server component(s) 1216 (information server); user interface component(s) 1217 (user interface); Web browser component(s) 1218 (Web browser); database(s) 1219; mail server component(s) 1221; mail client component(s) 1222; cryptographic server component(s) 1220 (cryptographic server); machine learning component 1223; distributed immutable ledger component 1224; the FARLG component(s) 1235 (e.g., which may include ACH, ACE 1241-1242, and/or the like components); and/or the like (i.e., collectively referred to throughout as a "component collection"). These components may be stored and accessed from the storage devices and/or from storage devices accessible through an interface bus. Although unconventional program components such as those in the component collection may be stored in a local storage device 1214, they may also be loaded and/or stored in memory such as: cache, peripheral devices, processor registers, RAM, remote storage facilities through a communications network, ROM, various forms of memory, and/or the like.

Operating System

The operating system component 1215 is an executable program component facilitating the operation of the FARLG controller. The operating system may facilitate access of I/O, network interfaces, peripheral devices, storage devices, and/or the like. The operating system may be a highly fault tolerant, scalable, and secure system such as: Apple's Macintosh OS X (Server) and macOS®; AT&T Plan 9®; Be OS®; Blackberry's QNX®; Google's Chrome®; Microsoft's Windows® 7/8/10; Unix and Unix-like system distributions (such as AT&T's UNIX®; Berkley Software Distribution (BSD)® variations such as FreeBSD®, NetBSD, OpenBSD, and/or the like; Linux distributions such as Red Hat, Ubuntu, and/or the like); and/or the like operating systems. However, more limited and/or less secure operating systems also may be employed such as Apple Macintosh OS® (i.e., versions 1-9), IBM OS/2®, Microsoft DOS®, Microsoft Windows 2000/2003/3.1/95/98/CE/Millennium/Mobile/NT/Vista/XP/7/X (Server)®, Palm OS®, and/or the like. Additionally, for robust mobile deployment applications, mobile operating systems may be used, such as: Apple's iOS®; China Operating System COS®; Google's Android®; Microsoft Windows RT/Phone®; Palm's WebOS®; Samsung/Intel's Tizen®; and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may facilitate the interaction with communications networks, data, I/O, peripheral devices, program components, memory, user input devices, and/or the like. The operating system may provide communications protocols that allow the FARLG controller to communicate with other entities through a communications network 1213. Various communication protocols may be used by the FARLG controller as a subcarrier transport mechanism for interaction, such as, but not limited to: multicast, TCP/IP, UDP, unicast, and/or the like.

Information Server

An information server component 1216 is a stored program component that is executed by a CPU. The information server may be an Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C # and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, Ruby, wireless application protocol (WAP), WebObjects®, and/or the like. The information server may support secure communications protocols such as, but not limited to, File Transfer Protocol (FTP(S)); HyperText Transfer Protocol (HTTP); Secure Hypertext Transfer Protocol (HTTPS), Secure Socket Layer (SSL) Transport Layer Security (TLS), messaging protocols (e.g., America Online (AOL) Instant Messenger (AIM)®, Application Exchange (APEX), ICQ, Internet Relay Chat (IRC), Microsoft Network (MSN) Messenger® Service, Presence and Instant Messaging Protocol (PRIM), Internet Engineering Task Force's® (IETF's) Session Initiation Protocol (SIP), SIP for Instant Messaging and Presence Leveraging Extensions (SIMPLE), Slack®, open XML-based Extensible Messaging and Presence Protocol (XMPP) (i.e., Jabber® or Open Mobile Alliance's (OMA's) Instant Messaging and Presence Service (IMPS)), Yahoo! Instant Messenger® Service, and/or the like). The information server may provide results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the FARLG controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the FARLG database 1219, operating systems, other program components, user interfaces, Web browsers, and/or the like.

Access to the FARLG database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the FARLG. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in SQL by instantiating a search string with the proper join/select commands based on the tagged text entries, and the resulting command is provided over the bridge mechanism to the FARLG as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as buttons, check boxes, cursors, graphical views, menus, scrollers, text fields, and windows (collectively referred to as widgets) similarly facilitate the access, capabilities, operation, and display of data and computer hardware and operating system resources, and status. Operation interfaces are called user interfaces. Graphical user interfaces (GUIs) such as the Apple's iOS®, Macintosh Operating System's Aqua®; IBM's OS/2®; Google's Chrome® (e.g., and other webbrowser/cloud based client OSs); Microsoft's Windows® 2000/2003/3.1/95/98/CE/Millennium/Mobile/NT/Vista/XP/7/X (Server)® (i.e., Aero, Surface, etc.); Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface®, and/or the like, any of which may be used and) provide a baseline and mechanism of accessing and displaying information graphically to users.

A user interface component 1217 is a stored program component that is executed by a CPU. The user interface may be a graphic user interface as provided by, with, and/or atop operating systems and/or operating environments, and may provide executable library APIs (as may operating systems and the numerous other components noted in the component collection) that allow instruction calls to generate user interface elements such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 1218 is a stored program component that is executed by a CPU. The Web browser may be a hypertext viewing application such as Apple's (mobile) Safari®, Google's Chrome®, Microsoft Internet Explorer®, Mozilla's Firefox®, Netscape Navigator®, and/or the like. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox®, Safari® Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the FARLG enabled nodes. The combined application may be nugatory on systems employing Web browsers.

Mail Server

A mail server component 1221 is a stored program component that is executed by a CPU 1203. The mail server may be an Internet mail server such as, but not limited to: dovecot, Courier IMAP, Cyrus IMAP, Maildir, Microsoft Exchange, sendmail, and/or the like. The mail server may allow for the execution of program components through facilities such as ASP, ActiveX, (ANSI) (Objective-) C (++), C # and/or .NET, CGI scripts, Java, JavaScript, PERL, PHP, pipes, Python, WebObjects®, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the FARLG. Alternatively, the mail server component may be distributed out to mail service providing entities such as Google's® cloud services (e.g., Gmail and notifications may alternatively be provided via messenger services such as AOL's Instant Messenger®, Apple's iMessage®, Google Messenger®, SnapChat®, etc.).

Access to the FARLG mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 1222 is a stored program component that is executed by a CPU 1203. The mail client may be a mail viewing application such as Apple Mail®, Microsoft Entourage®, Microsoft Outlook®, Microsoft Outlook Express®, Mozilla®, Thunderbird®, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 1220 is a stored program component that is executed by a CPU 1203, cryptographic processor 1226, cryptographic processor interface 1227, cryptographic processor device 1228, and/or the like. Cryptographic processor interfaces will allow for expedition of encryption and/or decryption requests by the cryptographic component; however, the cryptographic component, alternatively, may run on a CPU and/or GPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component facilitates numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), Transport Layer Security (TLS), and/or the like. Employing such encryption security protocols, the FARLG may encrypt all incoming and/or outgoing communications and may serve as node within a virtual private network (VPN) with a wider communications network. The cryptographic component facilitates the process of "security authorization" whereby access to a resource is inhibited by a security protocol and the cryptographic component effects authorized access to the secured resource. In addition, the cryptographic component may provide unique identifiers of content, e.g., employing an MD5 hash to obtain a unique signature for a digital audio file. A cryptographic component may communicate to and/or with other components in a component collection, including itself, and/or facilities of the like. The cryptographic component supports encryption schemes allowing for the secure transmission of information across a communications network to allow the FARLG component to engage in secure transactions if so desired. The cryptographic component facilitates the secure accessing of resources on the FARLG and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

Machine Learning (ML)

In one non limiting embodiment, the FARLG includes a machine learning component 1223, which may be a stored program component that is executed by a CPU 1203. The machine learning component, alternatively, may run on a set of specialized processors, ASICs, FPGAs, GPUs, and/or the like. The machine learning component may be deployed to execute serially, in parallel, distributed, and/or the like, such as by utilizing cloud computing. The machine learning component may employ an ML platform such as Amazon SageMaker, Azure Machine Learning, DataRobot AI Cloud, Google AI Platform, IBM Watson® Studio, and/or the like. The machine learning component may be implemented using an ML framework such as PyTorch, Apache MXNet, MathWorks Deep Learning Toolbox, scikit-learn, TensorFlow, XGBoost, and/or the like. The machine learning component facilitates training and/or testing of ML prediction logic data structures (e.g., models) and/or utilizing ML prediction logic data structures (e.g., models) to output ML predictions by the FARLG. The machine learning component may employ various artificial intelligence and/or learning mechanisms such as Reinforcement Learning, Supervised Learning, Unsupervised Learning, and/or the like. The machine learning component may employ ML prediction logic data structure (e.g., model) types such as Bayesian Networks, Classification prediction logic data structures (e.g., models), Decision Trees, Neural Networks (NNs), Regression prediction logic data structures (e.g., models), and/or the like.

Distributed Immutable Ledger (DIL)

In one non limiting embodiment, the FARLG includes a distributed immutable ledger component 1224, which may be a stored program component that is executed by a CPU 1203. The distributed immutable ledger component, alternatively, may run on a set of specialized processors, ASICs, FPGAs, GPUs, and/or the like. The distributed immutable ledger component may be deployed to execute serially, in parallel, distributed, and/or the like, such as by utilizing a peer-to-peer network. The distributed immutable ledger component may be implemented as a blockchain (e.g., public blockchain, private blockchain, hybrid blockchain) that comprises cryptographically linked records (e.g., blocks). The distributed immutable ledger component may employ a platform such as Bitcoin, Bitcoin Cash, Dogecoin, Ethereum, Litecoin, Monero, Zcash, and/or the like. The distributed immutable ledger component may employ a consensus mechanism such as proof of authority, proof of space, proof of steak, proof of work, and/or the like. The distributed immutable ledger component may be used to provide functionality such as data storage, cryptocurrency, inventory tracking, non-fungible tokens (NFTs), smart contracts, and/or the like.

The FARLG Database

The FARLG database component 1219 may be embodied in a database and its stored data. The database is a stored program component, which is executed by the CPU; the stored program component portion configuring the CPU to process the stored data. The database may be a fault tolerant, relational, scalable, secure database such as Claris FileMaker®, MySQL®, Oracle®, Sybase®, etc. may be used. Additionally, optimized fast memory and distributed databases such as IBM's Netezza®, MongoDB's MongoDB®, opensource Hadoop®, opensource VoltDB, SAP's Hana®, etc. Relational databases are an extension of a flat file. Relational databases include a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. Alternative key fields may be used from any of the fields having unique value sets, and in some alternatives, even non-unique values in combinations with other fields. More precisely, they uniquely identify rows of a table on the "one" side of a one-to-many relationship.

Alternatively, the FARLG database may be implemented using various other data-structures, such as an array, hash, (linked) list, struct, structured text file (e.g., XML), table, flat file database, and/or the like. Such data-structures may be stored in memory and/or in (structured) files. In another alternative, an object-oriented database may be used, such as Frontier™, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the FARLG database is implemented as a data-structure, the use of the FARLG database 1219 may be integrated into another component such as the FARLG component 1235. Also, the database may be implemented as a mix of data structures, objects, programs, relational structures, scripts, and/or the like. Databases may be consolidated and/or distributed in countless variations (e.g., see Distributed FARLG below). Portions of databases, e.g., tables, may be exported and/or imported and thus decentralized and/or integrated.

In another embodiment, the database component (and/or other storage mechanism of the FARLG) may store data immutably so that tampering with the data becomes physically impossible and the fidelity and security of the data may be assured. In some embodiments, the database may be stored to write only or write once, read many (WORM) mediums. In another embodiment, the data may be stored on distributed ledger systems (e.g., via blockchain) so that any tampering to entries would be readily identifiable. In one embodiment, the database component may employ the distributed immutable ledger component DIL 1224 mechanism.

In one embodiment, the database component 1219 includes several tables representative of the schema, tables, structures, keys, entities and relationships of the described database 1219a-k:

An accounts table 1219a includes fields such as, but not limited to: an accountID, accountOwnerID, accountContactID, assetIDs, deviceIDs, paymentIDs, transactionIDs, userIDs, accountType (e.g., agent, entity (e.g., corporate, non-profit, partnership, etc.), individual, etc.), accountCreationDate, accountUpdateDate, accountName, accountNumber, routingNumber, linkWalletsID, accountPrioritAccaountRatio, accountAddress, accountState, accountZIPcode, accountCountry, accountEmail, accountPhone, accountAuthKey, accountIPaddress, accountURLAccessCode, accountPortNo, accountAuthorizationCode, accountAccessPrivileges, accountPreferences, accountRestrictions, and/or the like;

A users table 1219b includes fields such as, but not limited to: a userID, userSSN, taxID, userContactID, accountID, assetIDs, deviceIDs, paymentIDs, transactionIDs, userType (e.g., agent, entity (e.g., corporate, non-profit, partnership, etc.), individual, etc.), namePrefix, firstName, middleName, lastName, nameSuffix, DateOfBirth, userAge, userName, userEmail, userSocialAccountID, contactType, contactRelationship, userPhone, userAddress, userCity, userState, userZIPCode, userCountry, userAuthorizationCode, userAccessPrivilges, userPreferences, userRestrictions, and/or the like (the user table may support and/or track multiple entity accounts on a FARLG);

An devices table 1219c includes fields such as, but not limited to: deviceID, sensorIDs, accountID, assetIDs, paymentIDs, deviceType, deviceName, deviceManufacturer, deviceModel, deviceVersion, deviceSerialNo, deviceIPaddress, deviceMACaddress, device_ECID, deviceUUID, deviceLocation, deviceCertificate, deviceOS, appIDs, deviceResources, deviceSession, auth- Key, deviceSecureKey, walletAppInstalledFlag, deviceAccessPrivileges, devicePreferences, deviceRestrictions, hardware_config, software_config, storage_ location, sensor_value, pin_reading, data_length, channel_requirement, sensor_name, sensor_model_no, sensor_manufacturer, sensor_type, sensor_serial_number, sensor_power_requirement, device_power_requirement, location, sensor_associated_tool, sensor_dimensions, device_dimensions, sensor_communications_type, device_communications_type, power_percentage, power_condition, temperature_setting, speed_adjust, hold_duration, part_actuation, and/or the like. Device table may, in some embodiments, include fields corresponding to one or more Bluetooth profiles, such as those published at https://www.bluetooth.org/en-us/specification/adopted-specifications, and/or other device specifications, and/or the like;

An apps table 1219*d* includes fields such as, but not limited to: appID, appName, appType, appDependencies, accountID, deviceIDs, transactionID, userID, appStoreAuthKey, appStoreAccountID, appStoreIPaddress, appStoreURLaccessCode, appStorePortNo, appAccessPrivileges, appPreferences, appRestrictions, portNum, access_API_call, linked_wallets_list, and/or the like;

An assets table 1219*e* includes fields such as, but not limited to: assetID, accountID, userID, distributorAccountID, distributorPaymentID, distributorOnwerID, assetOwnerID, assetType, assetSourceDeviceID, assetSourceDeviceType, assetSourceDeviceName, assetSourceDistributionChannelID, assetSourceDistributionChannelType, assetSourceDistributionChannelName, assetTargetChannelID, assetTargetChannelType, assetTargetChannelName, assetName, assetSeriesName, assetSeriesSeason, assetSeriesEpisode, assetCode, assetQuantity, assetCost, assetPrice, assetValue, assetManufactuer, assetModelNo, assetSerialNo, assetLocation, assetAddress, assetState, assetZIPcode, assetState, assetCountry, assetEmail, assetIPaddress, assetURLaccessCode, assetOwnerAccountID, subscriptionIDs, assetAuthroizationCode, assetAccessPrivileges, assetPreferences, assetRestrictions, assetAPI, assetAPIconnectionAddress, and/or the like;

A payments table 1219*f* includes fields such as, but not limited to: paymentID, accountID, userID, couponID, couponValue, couponConditions, couponExpiration, paymentType, paymentAccountNo, paymentAccountName, paymentAccountAuthorizationCodes, paymentExpirationDate, paymentCCV, paymentRoutingNo, paymentRoutingType, paymentAddress, paymentState, paymentZIPcode, paymentCountry, paymentEmail, paymentAuthKey, paymentIPaddress, paymentURLaccessCode, paymentPortNo, paymentAccessPrivileges, paymentPreferences, payementRestrictions, and/or the like;

An transactions table 1219*g* includes fields such as, but not limited to: transactionID, accountID, assetIDs, deviceIDs, paymentIDs, transactionIDs, userID, merchantID, transactionType, transactionDate, transactionTime, transactionAmount, transactionQuantity, transactionDetails, productsList, productType, productTitle, productsSummary, productParamsList, transactionNo, transactionAccessPrivileges, transactionPreferences, transactionRestrictions, merchantAuthKey, merchantAuthCode, and/or the like;

An merchants table 1219*h* includes fields such as, but not limited to: merchantID, merchantTaxID, merchanteName, merchantContactUserID, accountID, issuerID, acquirerID, merchantEmail, merchantAddress, merchantState, merchantZIPcode, merchantCountry, merchantAuthKey, merchantIPaddress, portNum, merchantURLaccessCode, merchantPortNo, merchantAccessPrivileges, merchantPreferences, merchantRestrictions, and/or the like;

An ads table 1219*i* includes fields such as, but not limited to: adID, advertiserID, adMerchantID, adNetworkID, adName, adTags, advertiserName, adSponsor, adTime, adGeo, adAttributes, adFormat, adProduct, adText, adMedia, adMediaID, adChannelID, adTagTime, adAudioSignature, adHash, adTemplateID, adTemplateData, adSourceID, adSourceName, adSourceServerIP, adSourceURL, adSourceSecurityProtocol, adSourceFTP, adAuthKey, adAccessPrivileges, adPreferences, adRestrictions, adNetworkXchangeID, adNetworkXchangeName, adNetworkXchangeCost, adNetworkXchangeMetricType (e.g., CPA, CPC, CPM, CTR, etc.), adNetworkXchangeMetricValue, adNetworkXchangeServer, adNetworkXchangePortNumber, publisherID, publisherAddress, publisherURL, publisherTag, publisherIndustry, publisherName, publisherDescription, siteDomain, siteURL, siteContent, siteTag, siteContext, siteImpression, siteVisits, siteHeadline, sitePage, siteAdPrice, sitePlacement, sitePosition, bidID, bidExchange, bidOS, bidTarget, bidTimestamp, bidPrice, bidImpressionID, bidType, bidScore, adType (e.g., mobile, desktop, wearable, largescreen, interstitial, etc.), assetID, merchantID, deviceID, userID, accountID, impressionID, impressionOS, impressionTimeStamp, impressionGeo, impressionAction, impressionType, impressionPublisherID, impressionPublisherURL, and/or the like;

An ML table 1219*j* includes fields such as, but not limited to: MLID, predictionLogicStructureID, predictionLogicStructureType, predictionLogicStructureConfiguration, predictionLogicStructureTrainedStructure, predictionLogicStructureTrainingData, predictionLogicStructureTrainingDataConfiguration, predictionLogicStructureTestingData, predictionLogicStructureTestingDataConfiguration, predictionLogicStructureOutputData, predictionLogicStructureOutputDataConfiguration, and/or the like;

A RetryAfter table 1219*k* includes fields such as, but not limited to: retryAfterID, retryAfterAPI_Type, retryAfterScopeName, retryAfterScopeValue, retryAfterTimeInterval, retryAfterPrioritizationData, retryAfterAssociatedSaaSProvider, and/or the like.

In one embodiment, the FARLG database may interact with other database systems. For example, employing a distributed database system, queries and data access by search FARLG component may treat the combination of the FARLG database, an integrated data security layer database as a single database entity (e.g., see Distributed FARLG below).

In one embodiment, user programs may contain various user interface primitives, which may serve to update the FARLG. Also, various accounts may require custom database tables depending upon the environments and the types of clients the FARLG may need to serve. It should be noted that any unique fields may be designated as a key field throughout. In an alternative embodiment, these tables have been decentralized into their own databases and their respective database controllers (i.e., individual database controllers for each of the above tables). The FARLG may also be configured to distribute the databases over several computer systemizations and/or storage devices. Similarly, configurations of the decentralized database controllers may be varied by consolidating and/or distributing the various database components 1219a-k. The FARLG may be configured to keep track of various settings, inputs, and parameters via database controllers.

The FARLG database may communicate to and/or with other components in a component collection, including itself, and/or facilities of the like. Most frequently, the FARLG database communicates with the FARLG component, other program components, and/or the like. The database may contain, retain, and provide information regarding other nodes and data.

The FARLGs

The FARLG component 1235 is a stored program component that is executed by a CPU via stored instruction code configured to engage signals across conductive pathways of the CPU and ISICI controller components. In one embodiment, the FARLG component incorporates any and/or all combinations of the aspects of the FARLG that were discussed in the previous figures. As such, the FARLG affects accessing, obtaining and the provision of information, services, transactions, and/or the like across various communications networks. The features and embodiments of the FARLG discussed herein increase network efficiency by reducing data transfer requirements with the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the FARLG's features and facilities, and in many cases reduce the costs, energy consumption/requirements, and extend the life of FARLG's underlying infrastructure; this has the added benefit of making the FARLG more reliable. Similarly, many of the features and mechanisms are designed to be easier for users to use and access, thereby broadening the audience that may enjoy/employ and exploit the feature sets of the FARLG; such ease of use also helps to increase the reliability of the FARLG. In addition, the feature sets include heightened security as noted via the Cryptographic components 1220, 1226, 1228 and throughout, making access to the features and data more reliable and secure The FARLG transforms API call permission request, API call result request datastructure/inputs, via FARLG components (e.g., ACH, ACE), into API call permission response, API call result response outputs.

The FARLG component facilitates access of information between nodes may be developed by employing various development tools and languages such as, but not limited to: Apache® components, Assembly, ActiveX, binary executables, (ANSI) (Objective-) C (++), C # and/or .NET, database adapters, CGI scripts, Java, JavaScript, mapping tools, procedural and object oriented development tools, PERL, PHP, Python, Ruby, shell scripts, SQL commands, web application server extensions, web development environments and libraries (e.g., Microsoft's® ActiveX; Adobe® AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo!® User Interface; and/or the like), WebObjects®, and/or the like. In one embodiment, the FARLG server employs a cryptographic server to encrypt and decrypt communications. The FARLG component may communicate to and/or with other components in a component collection, including itself, and/or facilities of the like. Most frequently, the FARLG component communicates with the FARLG database, operating systems, other program components, and/or the like. The FARLG may contain, communicate, generate, obtain, and/or provide program component, system, user, and/or data communications, requests, and/or responses.

Distributed FARLGs

The structure and/or operation of any of the FARLG node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion. As such, a combination of hardware may be distributed within a location, within a region and/or globally where logical access to a controller may be abstracted as a singular node, yet where a multitude of private, semiprivate and publicly accessible node controllers (e.g., via dispersed data centers) are coordinated to serve requests (e.g., providing private cloud, semi-private cloud, and public cloud computing resources) and allowing for the serving of such requests in discrete regions (e.g., isolated, local, regional, national, global cloud access, etc.).

The component collection may be consolidated and/or distributed in countless variations through various data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so as discussed through the disclosure and/or through various other data processing communication techniques.

The configuration of the FARLG controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like. For example, cloud services such as Amazon Data Services®, Microsoft Azure®, Hewlett Packard Helion®, IBM® Cloud services allow for FARLG controller and/or FARLG component collections to be hosted in full or partially for varying degrees of scale.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), NeXT Computer, Inc.'s (Dynamic) Object Linking, Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as JSON, lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c -post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the FARLG controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via an SSL connection, parse the data to extract variables, and store the data to a database, is provided below:

```
<?PHP
header('Content-Type: text/plain') ;
// set ip address and port to listen to for incoming data
$address = '192.168.0.100';
$port = 255;
// create a server-side SSL socket, listen for/accept
incoming communication
$sock = socket_create(AF_INET, SOCK_STREAM, 0);
socket_bind($sock, $address, $port) or
die( 'Could not bind to address' );
socket_listen($sock);
$client = socket_accept($sock) ;
// read input data from client device in 1024 byte
blocks until end of message
do {
    $input = "";
    $input = socket_read($client, 1024);
    $data .= $input;
} while($input != "");
// parse data to extract variables
$obj = json_decode($data, true);
// store input data in a database
mysql_connect("201.408.185.132", $DBserver,
$password) ; // access database server
mysql_select("CLIENT_DB.SQL"); // select database to append
mysql_query("INSERT INTO UserTable (transmission)
VALUES ($data)"); // add data to UserTable table
in a CLIENT database
mysql_close("CLIENT_DB.SQL"); // close connection to database
?>
```

Also, the following resources may be used to provide example embodiments regarding SOAP parser implementation:

http://www.xav.com/perl/site/lib/SOAP/Parser.html
http://publib.boulder.ibm.com/infocenter/tivihelp/
v2r1/index.jsp?topic=/com.ibm.IBMDI.d
oc/referenceguide295.htm and other parser implementations:

http://publib.boulder.ibm.com/infocenter/tivihelp/
v2r1/index.jsp?topic=/com.ibm.IBMDI.d
oc/referenceguide259.htm all of which are hereby expressly incorporated by reference.

In order to address various issues and advance the art, the entirety of this application for Fleetwide Adaptive Rate Limiting Gatekeeper Apparatuses, Processes and Systems (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Further and to the extent any financial and/or investment examples are included, such examples are for illustrative purpose(s) only, and are not, nor should they be interpreted, as investment advice. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components, data flow order, logic flow order, and/or any present feature sets as described in the figures and/or throughout are not limited to a fixed operating order and/or arrangement, but rather, any disclosed order is exemplary and all equivalents, regardless of order, are contemplated by the disclosure. Similarly, descriptions of embodiments disclosed throughout this disclosure, any reference to direction or orientation is merely intended for convenience of description and is not intended in any way to limit the scope of described embodiments. Relative terms such as "lower", "upper", "horizontal", "vertical", "above", "below", "up", "down", "top" and "bottom" as well as derivatives thereof (e.g., "horizontally", "downwardly", "upwardly", etc.) should not be construed to limit embodiments, and instead, again, are offered for convenience of description of orientation. These relative descriptors are for convenience of description only and do not require that any embodiments be constructed or operated in a particular orientation unless explicitly indicated as such. Terms such as "attached", "affixed", "connected", "coupled", "interconnected", etc. may refer to a relationship where structures are secured or attached to one another either directly or indirectly through intervening structures, as well as both movable or rigid attachments or relationships, unless expressly described otherwise. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, provisionals, re-issues, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a FARLG individual and/or enterprise user, database configuration and/or relational model, data type, data transmission and/or network framework, library, syntax structure, and/or the like, various embodiments of the FARLG, may be implemented that allow a great deal of flexibility and customization. For example, aspects of the FARLG may be adapted for fleetwide application resource usage management. While various embodiments and discussions of the FARLG have included backup systems, however, it is to be understood that the embodiments described herein may be readily configured and/or customized for a wide variety of other applications and/or implementations.

What is claimed is:

1. An apparatus, comprising:
   at least one memory;
   a component collection stored in the at least one memory, the component collection comprising a component collection storage; and
   at least one processor disposed in communication with the at least one memory, the at least one processor executing processor-executable instructions from the component collection, the component collection storage structured with processor-executable instructions, comprising:
   obtain, via the at least one processor, an API call permission request datastructure associated with an API call of an application, in which the API call permission request datastructure is structured to identify an API and a set of scopes;
   determine, via the at least one processor, a retry-after interval for each scope in the set of scopes, in which existence of a retry-after interval for a scope indicates that the API previously returned a throttled response for the respective scope;
   determine, via the at least one processor, a wait duration associated with the API call, in which the wait duration is determined as a maximum retry-after interval across retry-after intervals that exist for any scope in the set of scopes;
   provide, via the at least one processor, an API call permission response datastructure, in which the API call permission response datastructure is structured to specify the wait duration; and
   in response to the wait duration being specified, prevent one or more clients of the API from making API call permission requests until the wait duration has passed.

2. The apparatus of claim 1, in which the application is executing in a multi-tenant shared computing infrastructure.

3. The apparatus of claim 1, in which the component collection storage is further structured with processor-executable instructions, comprising: obtain, via the at least one processor, a token from a token vendor for each scope in the set of scopes, in which a token vendor for a scope is structured to vend tokens at a rate-limit that is equal to or greater than the rate-limit of the API for the respective scope.

4. The apparatus of claim 3, in which separate token vendors are utilized for each scope in the set of scopes.

5. The apparatus of claim 3, in which one token vendor is utilized for the set of scopes.

6. The apparatus of claim 3, in which the component collection storage is further structured with processor-executable instructions, comprising:
   relinquish, via the at least one processor, any tokens obtained for the set of scopes after determining existence of a retry-after interval for a scope in the set of scopes.

7. The apparatus of claim 1, in which a rate-limit associated with a scope is set to prioritize requests associated with the respective scope over other scopes.

8. The apparatus of claim 1, in which a rate-limit associated with a scope is adjusted dynamically in response to dynamic rate-limiting by the API.

9. The apparatus of claim 1, in which separate rate-limits are utilized for each scope in the set of scopes.

10. The apparatus of claim 1, in which the component collection storage is further structured with processor-executable instructions, comprising:
adjust, via the at least one processor, the wait duration associated with the API call using a randomly generated jitter.

11. The apparatus of claim 1, in which the component collection storage is further structured with processor-executable instructions, comprising: adjust, via the at least one processor, the wait duration associated with the API call based on request recency associated with the API call permission request datastructure, in which the API call permission request datastructure is structured to specify an associated number of retry attempts or a timestamp associated with an initial permission request.

12. The apparatus of claim 1, in which the component collection storage is further structured with processor-executable instructions, comprising:
obtain, via the at least one processor, an API call result request datastructure associated with the API call, in which the API call result request datastructure is structured to specify that the API call was throttled by the API;
determine, via the at least one processor, a set of affected scopes associated with throttling by the API;
determine, via the at least one processor, an updated retry-after interval for each scope in the set of affected scopes; and
store, via the at least one processor, any updated retry-after intervals for the set of affected scopes.

13. The apparatus of claim 12, in which the API call result request datastructure is structured to specify the set of affected scopes and the any updated retry-after intervals for the set of affected scopes indicated by the API.

14. The apparatus of claim 12, in which the processor-executable instructions to determine the set of affected scopes are structured as instructions to determine which scopes in the set of scopes originally specified in the API call permission request datastructure were under heavy load when the API throttled the API call.

15. The apparatus of claim 12, in which an updated retry-after interval for a scope in the set of affected scopes is determined using an exponential-backoff technique.

16. The apparatus of claim 12, in which an updated retry-after interval for a scope in the set of affected scopes is stored upon determining that the updated retry-after interval is greater than an existing retry-after interval stored for the respective scope.

17. The apparatus of claim 1, in which a scope is one of API-Type, tenant, application, service, resource, user, operation, method, endpoint.

18. A fleetwide adaptive rate limiting processor-readable, non-transient medium, comprising component collection storage structured with processor-executable instructions comprising:
obtain, via at least one processor, an API call permission request datastructure associated with an API call of an application, in which the API call permission request datastructure is structured to identify an API and a set of scopes;
determine, via the at least one processor, a retry-after interval for each scope in the set of scopes, in which existence of a retry-after interval for a scope indicates that the API previously returned a throttled response for the respective scope;
determine, via the at least one processor, a wait duration associated with the API call, in which the wait duration is determined as the maximum retry-after interval across retry-after intervals that exist for any scope in the set of scopes;
provide, via the at least one processor, an API call permission response datastructure, in which the API call permission response datastructure is structured to specify the wait duration; and
in response to the wait duration being specified, prevent API clients from making API call permission requests until the wait duration has passed.

19. A fleetwide adaptive rate limiting processor-implemented system, comprising:
means to store a component collection;
means to process processor-executable instructions from the component collection, the processor-executable instructions including:
obtain, via the at least one processor, an API call permission request datastructure associated with an API call of an application, in which the API call permission request datastructure is structured to identify an API and a set of scopes;
determine, via the at least one processor, a retry-after interval for each scope in the set of scopes, in which existence of a retry-after interval for a scope indicates that the API previously returned a throttled response for the respective scope;
determine, via the at least one processor, a wait duration associated with the API call, in which the wait duration is determined as the maximum retry-after interval across retry-after intervals that exist for any scope in the set of scopes;
provide, via the at least one processor, an API call permission response datastructure, in which the API call permission response datastructure is structured to specify the wait duration; and
in response to the wait duration being specified, prevent one or more clients of the API from making API call permission requests until the wait duration has passed.

20. A fleetwide adaptive rate limiting processor-implemented process, including processing processor-executable instructions via at least one processor from a component collection stored in at least one memory, the component collection structured with processor-executable instructions comprising:
obtain, via the at least one processor, an API call permission request datastructure associated with an API call of an application, in which the API call permission request datastructure is structured to identify an API and a set of scopes;
determine, via the at least one processor, a retry-after interval for each scope in the set of scopes, in which existence of a retry-after interval for a scope indicates that the API previously returned a throttled response for the respective scope;
determine, via the at least one processor, a wait duration associated with the API call, in which the wait duration is determined as the maximum retry-after interval across retry-after intervals that exist for any scope in the set of scopes;
provide, via the at least one processor, an API call permission response datastructure, in which the API call permission response datastructure is structured to specify the wait duration; and in response to the wait duration being specified, prevent one or more clients of the API from making API call permission requests until the wait duration has passed.

\* \* \* \* \*